United States Patent
Shiomi

(10) Patent No.: US 8,957,926 B2
(45) Date of Patent: Feb. 17, 2015

(54) LIQUID CRYSTAL DISPLAY APPARATUS

(75) Inventor: Makoto Shiomi, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 398 days.

(21) Appl. No.: 13/377,069

(22) PCT Filed: Apr. 16, 2010

(86) PCT No.: PCT/JP2010/002797
§ 371 (c)(1),
(2), (4) Date: Dec. 8, 2011

(87) PCT Pub. No.: WO2010/143348
PCT Pub. Date: Dec. 16, 2010

(65) Prior Publication Data
US 2012/0086743 A1    Apr. 12, 2012

(30) Foreign Application Priority Data
Jun. 11, 2009    (JP) ................. 2009-140599

(51) Int. Cl.
*G09G 5/02*    (2006.01)
*G09G 3/36*    (2006.01)
(Continued)

(52) U.S. Cl.
CPC ........ *G09G 3/3648* (2013.01); *G02F 1/136213* (2013.01); *G02F 1/13624* (2013.01);
(Continued)

(58) Field of Classification Search
CPC ... G06F 3/0482; G06F 17/212; G06F 3/0484; G06F 11/273; G06F 12/00; G06F 12/14; G06F 17/211; G06F 17/30115; G06F 17/30265; G06F 17/30371; G06F 17/30386; G06F 17/3053; G06F 17/30554; G06F 17/30; G09G 5/10; G09G 3/3406; G09G 2360/16

USPC ................................................. 345/88, 694
See application file for complete search history.

(56) References Cited

U.S. PATENT DOCUMENTS

2003/0227429 A1    12/2003    Shimoshikiryo
2004/0001167 A1    1/2004    Takeuchi et al.
(Continued)

FOREIGN PATENT DOCUMENTS

| EP | 2 051 136 | 4/2009 |
| JP | 2004062146 A | 2/2004 |

(Continued)

OTHER PUBLICATIONS

Extended European Search Report dated Jan. 2, 2013.
(Continued)

*Primary Examiner* — Kenneth B Lee, Jr.
(74) *Attorney, Agent, or Firm* — Harness, Dickey & Pierce, P.L.C.

(57) ABSTRACT

The liquid crystal display apparatus according to the present invention has a plurality of pixels including a red pixel, a green pixel and a blue pixel. In at least one example embodiment, each of the plurality of pixels has a plurality of subpixels including a first subpixel and a second subpixel. When the grayscale levels of input signals corresponding to the red, green and blue pixels are equal to one another at a given level, the ratio of the difference in luminance between the first and second subpixels of one of the red, green and blue pixels to the maximum luminance of that one of the red, green and blue pixels is greater than the ratio of the difference in luminance between the first and second subpixels of each one of the other two pixels to the maximum luminance of the respective one of the other two pixels.

28 Claims, 23 Drawing Sheets

(51) Int. Cl.
*G02F 1/1362* (2006.01)
*G02F 1/1343* (2006.01)

(52) U.S. Cl.
CPC .. *G02F2001/134345* (2013.01); *G09G 3/3614*
(2013.01); *G09G 3/3655* (2013.01); *G09G
3/3659* (2013.01); *G09G 2300/0426* (2013.01);
*G09G 2300/0443* (2013.01); *G09G 2300/0447*
(2013.01); *G09G 2300/0452* (2013.01); *G09G
2300/0842* (2013.01); *G09G 2300/0852*
(2013.01); *G09G 2320/0242* (2013.01); *G09G
2320/028* (2013.01)
USPC ........................................................ 345/694

(56) References Cited

U.S. PATENT DOCUMENTS

| | | |
|---|---|---|
| 2005/0122441 A1 | 6/2005 | Shimoshikiryoh |
| 2006/0221030 A1 | 10/2006 | Shih et al. |
| 2007/0001960 A1 | 1/2007 | Kim et al. |
| 2008/0198285 A1 | 8/2008 | Hsieh et al. |
| 2010/0118061 A1 | 5/2010 | Suzuki et al. |
| 2010/0182345 A1* | 7/2010 | Shimoshikiryoh et al. ... 345/690 |
| 2010/0225831 A1 | 9/2010 | Takeuchi et al. |

FOREIGN PATENT DOCUMENTS

| | | |
|---|---|---|
| JP | 2004078157 A | 3/2004 |
| JP | 2005189804 A | 7/2005 |
| JP | 2006-285238 A | 10/2006 |
| WO | WO-2007102382 A1 | 9/2007 |
| WO | WO-2008018552 A1 | 2/2008 |
| WO | WO-2008123427 A1 | 10/2008 |

OTHER PUBLICATIONS

International Preliminary Report on Patentability dated Jan. 26, 2012.

Kim, Sang Soo et al., "Ultra Definition LCD Using New Driving Scheme and Advanced Super PVA Technology", SID 08 Digest, pp. 196-199, Jul. 5, 2012.

* cited by examiner

B: BRIGHT
D: DARK

FIG. 7
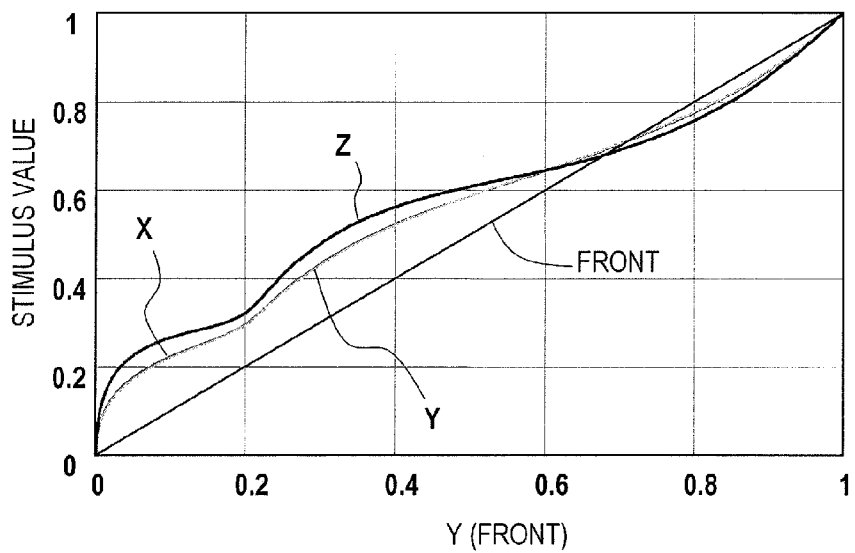
FIG. 8
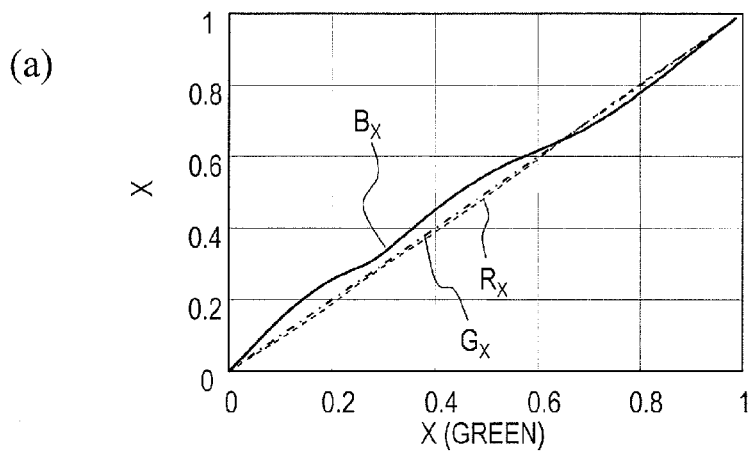
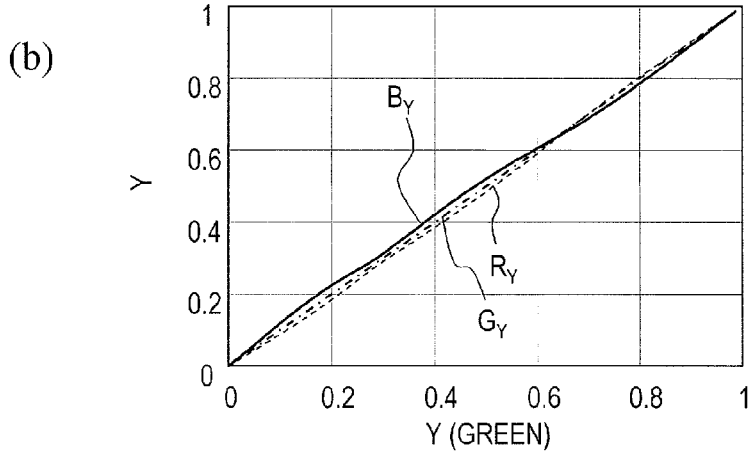

FIG.9A

|  | COLUMN 1 | COLUMN 2 | COLUMN 3 | COLUMN 4 | COLUMN 5 | COLUMN 6 |
|---|---|---|---|---|---|---|
|  | $S_m$ | $S_{m+1}$ | $S_{m+2}$ | $S_{m+3}$ | $S_{m+4}$ | $S_{m+5}$ |
| CSa | A+H | A−L | A+H | A−L | A+H | A−L |
| $G_n$ | L+B | H−B | L+B | H−B | L+B | H−B |
| CSb | B−H | B+L | B−H | B+L | B−H | B+L |
| $G_{n+1}$ | L−A | H+A | L−A | H+A | L−A | H+A |
| CSa | A+H | A−L | A+H | A−L | A+H | A−L |
| $G_{n+2}$ | L+B | H−B | L+B | H−B | L+B | H−B |
| CSb | B−H | B+L | B−H | B+L | B−H | B+L |
| $G_{n+3}$ | L−A | H+A | L−A | H+A | L−A | H+A |
| CSa | A+H | A−L | A+H | A−L | A+H | A−L |
| $G_{n+4}$ | L+B | H−B | L+B | H−B | L+B | H−B |
| CSb | B−H | B+L | B−H | B+L | B−H | B+L |
| $G_{n+5}$ | L−A | H+A | L−A | H+A | L−A | H+A |
| CSa | A+H | A−L | A+H | A−L | A+H | A−L |
| $G_{n+6}$ | L+B | H−B | L+B | H−B | L+B | H−B |
| CSb | B−H | B+L | B−H | B+L | B−H | B+L |
| $G_{n+7}$ | L−A | H+A | L−A | H+A | L−A | H+A |
| CSa |  |  |  |  |  |  |

FIG.21
(a)
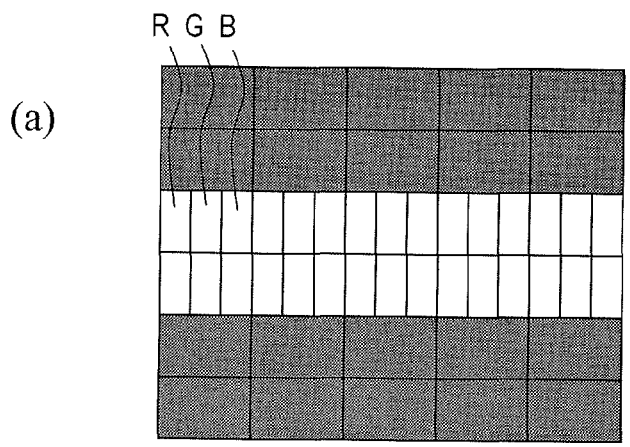
(b)
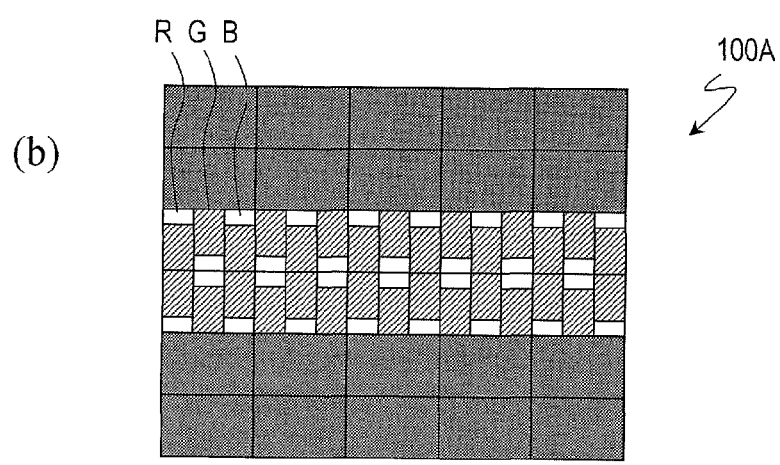
(c)
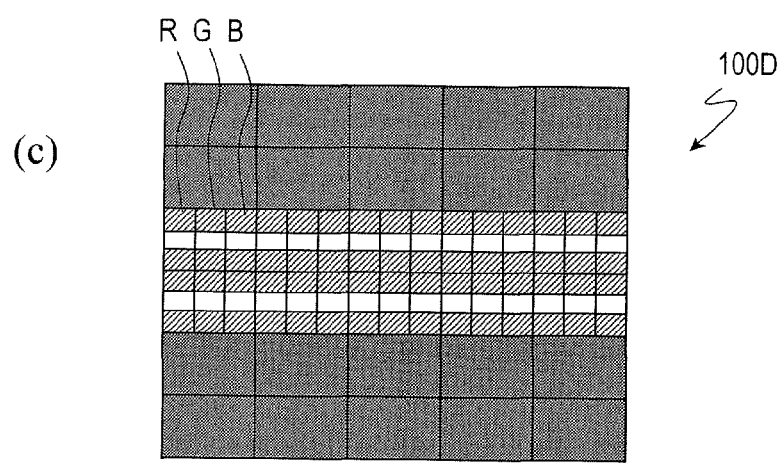

LIQUID CRYSTAL DISPLAY APPARATUS

TECHNICAL FIELD

The present invention relates to a liquid crystal display apparatus.

BACKGROUND ART

Liquid crystal display apparatuses are used not only as a large-sized television but also as a small-sized display device such as a display unit of a portable telephone. Although a TN (Twisted Nematic) mode liquid crystal display apparatus, which was often used conventionally, has a relatively narrow viewing angle, wide viewing angle liquid crystal display apparatuses such as in IPS (In-Plane-Switching) mode or VA (Vertical Alignment) mode have been being manufactured in recent years. Since VA mode can realize a higher contrast ratio among such wide viewing angle liquid crystal display apparatuses, VA mode is employed by many liquid crystal display apparatuses.

However, VA mode liquid crystal display apparatuses may provide grayscale reversal when being viewed obliquely. To suppress grayscale reversal, MVA (Multi-domain Vertical Alignment) mode has been employed which forms a plurality of liquid crystal domain in one pixel region. In MVA mode liquid crystal display apparatuses, an alignment control structure is provided on the liquid crystal layer side of a substrate that is at least one of a pair of opposing substrates between which the vertically aligned liquid crystal layer is sandwiched. The alignment control structure is, for example, a liner slit (aperture) or a rib (protrusion) provided on an electrode. The alignment control structure applies alignment control force to one or both sides of the liquid crystal layer to form a plurality of liquid crystal domains (typically, four liquid crystal domains) having different alignment directions, thereby suppressing grayscale reversal.

In addition, in VA mode liquid crystal display apparatuses, an image in an oblique view may be brighter than the image in the front view (see Patent Document No. 1). This kind of phenomenon may be referred to as whitening. In a liquid crystal display apparatus in Patent Document No. 1, each of red, green, and blue pixels has subpixels, luminances of which can be different respectively, thereby suppressing white floating in an oblique view to improve viewing angle characteristics.

FIG. 23 shows a schematic diagram of a liquid crystal display apparatus 800 disclosed in Patent Document No. 1. In the liquid crystal display apparatus 800, different subpixel electrodes 824a, 824b are connected to a common source line S through corresponding TFTs 830a, 830b, and form capacitive couplings with corresponding storage capacitor lines CSa, CSb. In the liquid crystal display apparatus 800, potentials of the subpixel electrodes 824a, 824b are changed when voltages of storage capacitor lines CSa, CSb are different, so that luminances of subpixels Spa, Spb are different, thereby improving viewing angle characteristics.

FIG. 24 shows a schematic diagram of another liquid crystal display apparatus 900 disclosed in Patent Document No. 1. In the liquid crystal display apparatus 900, subpixel electrodes 924a, 924b are connected through different TFTs 930a, 930b to different source lines Sa, Sb, respectively. Also in the liquid crystal display apparatus 900, potentials of subpixel electrodes 924a, 924b are made different so that luminances of subpixels Spa, Spb are different, thereby improving viewing angle characteristics.

It is also known that luminances of two subpixels are made different by lowering the voltage of one of two subpixel electrodes after the subpixel electrodes are charged (for example, see Non-Patent Document No. 1). In a liquid crystal display apparatus disclosed in Non-Patent Document No. 1, one of two subpixels contained in a pixel further has another storage capacitor which is controlled by an adjacent gate line, in addition to a liquid crystal capacitor and a storage capacitor that are similar to those of the other subpixel. Thereby, in the liquid crystal display apparatus in Non-Patent Document No. 1, after a gate line is turned on and subpixel electrodes corresponding to two subpixels are charged, the voltage of one of the subpixel electrodes is lowered when an adjacent gate line is selected. In this way, viewing angle characteristics are improved in the liquid crystal display apparatus disclosed in Non-Patent Document No. 1.

CITATION LIST

Patent Literature

Patent Document No. 1: Japanese Laid-Open Patent Publication No. 2005-189804

Non-Patent Literature

Non-Patent Document No. 1: Sang Soo Kim et al., "16.1: 82" Ultra Definition LCD Using New Driving Scheme and Advanced Super PVA Technology", SID 08 Digest, pp. 196-199.

SUMMARY OF INVENTION

Technical Problem

As described above, liquid crystal display apparatuses disclosed in Patent Document No. 1 and Non-Patent Document No. 1 have improved viewing angle characteristics. However, when these liquid crystal display apparatuses are viewed obliquely, color may seem to be shifted.

The present invention is made in view of the above described problem, and an object of the present invention is to provide a liquid crystal display apparatus which suppresses color shifting that would otherwise occur when being viewed obliquely.

Solution to Problem

A liquid crystal display apparatus according to the present invention is a liquid crystal display apparatus including a plurality of pixels including a red pixel, a green pixel, and a blue pixel, wherein each of the plurality of pixels includes a plurality of subpixels including a first subpixel and a second subpixel, and wherein when grayscale levels of input signals corresponding to the red pixels, the green pixels, and the blue pixels are equal to one another at a given level, a ratio of a difference in luminance between the first subpixel and the second subpixel of one pixel among the red pixel, the green pixel, and the blue pixel to a maximum luminance of the one pixel is greater than a ratio of a difference in luminance between the first subpixel and the second subpixel of each one of other two pixels among the red pixel, the green pixel, and the blue pixel to a maximum luminance of the respective one of the other two pixels.

In one embodiment, when a grayscale level of input signals corresponding to the other two pixels is a first grayscale level, luminances of the first subpixel of the other two pixels differ from luminances of the second subpixel of the other two pixels respectively, and when the grayscale level of the input signals corresponding to the other two pixels is a grayscale level that is different from the first grayscale level, the luminances of the first subpixel of the other two pixels are approximately equal to the luminances of the second subpixel of the other two pixels respectively. Further, when a grayscale level of an input signal corresponding to the one pixel is any grayscale level, a luminance of the first subpixel of the one pixel differs from a luminance of the second subpixel of the one pixel.

In one embodiment, the plurality of pixels are arranged in a matrix with a plurality of rows and a plurality of columns. In each of the plurality of pixels, the first subpixel and the second subpixel are arranged in a column direction. In a row, the first subpixels of the pixels and the second subpixels of the pixels are arranged in a row direction respectively. Further, assuming that, of the first subpixel and the second subpixel in each of the plurality of pixels, a subpixel whose luminance can be higher is a bright subpixel and a subpixel whose luminance can be lower is a dark subpixel, the bright subpixel and the dark subpixel are alternately arranged along at least one of the row direction and the column direction.

In one embodiment, an area ratio between the bright subpixel and the dark subpixel is approximately from 1:1 to 1:4.

In one embodiment, the one pixel is the blue pixel.

In one embodiment, the liquid crystal display apparatus includes a back substrate, a front substrate, and a liquid crystal layer provided between the back substrate and the front substrate, the back substrate including: a first insulating substrate; a plurality of pixel electrodes respectively corresponding to the plurality of pixels, each of the plurality of pixel electrodes having electrodes which are separated each other corresponding to the plurality of subpixels; a plurality of thin film transistors; a plurality of gate lines; a plurality of source lines; and a plurality of storage capacitor lines, the front substrate including: a second insulating substrate; and a counter electrode opposing the plurality of pixel electrodes, wherein the plurality of thin film transistors include a first thin film transistor and a second thin film transistor respectively corresponding to the first subpixel and the second subpixel of each of the read pixel, the green pixel, and the blue pixel.

In one embodiment, the plurality of thin film transistors further include a third thin film transistor corresponding to one subpixel of the first subpixel and the second subpixel of the blue pixel.

In one embodiment, a luminance of the one subpixel of the first subpixel and the second subpixel of the blue pixel is lower than a luminance of another subpixel of the first subpixel and the second subpixel of the blue pixel.

In one embodiment, the first thin film transistors each include: a gate electrically connected to one gate line of the plurality of gate lines; a source electrically connected to a source line of the plurality of source lines, the source line corresponding to the red pixel, the green pixel, or the blue pixel; and a drain electrically connected to an electrode corresponding to the first subpixel of each of the red pixel, the green pixel, and the blue pixel. The second thin film transistors each include: a gate electrically connected to the one gate line; a source electrically connected to the corresponding source line; and a drain electrically connected to an electrode corresponding to the second subpixel of each of the red pixel, the green pixel, and the blue pixel. The third thin film transistor includes: a gate electrically connected to another gate line of the plurality of gate lines; a source; and a drain electrically connected to an electrode corresponding to the one subpixel of the blue pixel. The source of the third thin film transistor or an electrode electrically connected to the source forms a correction storage capacitor together with at least one conductive member among the pixel electrode corresponding to the blue pixel, the gate line, a source line corresponding to the blue pixel, the storage capacitor line, and the counter electrode, or together with a line electrically connected to the at least one conductive member.

In one embodiment, the source of the third thin film transistor or the electrode electrically connected to the source overlaps with the at least one conductive member or the line electrically connected to the at least one conductive member.

In one embodiment, the at least one conductive member or the line electrically connected to the at least one conductive member includes the counter electrode or a line electrically connected to the counter electrode.

In one embodiment, the at least one conductive member or the line electrically connected to the at least one conductive member includes the drain of the second thin film transistor of the blue pixel or a line electrically connected to the drain.

In one embodiment, the at least one conductive member or the line electrically connected to the at least one conductive member includes the corresponding source line.

In one embodiment, the at least one conductive member or the line electrically connected to the at least one conductive member includes the one gate line or a line electrically connected to the one gate line.

In one embodiment, the gate of the third thin film transistor is electrically connected to a gate line which is different from a gate line corresponding to the blue pixel, of the plurality of gate lines.

In one embodiment, the gate of the third thin film transistor is electrically connected to a gate line which is one row, two rows, or three rows away from a gate line corresponding to the blue pixel, of the plurality of gate lines.

In one embodiment, the gate of the third thin film transistor is electrically connected to a gate line of the plurality of gate lines which is selected within three horizontal scanning periods after a gate line corresponding to the blue pixel is selected.

In one embodiment, adjacent storage capacitor lines among the plurality of storage capacitor lines correspond to the first subpixel and the second subpixel of each of the red pixel, the green pixel, and the blue pixel. Different voltages are applied to the adjacent storage capacitor lines among the plurality of storage capacitor lines. The voltages of the adjacent storage capacitor lines include rectangular waves having a period that is 2×N×a horizontal scanning period (N is an integer greater than or equal to 1).

In one embodiment, the N is an integer greater than 3 and less than 13.

In one embodiment, one of the voltages applied to the adjacent storage capacitor lines is delayed in phase by a time period that is (N+1) times the horizontal scanning period, from another one of the voltages applied to the adjacent storage capacitor lines.

In one embodiment, the back substrate further includes a plurality of storage capacitor trunks each of which is electrically connected to a number of the plurality of storage capacitor lines. 2×N types of voltages are applied to the plurality of storage capacitor lines, and a same type of the storage capacitor lines are connected to a same one of the storage capacitor trunks.

In one embodiment, a voltage of the storage capacitor line oscillates with a same period across both of a non-display time period and a display time period.

In one embodiment, a period of a voltage of the storage capacitor line in a non-display time period is longer than a period of a voltage of the storage capacitor line in a display time period, and the non-display time period of the storage capacitor line is approximately equally divided such that a time period in which each potential occurs is equalized.

In one embodiment, a voltage of the storage capacitor line is reversed every vertical period.

In one embodiment, a vertical scanning period of the liquid crystal display apparatus is set to approximately (M+0.5) times a period of a voltage of the storage capacitor line (M is an integer greater than or equal to 0).

In one embodiment, timing of changing a voltage of the storage capacitor line is set to between twice a horizontal scanning period and (a half period of the voltage of the storage capacitor electrode−2×the horizontal scanning period).

In one embodiment, a first change of a voltage of the storage capacitor line after the first thin film transistor and the second thin film transistor are deselected is after the third thin film transistor is selected.

In one embodiment, the plurality of source lines include source lines corresponding to the first subpixel and the second subpixel of each of the red pixel, the green pixel, and the blue pixel.

In one embodiment, the first thin film transistors each include: a gate electrically connected to one gate line of the plurality of gate lines; a source electrically connected to a source line of the plurality of source lines, the source line corresponding to the red pixel, the green pixel, or the blue pixel; and a drain electrically connected to an electrode corresponding to the first subpixel of each of the red pixel, the green pixel, and the blue pixel. The second thin film transistors each include: a gate electrically connected to the one gate line; a source electrically connected to the source line of the plurality of source lines, the source line corresponding to the red pixel, the green pixel, or the blue pixel; and a drain electrically connected to an electrode corresponding to the second subpixel of each of the red pixel, the green pixel, and the blue pixel.

In one embodiment, the liquid crystal layer is vertically aligned, the liquid crystal layer contains a liquid crystal molecule with negative dielectric anisotropy, and four or eight liquid crystal domains are formed in each of the plurality of subpixels.

In one embodiment, the second subpixel of the blue pixel has a first region and a second region separated from the first region, and the first subpixel of the blue pixel is provided between the first region and the second region of the second subpixel of the blue pixel.

In one embodiment, an electrode corresponding to the second subpixel of the blue pixel includes an electrode corresponding to the first region of the second subpixel and an electrode corresponding to the second region of the second subpixel. The electrode corresponding to the first region of the second subpixel is electrically connected to the electrode corresponding to the second region of the second subpixel via a connecting member having a higher resistance than resistances of the electrodes corresponding to the first region and the second region.

In one embodiment, an electrode corresponding to the first subpixel and an electrode corresponding to the second subpixel are each rectangularly shaped, and at least one notch section is provided on an edge of each of the electrode corresponding to the first subpixel and the electrode corresponding to the second subpixel.

In one embodiment, an electrode corresponding to the first subpixel and an electrode corresponding to the second subpixel are provided with notch sections corresponding to the first thin film transistor and the second thin film transistor, respectively.

In one embodiment, at least one of the first insulating substrate and the second insulting substrate is provided with a negative phase plate.

In one embodiment, at least one of the first insulating substrate and the second insulting substrate is provided with a two-axis negative phase plate.

In one embodiment, the liquid crystal display apparatus is normally black.

Advantageous Effects of Invention

A liquid crystal display apparatus according to the present invention can suppress color shifting that would otherwise occur when being viewed obliquely.

BRIEF DESCRIPTION OF DRAWINGS

FIG. 1 is a schematic diagram of a first embodiment of a liquid crystal display apparatus according to the present invention.

FIG. 2 is a schematic diagram showing a configuration of each pixel in the liquid crystal display apparatus shown in FIG. 1.

FIG. 3 is a chromaticity diagram showing a color reproduction range of the liquid crystal display apparatus shown in FIG. 1.

FIG. 4A is an equivalent circuit diagram of a liquid crystal display apparatus of a comparative example.

FIG. 4B is a schematic diagram showing a configuration of a pixel of the liquid crystal display apparatus of the comparative example.

FIG. 4C is a schematic diagram showing a bright/dark state and polarity of each subpixel of the liquid crystal display apparatus of the comparative example.

FIG. 5 is a graph showing change in grayscale level of each subpixel, bright and dark subpixels, with respect to input signal grayscale level in the liquid crystal display apparatus of the comparative example.

FIG. 6 is a graph showing change in grayscale level of each subpixel, bright and dark subpixels, with respect to input signal grayscale level in the liquid crystal display apparatus of the comparative example.

[FIG. 7] FIG. 7 is a graph showing change in the values of X, Y, and Z in oblique view with respect to the value of Y in front view in the liquid crystal display apparatus of the comparative example.

[FIG. 8] FIG. 8($a$) is a graph showing change in the values of X of red and blue pixels with reference to the value of X of a green pixel in oblique view, and FIG. 8($b$) is a graph showing change in the values of Y of red and blue pixels with reference to the value of Y of a green pixel in oblique view.

[FIG. 9A] FIG. 9A is a schematic diagram showing a bright/dark state and polarity of each subpixel in the liquid crystal display apparatus shown in FIG. 1.

FIG. 9B shows a circuit diagram of the liquid crystal display apparatus shown in FIG. 1.

FIG. 10 is a graph showing change in the values of X, Y, and Z in oblique view with respect to the value of Y in front view in the liquid crystal display apparatus shown in FIG. 1.

FIG. 12 is a block diagram showing the liquid crystal display apparatus shown in FIG. 1.

FIG. 13 is a circuit diagram of a modification of a first embodiment of the liquid crystal display apparatus.

FIG. 14 is a schematic diagram showing voltage waveforms in a liquid crystal display apparatus shown in FIG. 13.

FIG. 15 is a schematic plan view of a back substrate in the liquid crystal display apparatus shown in FIG. 13.

FIG. 16 is a circuit diagram of another modification of the first embodiment of the liquid crystal display apparatus.

FIG. 17 is a schematic diagram showing voltage waveforms in the liquid crystal display apparatus shown in FIG. 16.

FIG. 18 is a circuit diagram of a further modification of the first embodiment of the liquid crystal display apparatus.

FIG. 19 is a schematic diagram showing voltage waveforms in the liquid crystal display apparatus shown in FIG. 18.

FIG. 20 is a schematic plan view showing a second embodiment of the liquid crystal display apparatus according to the present invention.

[FIG. 21] FIG. 21(*a*) is a schematic diagram showing the liquid crystal display apparatus of the comparative example, FIG. 21(*b*) is a diagram showing a modification of the second embodiment of the liquid crystal display apparatus according to the present invention, and FIG. 21(*c*) is a schematic diagram showing the liquid crystal display apparatus shown in FIG. 20.

FIG. 22 is a schematic diagram showing a pixel in a third embodiment of the liquid crystal display according to the present invention.

FIG. 23 is a schematic diagram showing a pixel in a conventional liquid crystal display apparatus.

FIG. 24 is a schematic diagram showing a pixel in another conventional liquid crystal display apparatus.

DESCRIPTION OF EMBODIMENTS

Hereinafter, embodiments of the liquid crystal display apparatus according to the present invention will be described with reference to the drawings. However, the present invention is not limited to the following embodiments.

(Embodiment 1)

Figure 1:
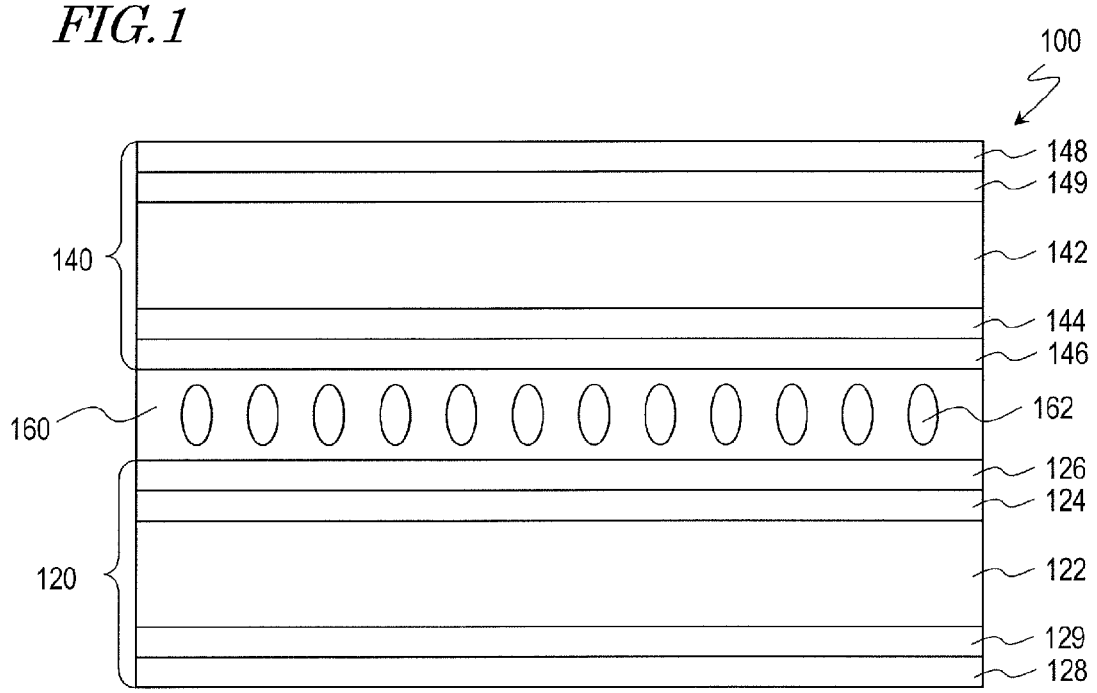
[FIG. 1]

A first embodiment of a liquid crystal display apparatus according to the present invention will be described below. FIG. 1 is a schematic diagram of a liquid crystal display apparatus 100 of the present embodiment. The liquid crystal display apparatus 100 includes: a back substrate 120 including a pixel electrode 124 provided on an insulating substrate 122 and an alignment film 126; a front substrate 140 including a counter electrode 144 provided on an insulating substrate 142 and an alignment film 146; and a liquid crystal layer 160 provided between the back substrate 120 and the front substrate 140.

Polarizing plates 128, 148, and phase plates 129, 149 are provided on each of the back substrate 120 and the front substrate 140. The two polarizing plates 128, 148 are opposed to each other with the liquid crystal layer 160 between them. The transmission axes (polarizing axes) of the two polarizing plates 128, 148 are positioned perpendicularly to each other (in the crossed-Nicols relationship). One of the polarizing plates 128, 148 is disposed along the horizontal direction (row direction) and the other is disposed along the vertical direction (column direction). Wiring lines and insulating layers not shown in FIG. 1 are provided on the back substrate 120 and layers, not shown, such as color filter layers are provided on the front substrate 140. The liquid crystal layer 160 has a substantially uniform thickness. The liquid crystal display apparatus 100 may further include a backlight, not shown here, if the liquid crystal display apparatus 100 is of transmissive or transreflective type.

In the liquid crystal display apparatus 100, a plurality of pixels are arranged in a matrix of a plurality of rows and columns. The plurality of pixels include red, green and blue pixels, each being defined by a pixel electrode 124. In the liquid crystal display apparatus 100, each pixel electrode 124 is separated into a plurality of subpixel electrodes, as will be described later.

The liquid crystal display apparatus 100 operates in a VA mode. The alignment films 126, 146 are vertical alignment films. The liquid crystal layer 160 is a vertically aligned liquid crystal layer. The term "vertically aligned liquid crystal layer" as used herein refers to a liquid crystal layer in which the axes of liquid crystal molecules (also called "axis orientation") is aligned at approximately 85 degrees or greater with respect to the surface of the vertical alignment films 126, 146. The liquid crystal layer 160 includes a negative-dielectric-anisotropic nematic liquid crystal material and provides a display in a normally black mode in combination with the polarizing plates 128, 148 disposed in the cross-Nicols arrangement.

When no voltage is applied to the liquid crystal layer 160, liquid crystal molecules 162 in the liquid crystal layer 160 align substantially parallel to the direction normal to the principal surface of the alignment films 126, 146. When a voltage higher than a given voltage is applied to the liquid crystal layer 160, liquid crystal molecules 162 in the liquid crystal layer 160 align substantially parallel to the principal surface of the alignment films 126, 146. When a relatively high voltage is applied to the liquid crystal layer 160, the liquid crystal molecules 162 align symmetrically in a pixel or in a particular region of a pixel, thereby improving the viewing angle characteristics. While the back substrate 120 and the front substrate 140 herein have the alignment films 126 and 146, respectively, at least one of the back substrate 120 and the front substrate 140 may have an associated alignment film 126, 146. However, preferably both of the back substrate 120 and the front substrate 140 have their respective alignment films 126, 146 for reasons of stability of alignment.

An input signal is input into the liquid crystal display apparatus 100. The input signal is compatible with a cathode ray tube (CRT) that has a gamma value of 2.2, for example and conforms to NTSC (National Television Standards Committee) standards. In the input signal, typically values that can be converted to grayscale levels of red, green and blue pixels are specified and the values are represented in three dimensions. The input signal is a YCrCb signal, for example. Alternatively, grayscale levels themselves of red, green and blue pixels may be specified in the input signal. In the case of an input signal that conforms to the BT. 709 standard, the grayscale levels in the input signal that correspond to red, green and blue pixels are in the range of a minimum grayscale level (for example grayscale level 0) to a maximum grayscale level (for example grayscale level 255). The grayscale levels specified in the input signal are converted to luminance levels in the liquid crystal display apparatus 100 and voltages that depend on the luminance levels are applied to the liquid crystal layer 160 of the liquid crystal display apparatus 100. It should be noted that independent gamma correction may be applied to the input signal in order to reduce the chromaticity of achromatic colors as viewed from the front.

Figure 2:
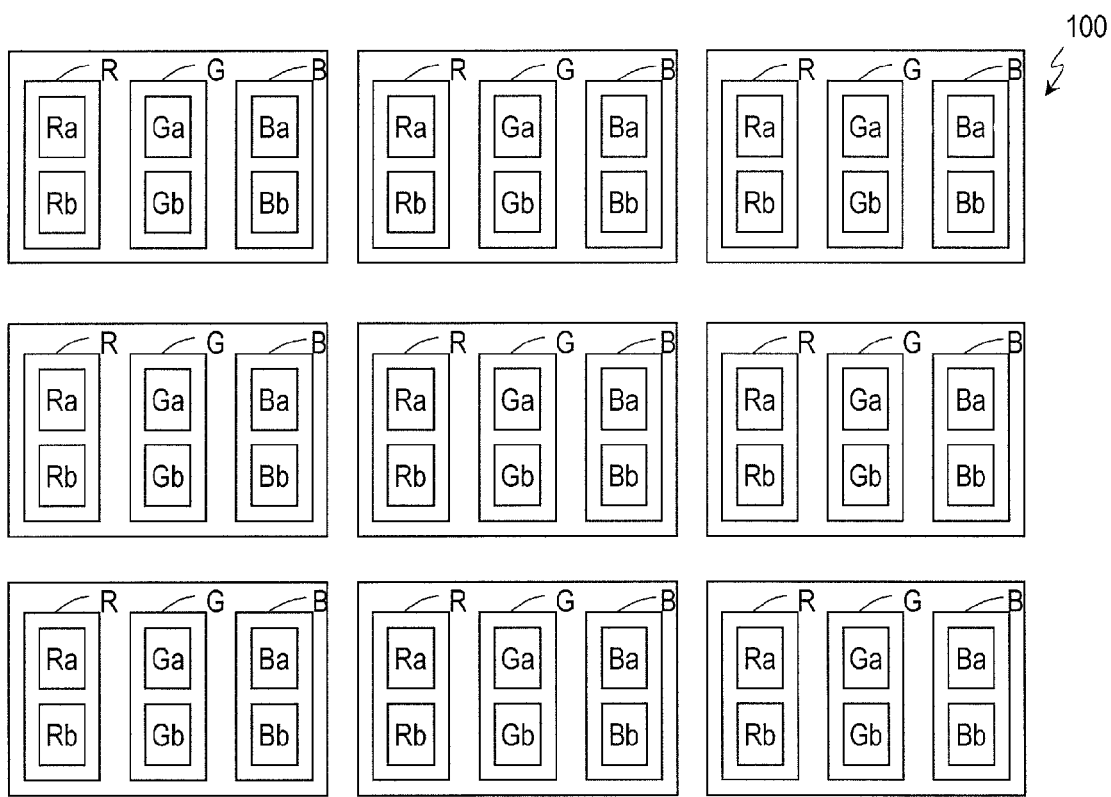
[FIG. 2]

FIG. 2 illustrates a configuration of pixels provided in the liquid crystal display apparatus 100 and subpixels contained in each of the pixels. In FIG. 2, pixels of 3 rows and 9 columns are depicted by way of example. In the liquid crystal display apparatus 100, one set of a red pixel R, a green pixel G and a blue pixel B represents one color. In the following description herein, one set of a red pixel R, a green pixel G and a blue pixel B is sometimes referred to as a color pixel. The arrangement of the color filters of the liquid crystal display apparatus 100 corresponds to the configuration illustrated in FIG. 2.

In the liquid crystal display apparatus 100, each of the pixels R, G and B includes two subpixels. Specifically, a red pixel R includes a first subpixel Ra and a second subpixel Rb. Similarly, a green pixel G includes a first subpixel Ga and a second subpixel Gb and a blue pixel B includes a first subpixel Ba and a second subpixel Bb.

At least at a certain grayscale level, different subpixels of each pixel R, G, B can be controlled to produce different luminances. This control can reduce viewing angle dependence of gamma characteristics, meaning that gamma characteristics differ between when the display is viewed from the front and when the display is viewed obliquely. The reduction of the viewing angle dependence of gamma characteristics is disclosed in Japanese Laid-Open Patent Publication No. 2004-62146 and No. 2004-78157. Controlling the subpixels of each pixel R, G, B so as to produce different luminances provides the effect of reducing the viewing angle dependence of gamma characteristics as in the disclosure in Japanese Laid-Open Patent Publication No. 2004-62146 and No. 2004-78157. Such a structure of red, green and blue pixels R, B and G is also called a divided pixel structure. In the following description herein, one of the first and second subpixels that can produce a higher luminance is sometimes called a bright subpixel and the one that can produce a lower display luminance is sometimes called a dark subpixel.

Figure 3:
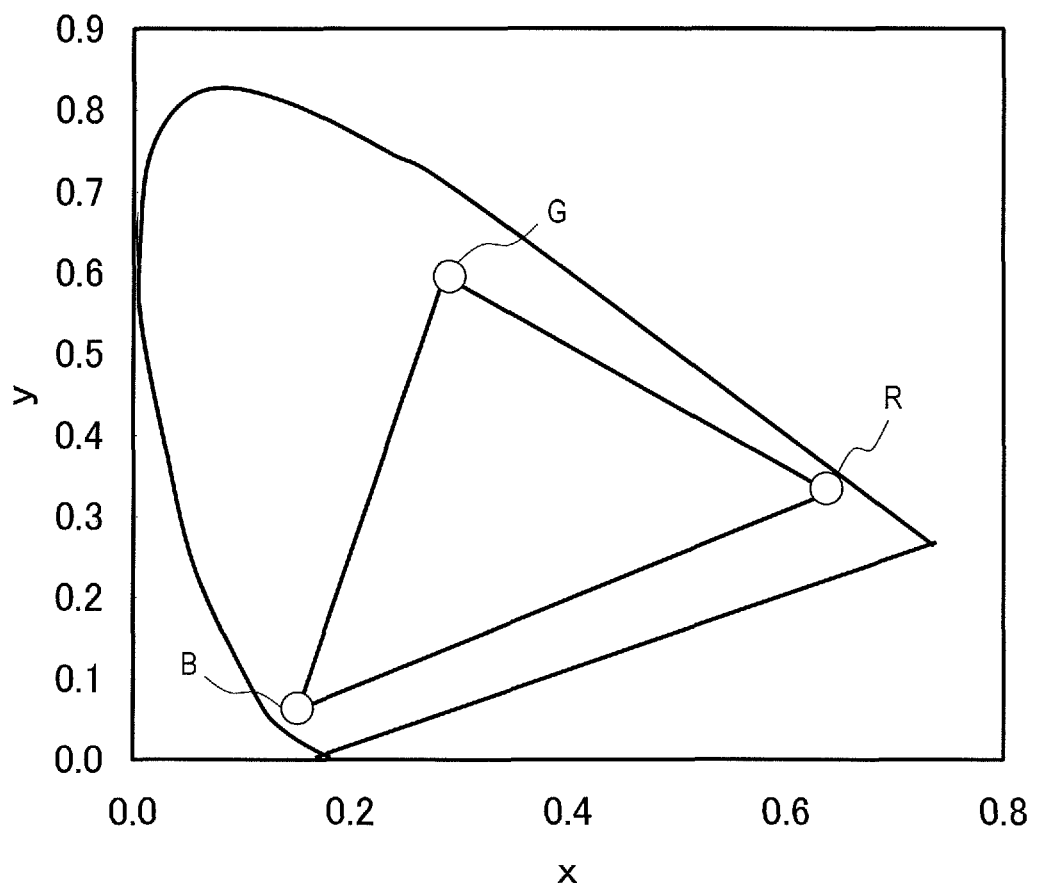
[FIG. 3]

FIG. 3 shows a chromaticity diagram of the liquid crystal display apparatus 100. In FIG. 3, "R" indicates the chromaticity when green and blue pixels are turned off and only a red pixel is producing the maximum luminance. Similarly, "G" indicates the chromaticity when the red and blue pixels are turned off and only the green pixel is producing the maximum luminance and "B" indicates the chromaticity when the red and green pixels are turned off and only the blue pixel is producing the maximum luminance. The triangle with vertices R, G and B shown in FIG. 3 represents the color reproduction range of the liquid crystal display apparatus 100.

In the liquid crystal display apparatus 100, when the grayscale levels in an input signal that correspond to red, green and blue pixels are not the lowest and are equal to one another, the green pixel produces the highest luminance, the red pixel produces the next highest luminance, and the blue pixel produces the lowest luminance. For example, when the grayscale levels in an input signal that correspond to red, green and blue pixels are the highest grayscale levels, the green pixel produces the highest luminance, the red pixel produces the next highest luminance, and the blue pixel produces the lowest luminance. In this way, the actual luminances of the red, green and blue pixels differ from one another even when their grayscale levels are equal to one another. However, in the liquid crystal display apparatus 100, when the grayscale levels in an input signal that correspond to the red, green and blue pixels are a given level and are equal to one another, the ratio of the difference between the luminances of the first and second subpixels of one of the red, green and blue pixels to the maximum luminance of the pixel is greater than the ratio of the difference between the luminances of the first and second subpixels of either of the other two pixels to the maximum luminance of the pixel.

Furthermore, in the liquid crystal display apparatus 100, when the grayscale levels in an input signal that correspond to the other two pixels are a first grayscale level, the luminance of the first subpixels of the other two pixels differ from the luminance of the second subpixels of the other two pixels. When the grayscale levels in the input signal that correspond to the other two pixels are a second grayscale level that differs from the first grayscale level, the luminance of the first subpixels of the other two pixels are approximately equal to the luminance of the second subpixels of the other two pixels. On the other hand, when the grayscale level in the input signal that corresponds to one pixel is any grayscale level, the luminance of the first subpixel of that one pixel differs from the luminance of the second subpixel. Thus, the viewing angle characteristics can be further improved.

Figure 4A:
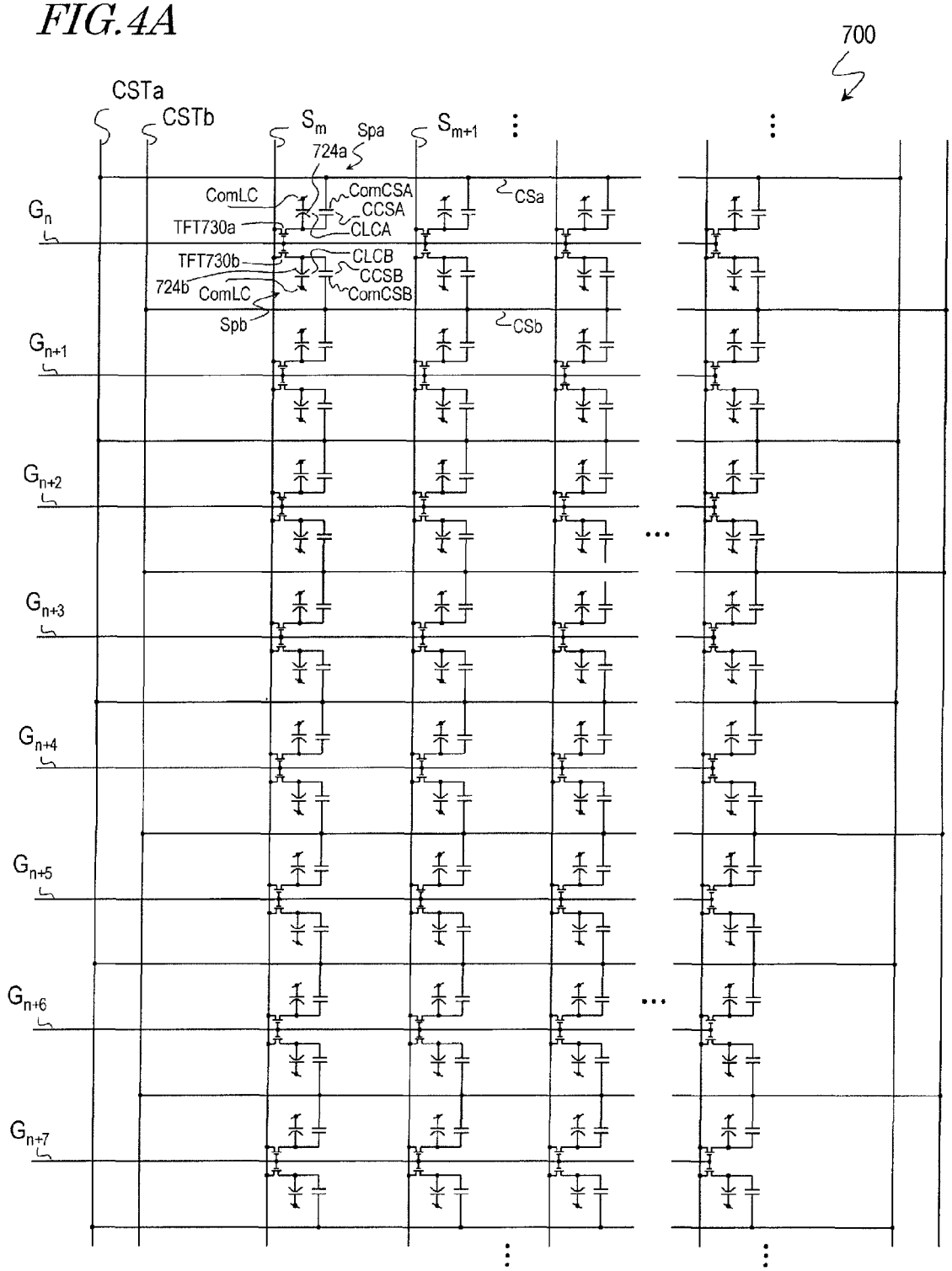
[FIG. 4A]
Figure 4B:
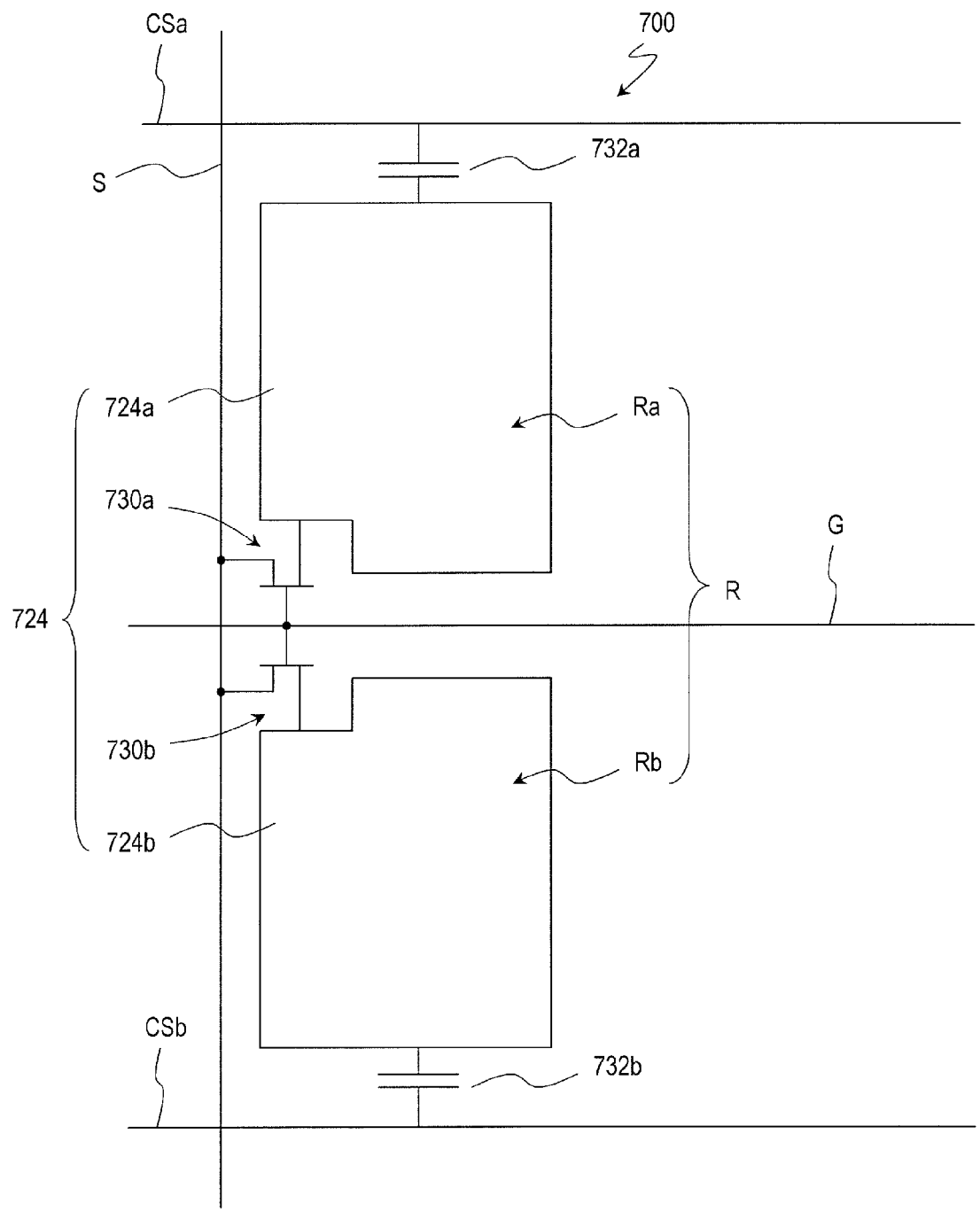
[FIG. 4B]
Figure 4C:
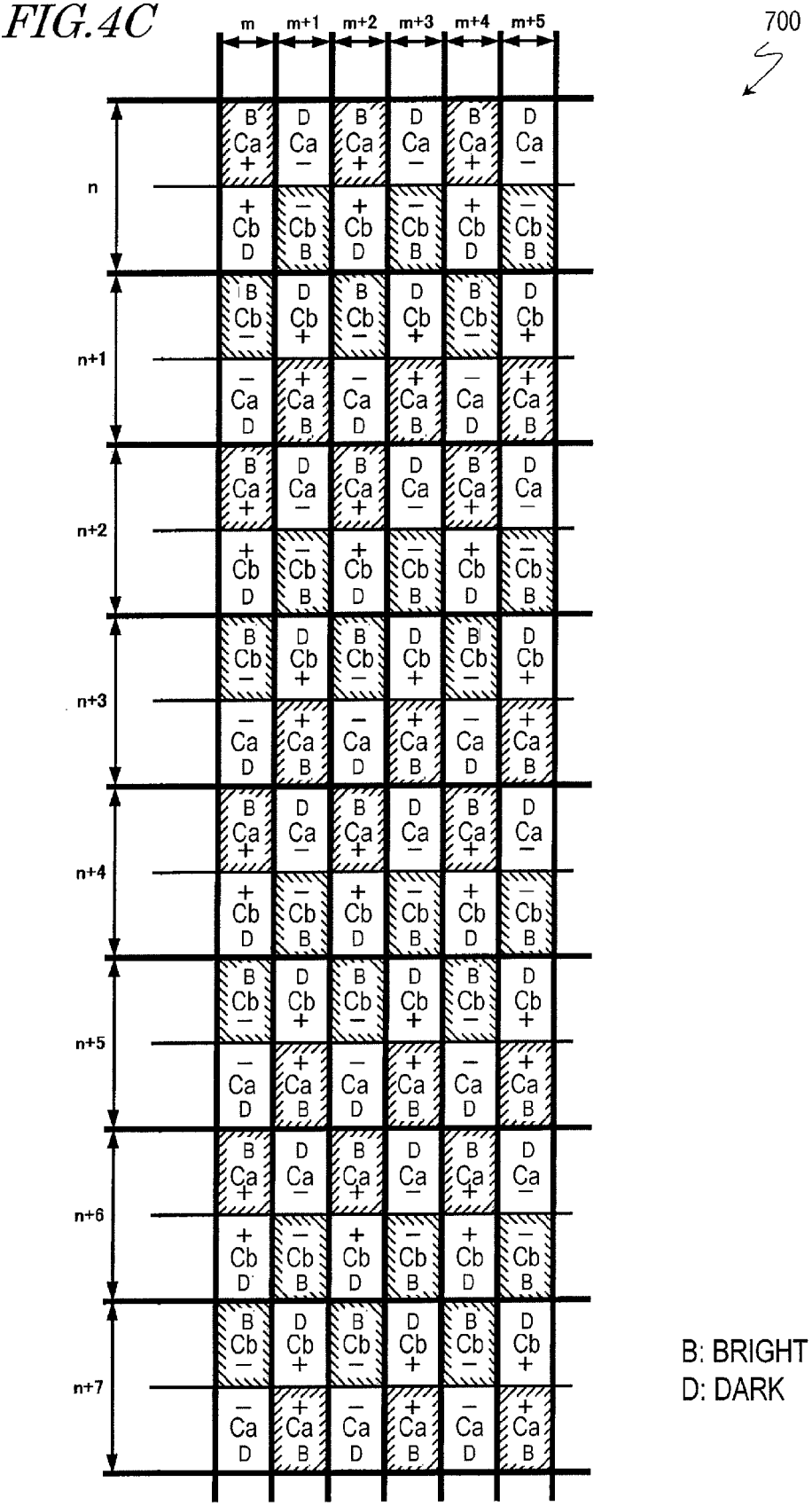
[FIG. 4C]

Advantages of the liquid crystal display apparatus 100 of this embodiment will be described with reference to a liquid crystal display apparatus of a comparative example. Referring to FIGS. 4A to 4C, a liquid crystal display apparatus 700 of the comparative example will be described first. In the liquid crystal display apparatus 700 of the comparative example, each pixel is made up of a plurality of subpixels that can produce different luminances.

FIG. 4A shows an equivalent circuit diagram of the liquid crystal display apparatus 700 of the comparative example. In the liquid crystal display apparatus 700, pixels are arranged in a matrix of a plurality of rows and a plurality of columns. In the liquid crystal display apparatus 700 of the comparative example, each of the pixels is divided into two subpixels Spa and Spb which can produce different luminances, thereby reducing the degree of whitening. In the liquid crystal display apparatus 700, a storage capacitor line is disposed in such a way that the storage capacitor line is associated with subpixels of pixels in different rows adjacent to each other in the column direction. For example, the subpixel Spb of a pixel in the nth row and the subpixel Spa of a pixel in the n+1-th row adjacent to the subpixel Spb in the column direction are associated with storage capacitor line CSb.

Here, a pixel defined by a gate line $G_n$ in the nth row and a source line $S_m$ in the mth row will be examined. The red pixel R, the green pixel G, and the blue pixel B have the same configuration.

The subpixel Spa has a liquid crystal capacitor CLCA and a storage capacitor CCSA and the subpixel Spb has a liquid crystal capacitor CLCB and a storage capacitor CCSB. Each of the liquid crystal capacitor is made up of a subpixel electrode 724a, 724b, a counter electrode ComLC, and a liquid crystal layer provided between them. The storage capacitor is made up of a storage capacitor electrode, an insulating film, and a storage capacitor counter electrode (ComCSA, ComCSB). The subpixel electrodes 724a, 724b are connected to a common source line $S_m$ through associated TFT 730a and TFT 730b, respectively. The TFT 730a and the TFT 730b are turned on and off by a gate signal voltage supplied to a common gate line $G_n$. When the TFTs 730a and 730b are in the on state, a source signal voltage is supplied from the common source line $S_m$ to the subpixel electrodes 724a, 724b and the storage capacitor electrodes of the two subpixels Spa, Spb. The storage capacitor counter electrode ComCSA of the subpixel Spa out of the two subpixels Spa, Spb is connected to a storage capacitor trunk CSTa through a storage capacitor line CSa. The storage capacitor counter electrode ComCSB of the subpixel Spb is connected to a storage capacitor trunk CSTb through a storage capacitor line CSb. With regard to initial changes of storage capacitor counter voltages VCSTa and VCSTb supplied to the storage capacitor trunks CSTa and CSTb, respectively, after the voltage on the associated gate line $G_n$ changes from high to low in the liquid crystal display apparatus 700 of the comparative example, the voltage VCSTa increases and the voltage VCSTb decreases, for example.

FIG. 4B illustrates a configuration of one pixel in the liquid crystal display apparatus 700 of the comparative example. As has been described above, red pixels, green pixels and blue pixels are provided in the liquid crystal display apparatus 700 of the comparative example and the red, green, and blue pixels have the same configuration. The following description will focus on a red pixel.

The red pixel R includes two subpixels Ra and Rb. Subpixel electrodes 724a, 724b associated with the subpixels Ra, Rb are connected with the TFTs 730a, 730b and the storage capacitors 732a, 732b, respectively. The gates of the TFTs 730a, 730b are connected to a gate line G and the sources are connected to a common (the same) source line S. The storage capacitors 732a, 732b are connected to storage capacitor lines CSa, CSb, respectively. Each of the storage capacitors 732a, 732b is formed by a storage capacitor electrode electrically connected to subpixel electrodes 724a, 724b, a storage capacitor counter electrode electrically connected to the storage capacitor lines CSa, CSb, and an insulting layer (not shown) provided between them. The storage capacitor counter electrodes of the storage capacitors 732a and 732b are independent of each other and can be supplied with different storage capacitor counter voltages (storage capacitor voltages) from the storage capacitor line CSa and CSb, respectively. Accordingly, when the TFTs 730a, 730b are turned off after voltages have been supplied to the subpixel electrodes 724a, 724b through the source line S during the on state of the TFTs 730a and 730b and the potential of the storage capacitor lines CSa, CSb change differently, the root-mean-square voltage at the subpixel electrode 724a becomes different from the root-mean-square voltage at the subpixel electrode 724b. As a result, the luminance of the subpixel Ra becomes different from the luminance of the subpixel Rb.

FIG. 4C illustrates bright/dark states and polarities of the subpixels in the liquid crystal display apparatus 700 of the comparative example. In FIG. 4C, "BRIGHT" represents a "bright" subpixel and "DARK" represents a "dark" subpixel. "Ca" represents that the subpixel is associated with the storage capacitor trunk CSTa and "Cb" represents that the subpixel is associated with the storage capacitor trunk CSTb. "+" and "−" represent the direction of an electric field (polarity) applied to the liquid crystal layer. For example, "+" represents that the potential at the counter electrode is higher than the potential at the subpixel electrode; "−" represents that the potential at the subpixel electrode is higher than the potential at the counter electrode.

In the liquid crystal display apparatus 700, one of the subpixels of each pixel is associated with the storage capacitor trunk CSTa and the other subpixel is associated with the storage capacitor trunk CSTb. With regard to the pixel arrangement, pixels adjacent to each other in the row and column directions are opposite in polarity and the pixels of opposite polarity are checkered pixel-wise. Focusing on subpixels associated with the storage capacitor trunk CSTa of the pixels in a given row, the adjacent subpixels are opposite in bright/dark state and polarity. In this way, the bright and dark subpixels are checkered subpixel-wise. FIG. 4C shows the state of the liquid crystal display apparatus 700 in a given frame; in the next frame, the polarities of the subpixels are reversed, thus reducing flickers. For example, in the color pixel in the mth to m+2-th columns in the n-th row, the first subpixel of the red pixel, the second subpixel of the green pixel, and the first subpixel of the blue pixel are bright subpixels whereas the second subpixel of the red pixel, the first subpixel of the green pixel, and the second subpixel of the blue pixel are dark subpixels.

In the liquid crystal display apparatus 700 of the comparative example, when the red, green, and blue pixels are at the lowest grayscale level, the color pixel displays black; when the red, green and blue pixels are at the highest grayscale level, the color pixel displays white. In general, when the color displayed by a pixel remains achromatic but changes from black to white, the grayscale levels of the red, green and blue pixels increase while remaining identical to one another. For example, when the luminance of an achromatic color changes from black toward white in the liquid crystal display apparatus 700 of the comparative example, the grayscale levels in input signals that correspond to the pixels increase at the same rate. Specifically, the color initially displayed by the pixels is black and the grayscale levels of the red, green and blue pixels are the lowest. When the grayscale levels in the input signal that correspond to the red, green and blue pixels start increasing, the luminance of one of the subpixels of each pixel increases (the subpixel is a bright subpixel). When the luminance of the bright subpixel reaches a given value, then the luminance of the other subpixel start increasing (the subpixel is a dark pixel). In the liquid crystal display apparatus 700 of the comparative example, likewise, as the grayscale levels in an input signal that correspond to red, green and blue pixels increase at the same rate, the luminance of the achromatic color displayed by the pixels increases. When the luminances of the red, green and blue pixels reach the highest grayscale level, the colors displayed by the pixels become white.

When the grayscale levels in an input signal that correspond to red, green and blue pixels in the liquid crystal display apparatus 700 of the comparative example are a given level and are equal to one another, the ratio of the differences between the luminance of the first subpixels of red, green and blue pixels and the luminances of the second subpixels to the maximum luminances of the pixels are approximately equal to one another. Focusing on each of red, green and blue pixels in the liquid crystal display apparatus 700 of the comparative example, when the grayscale levels corresponding to red, green and blue pixels are a given level and identical to one another, the luminance of the bright subpixel of each of the red, green and blue pixels differs from the luminance of the dark subpixel of that pixel. On the other hand, when the grayscale levels corresponding to the red, green and blue pixels are the highest grayscale levels, the luminance of the bright subpixel of each of the red, green and blue pixels is approximately equal to the luminance of the dark subpixel.

Figure 5:
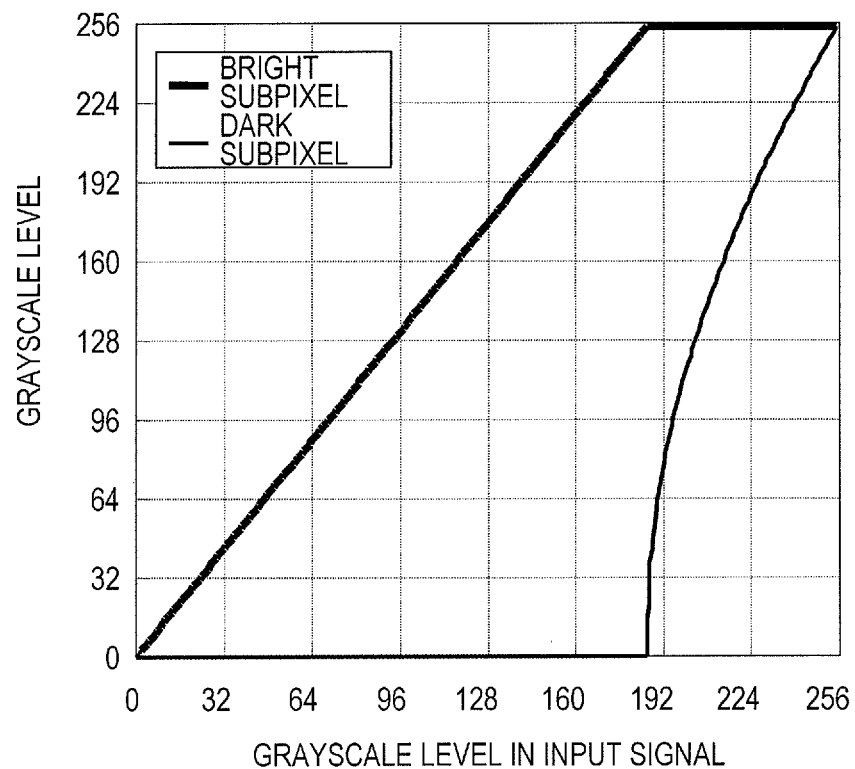
[FIG. 5]

Referring to FIG. 5, changes in the grayscale levels of the bright and dark subpixels of each pixel in the liquid crystal display apparatus 700 of the comparative example will now be described. Here, when the grayscale level in an input signal for each pixel increases from the lowest to the highest, first the grayscale level of the bright subpixel starts increasing and, when the grayscale level of the bright subpixel reaches the highest grayscale level, the grayscale level of the dark subpixel starts increasing.

For example, in the liquid crystal display apparatus 700 of the comparative example, when the grayscale levels (r, g, b) in an input signal that correspond to red, green and blue pixels are (50, 50, 50), the subpixels Ra, Rb of the red pixel produces luminances equivalent to grayscale levels of 69 ($=(2\times(50/255)^{2.2})^{1/2.2}\times255$) and 0, respectively. Similarly, the subpixels Ga, Gb of the green pixel produce luminances equivalent to grayscale levels of 0 and 69 and the subpixels Ba, Bb of the blue pixel produce luminances equivalent to grayscale levels of 69 and 0.

When the grayscale levels (r, g, b) in the input signal that correspond to the red, green and blue pixels are (190, 190, 190), the subpixels Ra, Rb of the red pixel in the liquid crystal display apparatus 700 of the comparative example produce luminances equivalent to grayscale levels of 255 and 64 ($=(2\times(190/255)^{2.2}-1)^{1/2.2}\times 255$), respectively. Similarly, the subpixels Ga, Gb of the green pixel produce luminances equivalent to grayscale levels of 64 and 255 and the subpixels Ba, Bb of the blue pixel produce luminances equivalent to 255 and 64, respectively.

When the grayscale levels in the input single that correspond to the red, green and blue pixels are (255, 255, 255), the subpixels Ra, Rb of the red pixel in the liquid crystal display apparatus 700 of the comparative example produce luminances equivalent to grayscale levels of 255, 255. Similarly, the subpixels Ga, Gb of the green pixel produces luminances equivalent to grayscale levels of 255, 255 and the subpixels Ba, Bb of the blue pixel produce luminances equivalent to grayscale levels of 255, 255.

While the grayscale level of the dark subpixel start increasing after the grayscale level of the bright subpixel has reached the highest grayscale level herein, the grayscale levels of the bright and dark subpixels can change otherwise.

Figure 6:
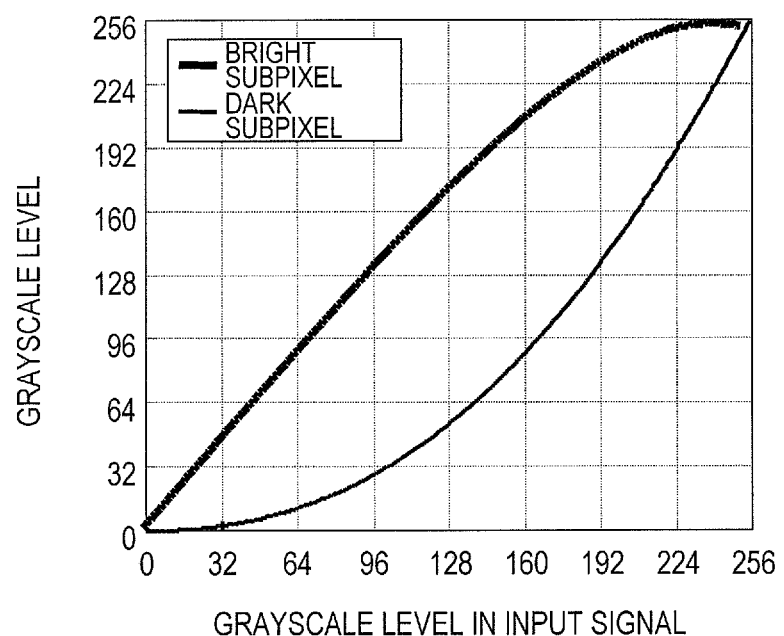
[FIG. 6]

FIG. 6 shows other changes in the grayscale levels of bright and dark subpixels in the liquid crystal display apparatus 700 of the comparative example. Here, settings were made so that the grayscale levels of the bright and dark subpixels continuously increase as the grayscale levels in an input signal increase. In this case, the bright and dark subpixels do not reach the highest or lowest grayscale level in an extremely broad grayscale region. Accordingly, even if there are certain degrees of variations in characteristics of the liquid crystal display apparatus 700, the luminance can be reliably increased as the grayscale levels in the input signal increase.

In the liquid crystal display apparatus 700 of the comparative example described above, color shifting can be observed on the display when viewed obliquely. Color shifting in the liquid crystal display apparatus 700 of the comparative example will be described below with reference to FIGS. 7 and 8.

FIG. 7 shows changes in colorimetric values at an angle of 45 degrees in the liquid crystal display apparatus 700 of the comparative example. The horizontal axis represents normalized Y values in front view, which correspond to luminance levels in front view. The vertical axis represents normalized tristimulus values (X, Y and Z values) in oblique view. In the liquid crystal display apparatus 700 of the comparative example, the normalized X, Y and Z values in front view are set so that the values change in the same way as the luminance levels change. In FIG. 7, "FRONT" represents changes in normalized X, Y, and Z values in front view.

The X, Y, and Z values in oblique view change in a way different from the Y value in front view. In the liquid crystal display apparatus 700 of the comparative example, a divided pixel structure is used and therefore whitening is relatively reduced. However, the X, Y and Z values in oblique view are higher than the values in front view especially in a low grayscale range and slight whitening appears. Therefore, it is desirable that the X, Y and Z values in oblique view be reduced to values substantially equal to the values in front view especially in a low grayscale range in order to further reduce whitening.

Comparison among changes in the X, Y and Z values in oblique view shows that the X and Y values change in substantially the same way whereas the Z value changes in a different way from the X and Y values. In particular, the Z value is higher than the X and Y values especially in a low grayscale range. It can be seen from the result of the analysis of the viewing angle characteristics in oblique view for each individual stimulus value that the Z value changes in a significantly different way from the way the X and Y values change. It should be noted that liquid crystal display apparatuses in general include phase plates, which further increase the difference between the changes in the Z value and the changes in the X and Y values.

As will be apparent to those skilled in the art, chromaticity x can be expressed as $X/(X+Y+Z)$ and y can be expressed as $Y/(X+Y+Z)$. When the luminance of an achromatic color in an input signal changes, the chromaticity in front view does not substantially change. However, in oblique view, the X, Y and Z values change differently with respect to luminance levels. Accordingly, chromaticities x, y change according to the luminance levels. As a result, color shifting appears. In this way, color shifting appears in oblique view in the liquid crystal display apparatus 700 of the comparative example which uses the divided pixel structure. It can be said that color shifting is caused by the difference between changes in the Z value and changes in the X and Y values.

Specifically, when the luminance of an achromatic color is changed while keeping the achromaticity in the liquid crystal display apparatus 700 of the comparative example, the color when viewed obliquely appears to shift toward blue as compared with the color when viewed from the front, especially at low grayscale levels. On the other hand, the luminance of the achromatic color is increased while keeping the achromaticity and keeping the viewing position oblique, the achromatic color appears yellowing around a Y value (front) of 0.2. When the luminance is further increased, the achromatic color at an intermediate grayscale level appears to relatively shift toward blue. In this way, in the liquid crystal display apparatus 700 of the comparative example, an achromatic color viewed obliquely can appear bluish or yellowish.

A method for reducing such color shifting may be to appropriately control only the Z value without changing the X and Y values in oblique directions, for example. Specifically, correction may be made such that the Z values at low grayscale levels are reduced to values equal to the X and Y values. This correction can make the chromaticities x, y in the oblique directions equal to the chromaticities x, y in the front direction and therefore color shifting toward blue when viewed obliquely as compared with the color when viewed from the front can be reduced.

Another method for reducing color shifting is to correct the Z value so that change in the Z value is in similarity relationship with changes in the X and Y values. This correction cannot reduce shifting of a color when viewed obliquely as compared with the color viewed from the front, but can reduce changes in the chromaticities x, y in oblique directions; and therefore, color shifting of an achromatic color is reduced. In either method, it is preferable that the Z value be appropriately controlled without changing the X and Y values.

FIG. 8(*a*) illustrates relative changes in the X values of red, green and blue pixels in the liquid crystal display apparatus 700 of the comparative example. In FIG. 8(*a*), $R_X$, $G_X$ and $B_X$ represent normalized X values of red, green and blue pixels with respect to the X value of the green pixel. FIG. 8(*b*) shows relative changes in the Y values of red, green and blue pixels in the liquid crystal display apparatus 700 of the comparative example. In FIG. 8(b), $R_Y$, $G_Y$ and $B_Y$ represent normalized Y values of red, green and blue pixels with respect to the Y value of the green pixel.

As can be seen from FIG. 8(a), $R_X$ and $G_X$ change in substantially the same way whereas $B_X$ changes in a different way from $R_X$ and $G_X$. Also, as can be seen from FIG. 8(b), $R_Y$ and $G_Y$ change in substantially the same way whereas $B_Y$ changes in a different way from $R_Y$ and $G_Y$. Furthermore, the way $B_X$ differs from $R_X$ and $G_X$ is different from the way $B_Y$ differs from $R_Y$ and $G_Y$. From the foregoing, it can be said that the difference between the viewing angle characteristics of blue pixels and the viewing angle characteristics of red and green pixels is the cause of color shifting in oblique view.

A possible reason why the viewing angle characteristics of blue pixels differ from the viewing angle characteristics of red and green pixels in the liquid crystal display apparatus 700 of the comparative example is as follows. Liquid crystal display apparatuses in general control the voltage to be applied to the liquid crystal layer to change the birefringence of the liquid crystal layer, thereby adjusting the transmittance of the liquid crystal layer. Incident light is efficiently used when the retardation $\Delta n \cdot d$ ($\Delta n$ is the birefringence of the liquid crystal layer and d is the thickness of the liquid crystal layer) of the liquid crystal layer displaying the highest grayscale level is equivalent to one half wavelength of incident light. Therefore, liquid crystal display apparatuses are designed so that the retardation of the liquid crystal layer is one half wavelength of light having a wavelength corresponding to green. Furthermore, phase plates for compensation of viewing angles are provided in typical liquid crystal display apparatuses and typical phase plates are designed to achieve optimal compensation of light having the wavelength of green.

Strictly speaking, the birefringence of the liquid crystal layer varies depending on the wavelength. In the liquid crystal display apparatus 700 of the comparative example, $\Delta nr \cdot d < \lambda r/2$ and $\Delta ng \cdot d < \lambda g/2$ whereas $\Delta nb \cdot d > \lambda b/2$, where $\lambda r$, $\lambda g$ and $\lambda b$ are the peak wavelengths that pass red, green and blue color filters and $\Delta nr$, $\Delta ng$ and $\Delta nb$ are the birefringences of light with the wavelengths $\lambda r$, $\lambda g$ and $\lambda b$, respectively, when the maximum voltage is applied. In the liquid crystal display apparatus 700 of the comparative example, the retardation of the green pixel is set to a value slightly smaller than $\lambda g/2$.

In this way, when the maximum voltage is applied, retardation smaller than one half wavelength is given to light with wavelengths $\lambda r$ and $\lambda g$ whereas retardation greater than one half wavelength is given to light with wavelength $\lambda b$. Accordingly, the viewing angle characteristics of the blue pixel differ from the viewing angle characteristics of the red and green pixels in the liquid crystal display apparatus 700 of the comparative example and the difference probably causes color shifting toward blue-yellow when viewed obliquely.

The liquid crystal display apparatus 100 of this embodiment, in contrast, is configured so that setting of the luminance of the subpixels of the blue pixel differs from the setting of the luminance of the subpixels of the red and green subpixels. Specifically, when the grayscale levels in an input signal that correspond to red, green and blue pixels are equal to one another and are a given level, the ratio of the difference between the luminance of the first subpixel and the luminance of the second subpixel of a blue pixel to the maximum luminance of the blue pixel is greater than the ratio of the difference between the luminance of the first subpixel and the luminance of the second subpixel of each of red and green pixels to the maximum luminance of each of the red and green pixels. For example, the first and second subpixels of the red and green pixels are different in luminance at a certain grayscale level and the same at a different grayscale level, whereas the first and second subpixels of the blue pixel are different in luminance at any grayscale level. As a result of the fact that the setting of the luminances of the subpixels of the blue pixel differs from the settings of the luminances of the subpixels of the red and green pixels, the viewing angle characteristics of the blue subpixel are substantially the same as the viewing angle characteristics of the red and green pixels. Consequently, the viewing angle characteristics are further improved.

The configuration of the liquid crystal display apparatus 100 of this embodiment will be described below in detail. FIG. 9A shows a configuration of the pixels in the liquid crystal display apparatus 100. Two different voltages are applied to storage capacitor lines CS of the liquid crystal display apparatus 100. Here, a storage capacitor line to which one of the voltages is applied is referred to as the storage capacitor line CSa and a storage capacitor line to which the other voltage is applied is referred to as the storage capacitor line CSb.

In FIG. 9A, "H" represents bright subpixels and "L" represents dark subpixels. "A" represents that the subpixel is associated with the storage capacitor line CSa and "B" represents that the subpixel is associated with the storage capacitor line CSb. "+" and "−" represent the direction of an electric field (polarity) applied to the liquid crystal layer 160. For example, "+" represents that the potential at the counter electrode 144 is higher than the potential at the subpixel electrodes 124a, 124b; "−" represents that the potential at the subpixel electrodes 124a, 124b is higher than the potential at the counter electrode 144.

In FIG. 9A, one of the subpixels of each pixel is associated with the storage capacitor line CSa and the other subpixel is associated with the storage capacitor line CSb. With regard to the pixel arrangement, pixels adjacent to each other in the row and column directions are opposite in polarity and the pixels of opposite polarity are checkered pixel-wise. Focusing on subpixels associated with the storage capacitor line CSa of among the subpixels in a given row, the adjacent subpixels are opposite in bright/dark state and polarity. In this way, the bright and dark subpixels are checkered subpixel-wise in the liquid crystal display apparatus 100. FIG. 9A shows the state of the liquid crystal display apparatus 100 in a given frame; in the next frame, the polarities of the subpixels are reversed, thus reducing flickers.

Figure 9B:
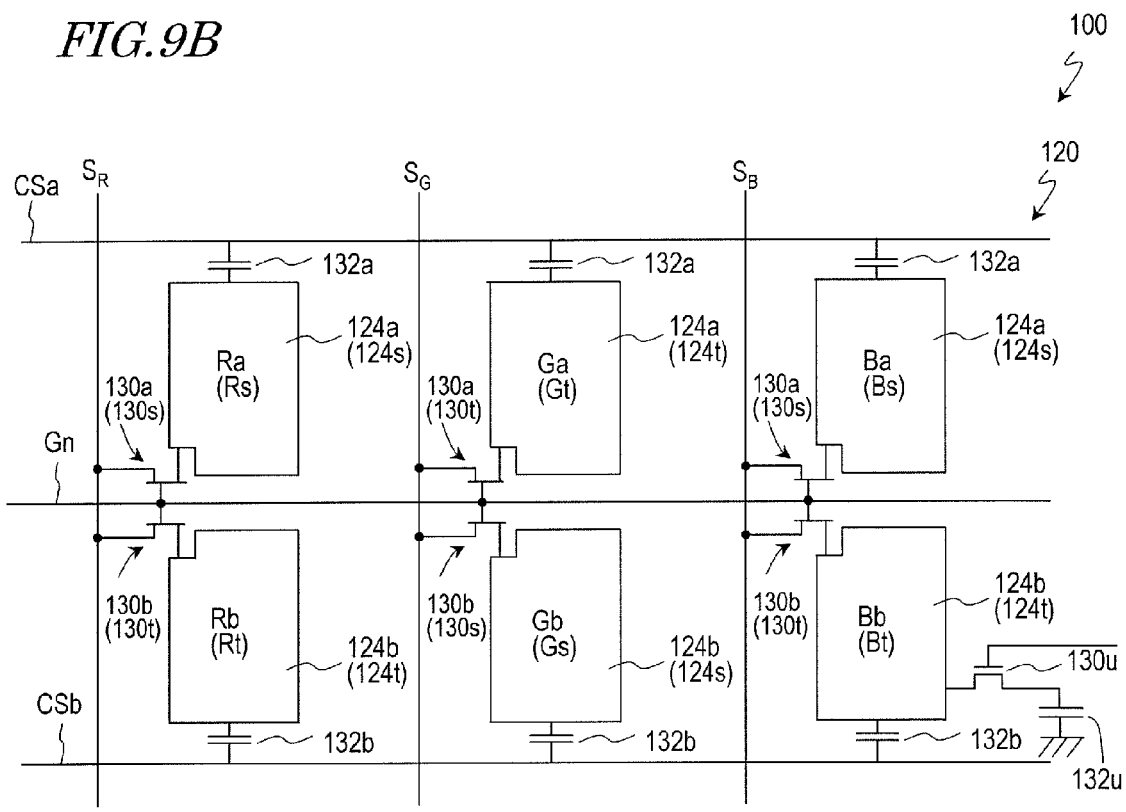
[FIG. 9B]

FIG. 9B shows an equivalent circuit diagram of a red pixel R, a green pixel G, and a blue pixel B on the back substrate 120 of the liquid crystal display apparatus 100. Focusing on the color pixel, the first subpixel of the red pixel, the second subpixel of the green pixel, and the first subpixel of the blue pixel are bright subpixels whereas the second subpixel of the red pixel, the first subpixel of the green pixel, and the second subpixel of the blue pixel are dark subpixels. In the following description, the bright subpixels of the red, green and blue pixels are sometimes referred to as subpixels Rs, Gs, and Bs, respectively, their subpixel electrodes are sometimes referred to as subpixel electrodes 124s, and their TFTs are sometimes referred to as TFT 130s. The dark subpixels of red, green and blue pixels are sometimes referred to as subpixels Rt, Gt and Bt, respectively, their subpixel electrodes are sometimes referred to as subpixel electrodes 124t, and their TFTs are sometimes referred to as TFT 130t.

First, a configuration of the red pixel R will be described. The red pixel R includes two subpixels Ra and Rb. TFT 130a, TFT 130b and storage capacitors 132a, 132b are connected to the subpixel electrodes 124a, 124b associated with the subpixels Ra, Rb, respectively. In the following description, the TFT 130a associated with the first subpixel electrode 124a is sometimes referred to as a first TFT 130a and the TFT 130b associated with the second subpixel electrode 124b is sometimes referred to as a second TFT 130b. The subpixel electrodes 124a, 124b are connected to a common source line $S_R$ through their associated TFTs 130a, 130b. Here, subpixel electrodes 124a, 124b are both substantially rectangular and the area of the subpixel electrode 124a is substantially equal to the area of the subpixel electrode 124b.

The gates of the TFT 130a and the TFT 130b are connected to a common gate line $G_n$ and the sources of the TFT 130a and TFT 130b are connected to a common (the same) source line $S_R$. The storage capacitors 132a, 132b are connected to storage capacitor lines CSa and CSb, respectively. Each of the storage capacitors 132a and 132b is formed by a storage capacitor electrode electrically connected to a subpixel electrode 124a and 124b, respectively, a storage capacitor counter electrode electrically connected to a storage capacitor line CSa and CSb, respectively, and an insulating layer (not shown) provided between them. The storage capacitor counter electrodes of the storage capacitors 132a and 132b are independent of each other and can be supplied with different storage capacitor counter voltages from the storage capacitor lines CSa and CSb, respectively. Accordingly, when the TFTs 130a, 130b are turned off after voltages have been supplied to the subpixel electrodes 124a, 124b through the source line $S_R$ during the on state of the TFTs 130a and 130b and the potential of the storage capacitor lines CSa, CSb change differently, the root-mean-square voltage at the subpixel electrode 124a becomes different from the root-mean-square voltage at the subpixel electrode 124b. As a result, the luminance of the first subpixel Ra becomes different from the second luminance of the subpixel Rb. The green pixel G has the same configuration as the read pixel R.

A configuration of the blue pixel B will be described next. In the liquid crystal display apparatus 100, the blue pixel B has the same configuration as the red pixel R and the green pixel G, except that a TFT 130u and a capacitor 132u are provided in the blue pixel B. Therefore repeated description will be omitted to avoid redundancy.

Here, the TFT 130u is provided in association with the subpixel electrode 124t of the dark subpixel Bt of the blue pixel. The drain of the TFT 130u is connected to the subpixel electrode 124t of the blue pixel. The source of the TFT 130u is connected to the storage capacitor 132u. In the following description, the TFT 130u is sometimes referred to as the third TFT and the storage capacitor 132u is sometimes referred to as the correction storage capacitor.

The gate of the third TFT 130u provided in association with the dark subpixel Bt of a blue pixel in the nth row is electrically connected to a line that is to be selected in the period from the selection of the gate line $G_n$ of the nth row to the reselection of the gate line $G_n$ in the next vertical scanning period. For example, the gate of the third TFT 130u provided in association with the dark subpixel Bt of the blue pixel in the nth row may be electrically connected to a gate line G different from the gate line $G_n$. Specifically, the gate of the third TFT 130u provided in association with the dark subpixel Bt of the blue pixel in the nth row may be electrically connected to the gate line $G_{n+1}$ in the n+1-th row.

The liquid crystal display apparatus 100 described above is driven as follows. The potential of the gate line $G_n$ changes from low to high. This brings the TFTs 130a, 130b into conduction to supply a voltage from source lines $S_R, S_G, S_B$ to the subpixel electrodes 124a, 124b. Then, the potential of the gate line $G_n$ changes from high to low to bring the TFTs 130a, 130b out of conduction. Then the potential of the gate line $G_{n+1}$ changes from low to high to bring the third TFT 130u into conduction, and the potential at the subpixel electrode 124b changes according to the potential stored at the correction storage capacitor 132u.

In general, the polarity of a voltage applied to the subpixel electrode 124b reverses at each frame or field and therefore the polarity of the voltage stored at the correction storage capacitor 132u differs from the polarity of a voltage supplied from the source line $S_B$ to the subpixel electrode 124b through the TFTs 130a, 130b. Accordingly, selection of the TFT 130u causes the potential at the subpixel electrode 124b of the second subpixel Bt of the blue pixel to drop. Then, the potential of the gate line $G_{n+1}$ changes from high to low. In this way, the provision of the third TFT 130u decreases the absolute value of the voltage applied to the liquid crystal layer 160 at the second subpixel Bt.

Consequently, the luminance of the dark pixel Bt of the blue pixel B can be reduced without changing the luminances of the bright subpixels Rs, Gs, Bs and the dark subpixels Rt, Gt of the red pixel R, green pixel G, and blue pixel B in the liquid crystal display apparatus 100 when compared with the liquid crystal display apparatus 700 of the comparative example. Accordingly, even when the grayscale levels in an input signal that correspond to the red, green and blue pixels are equal to one another, the ratio of the difference between the luminance of the bright subpixel Bs and the luminance of the dark subpixel Bt of a blue pixel B to the maximum luminance of the blue pixel B is greater than the ratio of the difference between the luminance of the bright subpixel Rs, Gs and the luminance of the dark subpixel Rt, Gt of each of the red pixel R and green pixel G to the maximum luminance of each of the red pixel R and green pixel G. Because the difference between the luminance of the bright subpixel and luminance of the dark subpixel of each blue pixel can be increased in this way, the viewing angle characteristics of the blue pixel can be made approximately equal to the viewing angle characteristics of the red and green pixels and thus color shifting can be reduced.

Here, when the grayscale level in an input signal that corresponds to each pixel increases from the lowest to the highest, first the grayscale level of the bright subpixel starts increasing and, after the grayscale level of the bright subpixel reaches the highest grayscale level, the grayscale level of the dark subpixel starts increasing. In this case, the grayscale levels of the bright and dark subpixels of the red and green pixels of the liquid crystal display apparatus 100 change as shown in FIG. 5. On the other hand, as the grayscale level in the input signal increases, the grayscale level of the bright subpixel of the blue pixel increases more modestly than the grayscale levels of the bright subpixels of the red and green pixels and the grayscale level of the dark subpixel of the blue pixel increases from a grayscale level higher than the grayscale levels of the dark subpixels of the red and green pixels more steeply than the grayscale levels of the dark subpixels of the red and green pixels.

For example, when the grayscale levels (r, g, b) in an input signal that correspond to red, green and blue pixels are (50, 50, 50), the subpixels Ra and Rb of the red pixel produce luminances equivalent to grayscale levels of 69 ($=(2\times(50/255)^{2.2})^{1/2.2}\times 255$) and 0, respectively. Similarly, the subpixels Ga, Gb of the green pixel produce luminances equivalent to grayscale levels of 0, 69, and the subpixels Ba, Bb of the blue pixel produce luminances equivalent to grayscale levels of 69, 0.

When the grayscale levels (r, g, b) in an input signal that correspond to red, green and blue pixels are (190, 190, 190), the subpixels Ra, Rb of the red pixel produce luminances equivalent to grayscale levels of 255 and 64 (=2×(190/255)$^{2.2}$−1)$^{1/2.2}$×255). Similarly, the subpixels Ga, Gb of the green pixel produce luminances equivalent to grayscale levels of 64, 255, respectively and the subpixels Ba, Bb of the blue pixel produce luminances equivalent to grayscale levels of 255, 0.

When the grayscale levels (r, g, b) in an input signal that correspond to red, green and blue pixels are (255, 255, 255), the subpixels Ra, Rb of the red pixel in the liquid crystal display apparatus 100 produce luminances equivalent to grayscale levels of 255, 255. Similarly, the subpixels Ga, Gb of the green pixel produce luminances equivalent to grayscale levels of 255, 255 and the subpixels Ba, Bb of the blue pixel produce luminances equivalent to grayscale levels of 255, 200.

As can be seen from the foregoing, when grayscale levels in an input signal are at least a given level, the luminance of one of the subpixels of a blue pixel in the liquid crystal display apparatus 100 of this embodiment is lower than that in the liquid crystal display apparatus 700 of the comparative example and accordingly the luminance of the whole blue pixel lowers. Therefore, luminance compensation and/or white balance compensation may be accomplished by adjusting the thickness of the color filters and the backlight in the liquid crystal display apparatus 100.

While the grayscale level of the dark subpixel starts increasing after the grayscale level of the bright subpixel has reached the highest grayscale level herein, the grayscale levels of the bright and dark subpixels may change otherwise.

In the liquid crystal display apparatus 100, as in the liquid crystal display apparatus 700, settings may be made so that the grayscale levels of the bright and dark subpixels of each pixel continuously increase as the grayscale levels in an input signal increase. In this case, the bright and dark subpixels do not reach the highest or lowest grayscale level in an extremely broad grayscale region. Accordingly, the luminance can be reliably increased as the grayscale levels in the input signal increase even when there are certain degrees of variations in characteristics of the liquid crystal display apparatus 100. For example, the grayscale levels of the bright and dark subpixels of red and green pixels may change as shown in FIG. 6 while the grayscale levels of the bright and dark subpixels of a blue pixel may change in such a manner that the difference between the grayscale levels of the bright and dark subpixels is larger than the difference shown in FIG. 6.

Figure 10:
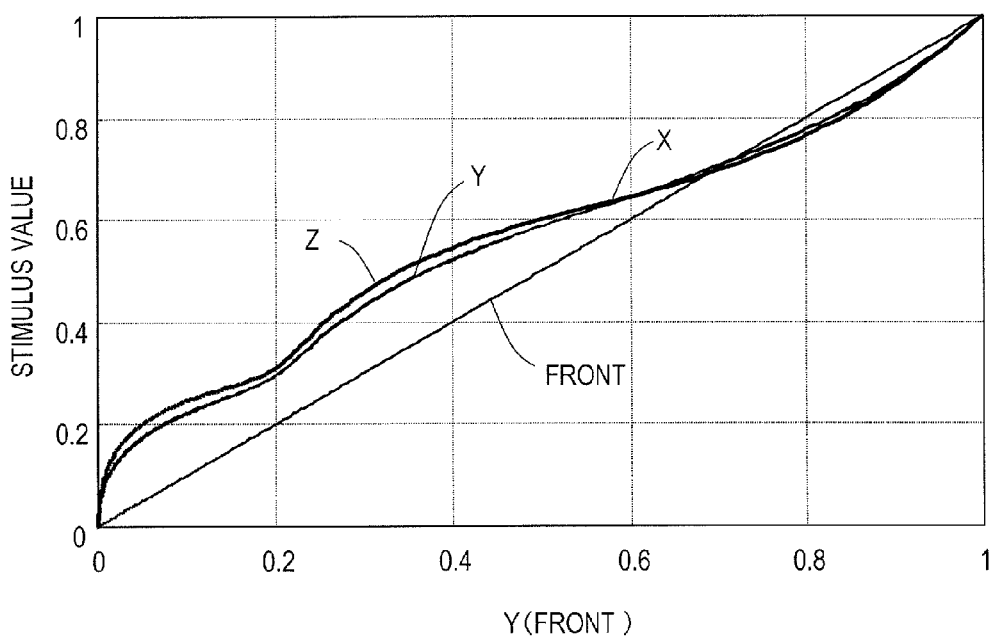
[FIG. 10]

FIG. 10 shows changes in colorimetric values at an angle of 45 degrees in the liquid crystal display apparatus 100. The horizontal axis represents normalized Y values in front view, which correspond to luminance levels in front view. The vertical axis represents normalized tristimulus values (X, Y and Z values) in oblique view. In the liquid crystal display apparatus 100, the normalized X, Y and Z values in front view are set so that the values change in the same way as the luminance levels change. In FIG. 10, "FRONT" represents changes in normalized X, Y, and Z values in front view. In the liquid crystal display apparatus 100, the X, Y, and Z values in oblique view change in a different way from the Y value in front view.

Strictly speaking, comparison among changes in the X, Y and Z values in oblique view shows that the X and Y values change in substantially the same way whereas the Z value changes in a different way from the X and Y values in the liquid crystal display apparatus 100. In particular, the Z value is higher than the X and Y values especially in a low grayscale range. However, as can be seen from the comparison between FIGS. 7 and 10, the difference between the Z value and the X, Y values in the liquid crystal display apparatus 100 is reduced compared with the difference between the Z value and the X, Y values in the liquid crystal display apparatus 700. Thus, color shifting in oblique view can be reduced.

Figure 11:
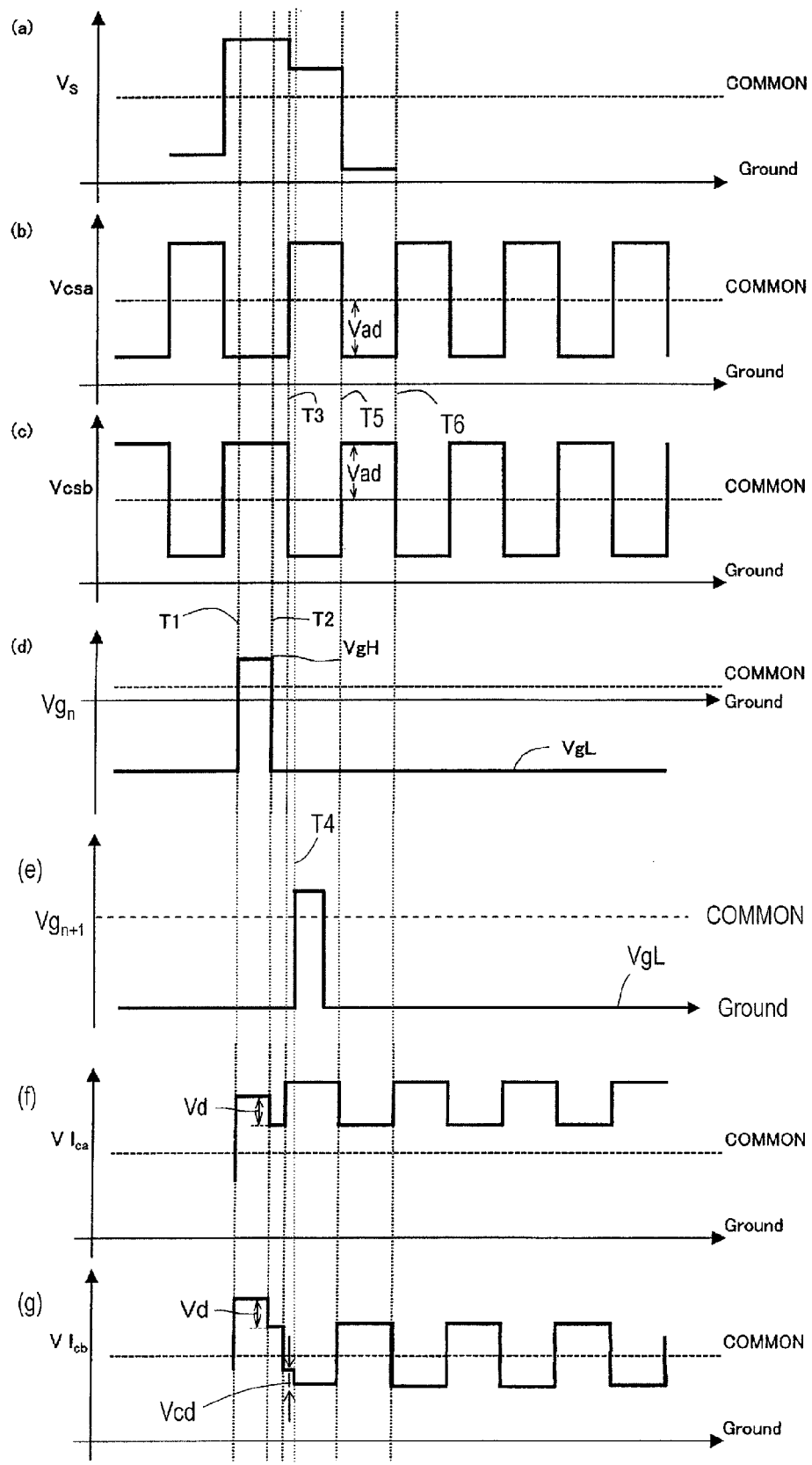
[FIG. 11] FIGS. 11($a$) to ($g$) are diagrams showing voltage waveforms of a blue pixel of the liquid crystal display apparatus shown in FIG. 1.

FIG. 11 shows voltages on lines in the liquid crystal display apparatus 100. Changes in root-mean-square voltage at a blue pixel will be described below with reference to FIGS. 9B and 11. Here, time elapses in the order T1, T2, ....

Although not depicted, the liquid crystal layers of the subpixels Ba, Bb are referred to as liquid crystal layers 160a and 160b, respectively in the following description. Liquid crystal capacitors formed by subpixel electrodes 124a and 124b, liquid crystal layers 160a and 160b, and a counter electrode 144 (shared by the subpixels Ba and Bb) are referred to as liquid crystal capacitors Clca, Clcb. It is assumed here that the capacitances of the liquid crystal capacitors Clca and Clcb are the same, CLC (V). The value of CLC (V) depends on a root-mean-square voltage (V) applied to the liquid crystal layers of the subpixels Ba, Bb. The storage capacitors independently connected to the liquid crystal capacitors of the subpixels Ba and Bb are referred to as storage capacitors Ccsa, Ccsb. It is assumed that the capacitances of the storage capacitors Ccsa, Ccsb are the same, CCS.

One of the electrodes of each of the liquid crystal capacitor Clca and the storage capacitor Ccsa of the subpixel Ba is connected to the drain of a TFT 130a provided for driving the subpixel Ba, the other electrode of the liquid crystal capacitor Clca is connected to a counter electrode, and the other electrode of the storage capacitor Ccsa is connected to a storage capacitor line CSa. One of the electrodes of each of the liquid crystal capacitor Clcb and the storage capacitor Ccsb of the subpixel Bb is connected to the drain of a TFT 130b provided for driving the subpixel Bb, the other electrode of the liquid crystal capacitor Clcb is connected to a counter electrode, and the other electrode of the storage capacitor Ccsb is connected to a storage capacitor line CSb. The gates of the TFT 130a, 130b are both connected to a gate line G$_n$, and the sources of the TFT 130a, 130b are both connected to a source line S$_B$.

At time T1, the voltage Vg$_n$ on the gate line G$_n$ changes from VgL to VgH to bring the TFTs 130a, 130b into conduction (the on state) at a time and voltage Vs is provided from the source line S$_B$ to the subpixel electrodes 124a, 124b of the subpixels Ba, Bb to charge the subpixels Ba, Bb. Similarly, the storage capacitors Ccsa, Ccsb of the subpixels are charged from the source line S$_B$.

At time T2, the voltage Vg$_n$ on the gate line G$_n$ changes from VgH to VgL to bring the TFT 130a and the TFT 130b out of conduction (the off state) at a time and the subpixels Ba, Bb, the storage capacitors Ccsa, Ccsb are all electrically isolated from the source line S$_B$. It should be noted that immediately after this, voltages Vlca, Vlcb at the subpixel electrodes 124a, 124b decreases by substantially the same voltage Vd due to a drawing effect caused by influences such as parasitic capacitances of the TFT 130a, TFT 130b, as follows:

$$Vlca = Vs - Vd$$

$$Vlcb = Vs - Vd$$

At this time, the voltages Vcsa, Vcsb on the storage capacitor lines are $$Vcsa = Vcom - Vad$$

$$Vcsb = Vcom + Vad$$

Then, at time T3, the voltage Vcsa on the storage capacitor line CSa connected to the storage capacitor Ccsa changes from Vcom−Vad to Vcom+Vad and the voltage Vcsb on the storage capacitor line CSb connected to the storage capacitor Ccsb changes from Vcom+Vad to Vcom−Vad by twice Vad. With the changes in voltages on the storage capacitor lines Csa and Csb, the voltages Vlca, Vlcb at the subpixel electrodes change to $Vlca=Vs-Vd+2\times K\times Vad$ $Vlcb=Vs-Vd-2\times K\times Vad$ where $K=CCS/(CLC(V)+CCS)$.

Then, at time T4, the gate voltage $Vg_{n+1}$ on the next gate line $G_{n+1}$ changes from VgL to VgH to decrease the voltage at the subpixel electrode 124*b* of the subpixel Bb by Vcd:

$Vlcb=Vs-Vd-Vcd-2\times K\times Vad$

Then, at time T5, voltage Vcsa changes from Vcom+Vad to Vcom−Vad by twice Vad, voltage Vcsb changes from Vcom−Vad to Vcom+Vad by twice Vad, and voltages Vlca, Vlcb change from $Vlca=Vs-Vd+2\times K\times Vad$ $Vlcb=Vs-Vd-Vcd-2\times K\times Vad$ to $Vlca=Vs-Vd$ $Vlcb=Vs-Vd-Vcd$ At time T6, Vcsa changes from Vcom−Vad to Vcom+Vad by twice Vad, Vcsb changes from Vcom+Vad to Vcom−Vad by twice Vad, and Vlca, Vlcb change from $Vlca=Vs-Vd$ $Vlcb=Vs-Vd-Vcd$ to $Vlca=Vs-Vd+2\times K\times Vad$ $Vlcb=Vs-Vd-Vcd-2\times K\times Vad$ Then, voltages Vcsa, Vcsb, Vlca, and Vlcb alternate the above changes at T5 and T6 at intervals of an integral multiple of horizontal write time (horizontal scanning period) 1H. The alternating intervals of T5 and T6 may be set to 1H or two, three or more times of 1H, as required, by taking into consideration the driving method (such as a polarity reversal method) and display conditions (flickering, graininess, etc.) of the liquid crystal display apparatus. These alternating cycles are repeated until the next time the blue pixel B is rewritten, that is, until a time equivalent to T1. Therefore, the effective values of voltages Vlca, Vlcb of the subpixel electrodes are:

$Vlca=Vs-Vd+K\times Vad$ $Vlcb=Vs-Vd-Vcd-K\times Vad$

Therefore, the root-mean-square voltages applied to the liquid crystal layers 160*a* and 160*b* of the subpixels Ba, Bb are:

$Va=Vlca-Vcom$ $Vb=Vlcb-Vcom$

That is, $Va=Vs-Vd+K\times Vad-Vcom$ $Vb=Vs-Vcd-K\times Vad-Vcom$

Therefore, the difference ΔVab (=Va−Vb) between the root-mean-square voltages applied to the liquid crystal layers 160*a* and 160*b* of the subpixels Ba and Bb is ΔVab=2×K×Vad+Vcd (where K=CCS/(CLC (V)+CCS)). This means that mutually different voltages can be applied.

Although not detailed herein, the third TFT 130*u* is not provided at the red pixel and therefore the difference between the root-mean-square voltages applied to the subpixels Ra and Rb of the red pixel, ΔVab (=Va−Vb), is ΔVab=2×K×Vad (where K=CCS/(CLC (V)+CCS)). The difference between the root-mean-square voltages applied to the subpixels Ga and Gb of the green pixel, ΔVab (=Va−Vb), is also ΔVab=2×K×Vad.

In this way, in the liquid crystal display apparatus 100 of this embodiment, the difference between the root-mean-square voltages at Ba and Bb of the blue pixel B is increased compared with those at the red pixel R and green pixel G. Thus, the difference between the subpixels Ba and Bb in luminance can be increased and therefore color shifting in oblique view can be reduced.

Figure 12:
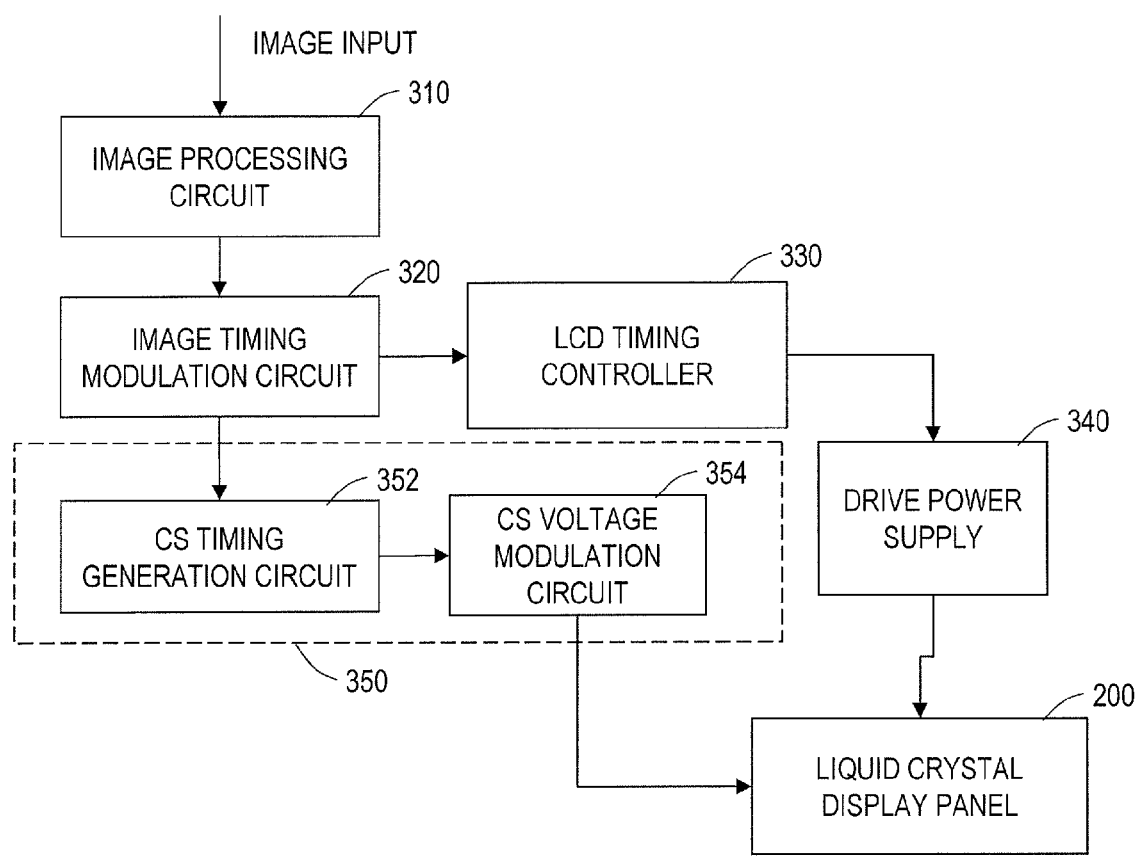
[FIG. 12]

FIG. 12 shows a block diagram of the liquid crystal display apparatus 100. The liquid crystal display apparatus 100 is provided with a liquid crystal display panel 200, an image processing circuit 310, an image timing modulation circuit 320, an LCD timing controller 330, a drive power supply 340, and a CS voltage generation circuit 350. The drive power supply 340 has a gate driver and a source driver. The CS voltage generation circuit 350 has a CS timing generation circuit 352 and a CS voltage modulation circuit 354.

An input signal is suitably processed in the image processing circuit 310, and its timing is thereafter changed to a suitable timing in the image timing modulation circuit 320. Timing-changed image data is supplied to the liquid crystal display panel 200 via the LCD timing controller 330, the gate driver and the source driver. The changed timing is supplied to the CS (storage capacitor voltage) timing generation circuit 352 in the CS voltage generation circuit 350. From this timing, required kinds of timing are produced and supplied to the liquid crystal display panel 200 via the CS voltage modulation circuit 354. The CS voltage generation circuit 350 may be driven by a particular drive program, which may be recorded on an information recording medium.

The meaning of driving the CS voltage generation circuit 350 by a program will be described. In the liquid crystal display panel 200, at least two kinds of storage capacitor voltages are required. Primarily, timings of the storage capacitor voltages are set according to timings of other signals and the number of kinds of storage capacitor voltages. Typically, therefore, a circuit corresponding to a kind of liquid crystal display panel is designed. However, if a program in which storage capacitor voltages and timings of these voltages are inclusively prescribed even for different kinds of liquid crystal display panels can be used, timing of each storage capacitor voltage can be easily changed for different kinds of liquid crystal display panel.

Each storage capacitor voltage changes typically between two predetermined values. In a case where the desired voltage cannot be obtained due to change of circumstances relating to the storage capacitor voltage in the liquid crystal display panel, the two voltage values may be changed. Also, blunting of the waveform due to the capacitor may be avoided by applying an overshoot and/or an undershoot. Thus, it is effective to implement on the CS voltage generation circuit 350 a program having the function of setting timings and voltages for the storage capacitor voltages from parameters for the liquid crystal display panel, and it is also effective to supply a list of adoptable panel parameters, a computation method and so on from a medium to the CS voltage generation circuit 350. In a case where adjustment of the luminance of the subpixels with the third TFTs 130u is performed in the same way in different uses of the liquid crystal display apparatus, for example, as a PC monitor and a television set, failure to obtain the desirable effect may result. It is preferable to enable control based on a program for more suitably adjusting the luminance according to use in such a case.

Figure 13:
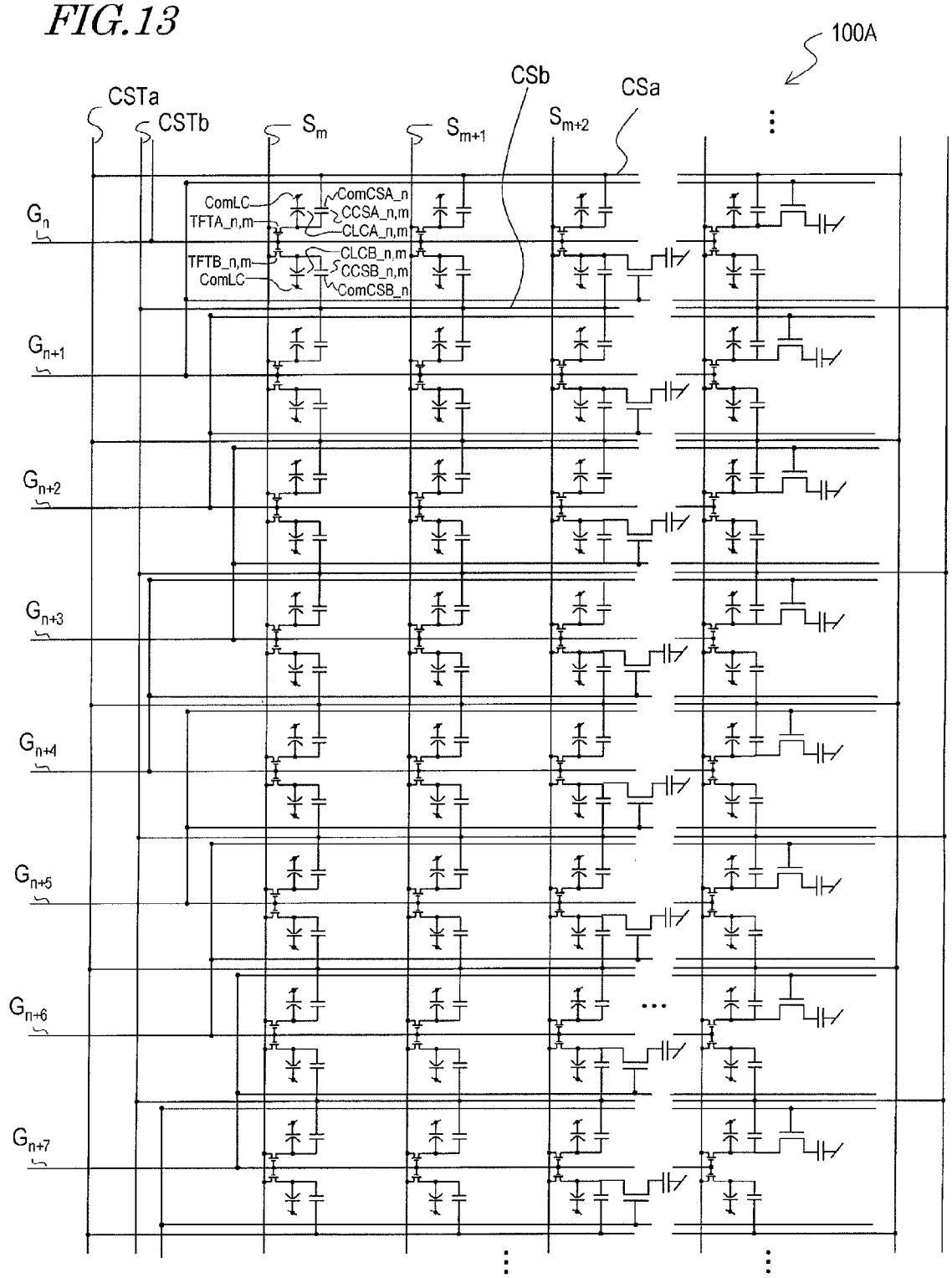
[FIG. 13]

The number of kinds of voltage applied to the storage capacitor line CS of the liquid crystal display apparatus may be two. FIG. 13 shows an equivalent circuit diagram of a liquid crystal display apparatus 100A. In the liquid crystal display apparatus 100A, different voltages are applied to different storage capacitor trunks. Storage capacitor line CSa is electrically connected to a storage capacitor trunk CSTa, and storage capacitor line CSb is electrically connected to a storage capacitor trunk CSTb. In this case, the voltage applied to one of the storage capacitor trunks may be inverted by the inverting circuit to generate the voltage applied to the other storage capacitor line in a simple convenient way. Referring to FIG. 13, one of the subpixels in each pixel corresponds to the storage capacitor trunk CSTa, while the other subpixel corresponds to the storage capacitor trunk CSTb.

Figure 14:
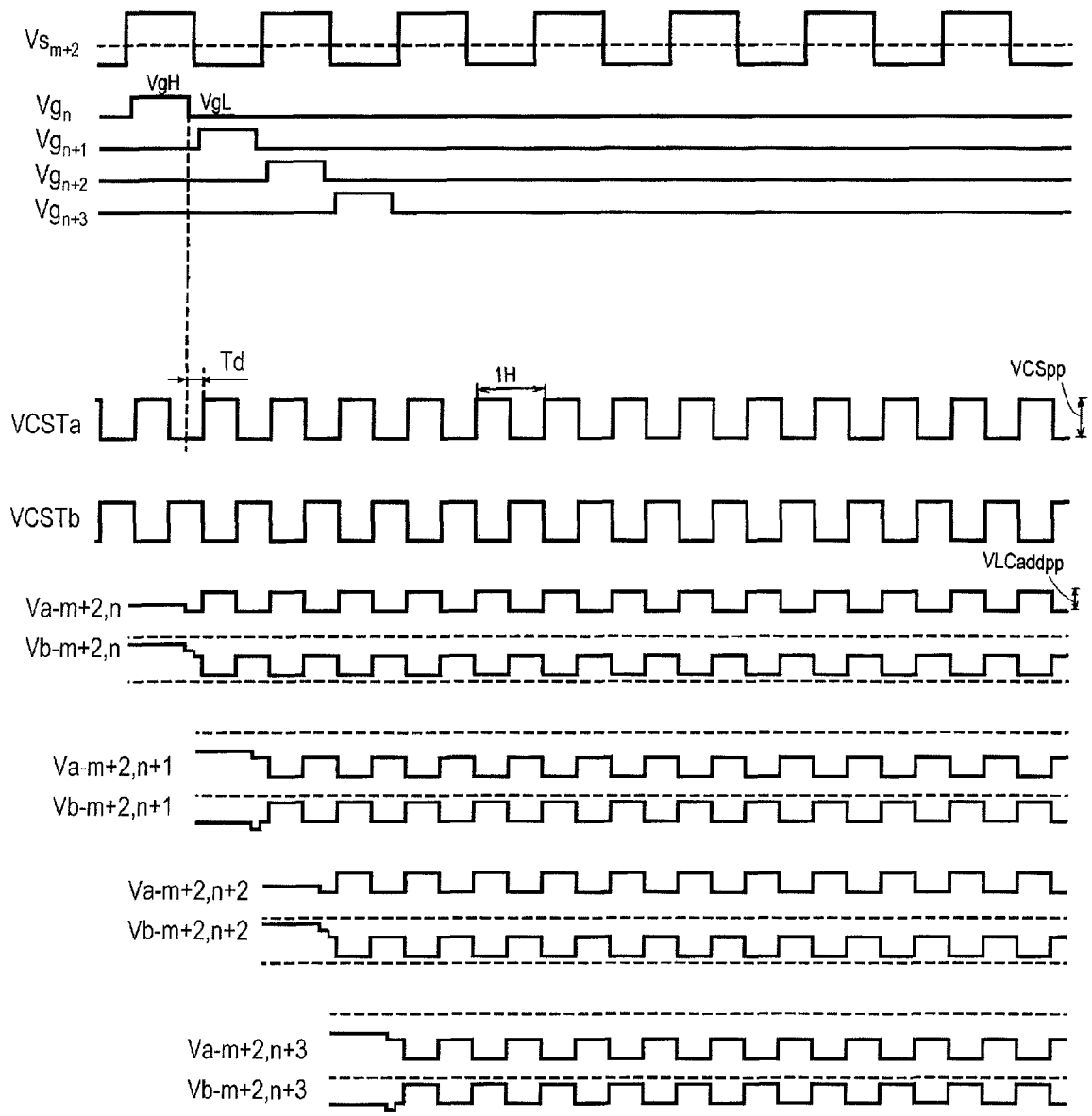
[FIG. 14]

FIG. 14 shows voltage waveforms in the liquid crystal display apparatus 100A shown in FIG. 13. In FIG. 14, $V_{Sm+2}$ denotes the waveform of a source signal voltage supplied to source line $S_{m+2}$ in a column m+2. $Vg_n$ denotes the waveform of a gate signal voltage supplied to gate line $G_n$ in a row n. Similarly, $Vg_{n+1}$, $Vg_{n+2}$, . . . denote the waveforms of gate signal voltages supplied to gate lines $G_{n+1}$, $G_{n+2}$, . . . in rows n+1, n+2, . . . . VCSTa and VCSTb respectively denote the waveforms of storage capacitor counter voltages supplied to the storage capacitor trunks CSTa and CSTb. Va−m+2,n and Vb−m+2,n denote the waveforms of voltages across the liquid crystal capacitors of the first and second subpixels at row n and column m+2 with reference to the voltage waveforms on the gate line. Similarly, Va−m+2,n+1 and Vb−m+2,n+1 denote the waveforms of voltages across the liquid crystal capacitors of the first and second subpixels at row n+1 and column m+2 with reference to the voltage waveforms on the gate line. The pixels at row n and column m+2, row n+1 and column m+2, . . . in this description are blue pixels. Also, the first subpixel is a bright subpixel, while the second subpixel is a dark subpixel.

The periods of oscillation of voltages VCSTa and VCSTb on the storage capacitor trunks CSTa and CSTb are each equal to the horizontal scanning period×1 (1H). Regarding the phases of voltages VCSTa and VCSTb on the storage capacitor trunks CSTa and CSTb, the phase of voltage VCSTb is the inversion of the phase of voltages VCSTa. Regarding voltages VCSTa and VCSTb on the storage capacitor trunks CSTa and CSTb and the voltage on the gate line $G_n$, the time at which the voltage $Vg_n$ on the gate line $G_n$ with respect to the storage capacitor lines CSTa and CSTb changes from VgH to VgL coincides with the time at the center of a flat portion of each of voltages VCSTa and VCSTb on the storage capacitor trunks CSTa and CSTb. If the time period immediately after the time at which the TFTs change from the on state to the off state to the time at which the voltages VCSTa and VCSTb are first changed thereafter is Td, the value of Td is 0.25H. The value of Td may be within such a range as to be longer than 0H and shorter than 0.5H.

The voltages VCSTa and VCSTb on the storage capacitor trunks CSTa and CSTb are not limited to the waveforms shown in FIG. 14. However, it is preferable that with respect to the voltage on an arbitrary one of the gate lines, the first change in the voltage VCSTa after a change from VgH to VgL in the voltage on the gate line be opposite in direction to the first change in the voltage VCSTb. For example, it is preferable that with respect to the voltage on an arbitrary one of the gate lines, the first change in the voltage VCSTa after a change from VgH to VgL in the voltage on the gate line and the first change in the voltage VCSTb after the change from VgH to VgL in the voltage on the gate line be an increase and a reduction, respectively. Alternatively, it is preferable that with respect to the voltage on an arbitrary one of the gate lines, the first change in the voltage VCSTa after a change from VgH to VgL in the voltage on the gate line and the first change in the voltage VCSTa after the change from VgH to VgL in the voltage on the gate line be a reduction and an increase, respectively.

Figure 15:
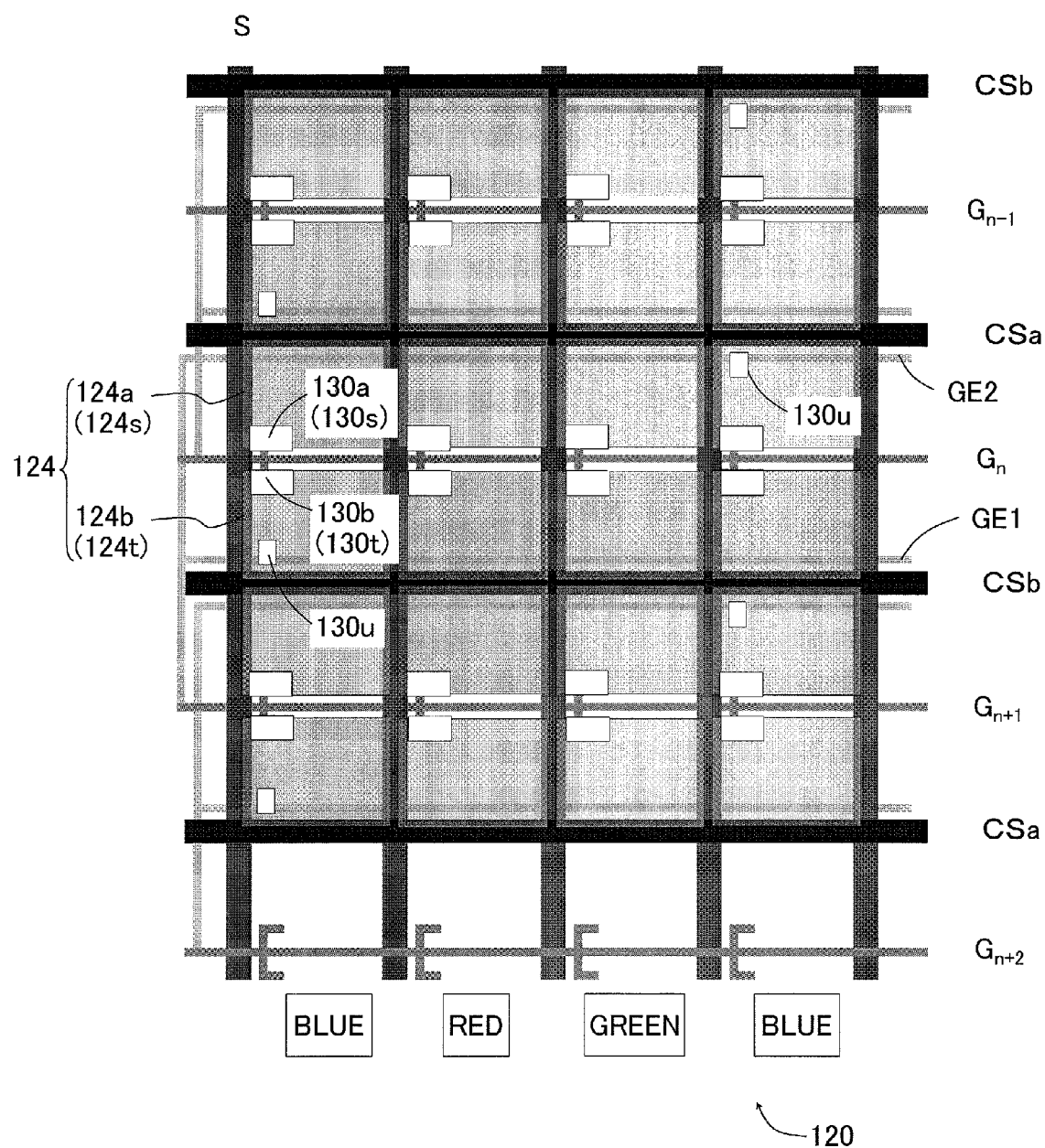
[FIG. 15]

A concrete configuration in the liquid crystal display apparatus 100A will now be described with reference to FIG. 15. FIG. 15 shows a schematic plan view of the back substrate 120 in the liquid crystal display apparatus 100A.

In the liquid crystal display apparatus 100A, gate lines G and source lines S are placed in matrix form and storage capacitor lines CS extend parallel to the gate lines G. Also, two extended lines GE1 and GE2 extend from each gate line G. In the following description, the extended line GE1 is referred to as a first extended line GE1, and the extended line GE2 as a second extended line GE2, as occasion demands. Each of the first extended line GE1 and the second extended line GE2 is provided in the vicinity of the storage capacitor line CS.

The subpixel electrodes 124a and 124b in each pixel are disposed symmetrically about the gate line G. The TFT 130a is provided in association with the subpixel electrode 124a, while the TFT 130b is provided in association with the subpixel electrode 124b.

The configuration in each red pixel will first be described. The same description can be made of the configuration in each green pixel. The subpixel electrode 124a form a capacitive coupling with the line overlapping the subpixel electrode 124a, and the potential on the subpixel electrode 124a changes according to the potential on the line. For example, the subpixel electrode 124a forms a capacitive coupling with the storage capacitor line CSa and the potential on the subpixel electrode 124a changes according to the potential on the storage capacitor line CSa. Similarly, the subpixel electrode 124b forms a capacitive coupling with the line overlapping the subpixel electrode 124b, and the potential on the subpixel electrode 124b changes according to the potential on the line. For example, the subpixel electrode 124b forms a capacitive coupling with the storage capacitor line CS.

The voltages supplied to the subpixel electrodes 124a and 124b via the source line S during a period of time during which the TFTs 130a and 130b are conductive are equal to each other. However, after the TFTs 130a and 130b become nonconductive, the potentials on the subpixel electrodes 124a and 124b differ from each other because the change in potential on the storage capacitor line CSa is different from the change in potential on the storage capacitor line CSb. As a result, the luminance of the first subpixel is different from the luminance of the second subpixel. To be exact, the subpixel electrodes 124a and 124b form capacitive couplings with elements including the source line S, the TFTs and the gate line G. However, these capacitive couplings do not substantially contribute to changing the potential difference between the subpixel electrodes 124a and 124b, because the potentials on the elements including the source line S, the TFTs and the gate line G can be regarded as substantially constant.

The configuration in each blue pixel will next be described. In the liquid crystal display apparatus 100A in the present embodiment, the TFT 130u is provided on the subpixel electrode 124t for each blue pixel. The gate of the TFT 130u provided in association with each dark subpixel Bt in the nth row is electrically connected to the gate line $G_{n+1}$ in the n+1-th row. Each of the TFTs 130a, 130b, and 130u has a semiconductor layer, and the semiconductor layer of each of the TFTs 130a, 130b, and 130u is formed by patterning a deposited semiconductor film. Thus, the TFTs 103u are formed by the same process as that for forming the TFTs 130a and 130b.

The configuration of the TFT 130u will be described. The gate of the TFT 130u is electrically connected to the extended line GE1 or GE2, and the drain of the TFT 130u is electrically connected to the subpixel electrode 124t. Also, the source of the TFT 130u or an electrode electrically connected to the source overlaps the extended line GE1 or GE2 on the lower side and the pixel electrode 124t on the upper side, with insulating layers interposed therebetween. The source of the TFT 130u or the electrode electrically connected to the source capacitively couples to the extended line GE1 or GE2 and the subpixel electrode 124t. Therefore, a capacitor is formed between the subpixel electrode 124t and the source of the TFT 130u and between the subpixel electrode 124t and the extended line GE1 or GE2. This capacitor corresponds to the correction storage capacitor 132u shown in FIG. 9B.

When the gate of the TFT 130u turns on after turning-off of the gates of the TFT 130s and TFT 130t, the source of the TFT 130u and the subpixel electrode 124t are electrically connected to each other to perform absorption or release of charge from the subpixel electrode 124t to the correction storage capacitor 132u. In this case, until the gate of the TFT 130u is turned on after turning-off of the gates of the TFT 130s and the TFT 130t, the potential on the source of the TFT 130s is opposite to the potential on the subpixel electrode 124t due to charging on the correction storage capacitor 132u one frame before. Therefore, when the third TFT 130u is turned on, charge on the subpixel electrode 124t is released. In general, the capacitance of the correction storage capacitor 132u does not exceed the capacitance of the liquid crystal capacitor of the subpixel. The capacitance of the correction storage capacitor 132u is, preferably, 1 to 10% of the capacitance of the liquid crystal capacitor and, more preferably, 2 to 5% of the capacitance of the liquid crystal capacitor.

When the third TFT 130u is turned off, the capacitance between the source of the third TFT 130u and the subpixel electrode 124t is simply added. Accordingly, the absolute value of the potential on the subpixel electrode 124t is reduced. The electroconductive member forming the capacitive coupling with the source of the TFT 130u may be a different member with which substantially no low-frequency variation in voltage occurs in one frame period.

As can be understood from FIG. 15, regarding the two blue pixels belonging to two color pixels adjacent to each other in the row direction, the first subpixel in one of the two blue pixels is a bright subpixel and the second subpixel in this blue pixel is a dark subpixel. On the other hand, the first subpixel in the other blue pixel is a dark subpixel and the second subpixel in this blue pixel is a bright subpixel. Also, in the blue pixels seen along the column direction, bright subpixels and dark subpixels are alternately arranged. The first extended line GE1 forms capacitive couplings with the subpixel electrodes 124t for the second subpixels formed as dark subpixels, while the second extended line GE2 forms capacitive couplings with the subpixel electrodes 124t for the first subpixels formed as dark subpixels.

According to the above description, the gates of the third TFTs 130u provided in association with the dark subpixels Bt in the blue pixels in the nth row are electrically connected to the gate line $G_n$ in the n+1-th row. However, the present invention is not limited to this. The gates of the third TFTs 130u provided in association with the dark subpixels Bt in the blue pixels in the nth row may be electrically connected to the gate line in one of the other rows. However, if the distance between the gate of each TFT 130u and the gate line electrically connected to this gate is increased, the length of a line connecting this gate of the TFT 130u to the gate line is increased; the opening rate is reduced; and the margin for adjustment of the phase of the voltage on the storage capacitor line CS is reduced. It is, therefore, preferable to connect the gate of each TFT 130u to the gate line located comparatively near to the gate.

According to the above description, the first extended line GE1 and the second extended line GE2 that electrically connect the gate line $G_n$ and the gates of the TFTs 130u corresponding to the dark subpixels Bt in the blue pixels are provided in the vicinity of the storage capacitor line CS. However, the present invention is not limited to this. The first extended line GE1 and the second extended line GE2 may be provided in the vicinity of the gate line. The arrangement may alternatively be such that the first extended line GE1 and the second extended line GE2 are formed in a different layer superposed on the gate line $G_n$ to limit the reduction in the opening rate.

According to the above description, each subpixel electrode 124t is provided so as to overlap the source of the TFT 130u, with an insulating layer interposed therebetween, a capacitive coupling being formed between the source of the TFT 130u and the subpixel electrode 124t. However, the present invention is not limited to this. A capacitive coupling may be formed between the subpixel electrode 124t and an electrode electrically connected to the source of the TFT 130u formed on the semiconductor layer to increase the capacitance. For example, such an electrode is formed of a transparent electroconductive member.

Further, according to the above description, the third TFTs 130u are provided in association with the dark subpixels Bt. However, the present invention is not limited to this. The third TFTs 130u may be provided in association with the bright subpixels Bs. In such a case, selection of the third TFT 130u causes the potential on the subpixel electrode 124s to be brought closer to the potential on the counter electrode 144 (e.g., ground potential) through the TFT 130s, so that the difference between the root-mean-square voltage on the bright subpixel and the root-mean-square voltage on the dark subpixel is reduced and the luminance of the bright subpixel Bs is reduced, resulting in a reduction in the viewing angle improvement effect. Also, since the ordinary V-T curve exhibits a higher gradient when the voltage is higher, the amount of reduction in the luminance of the bright subpixel is larger than the amount of reduction in the luminance of the dark subpixel. It is, therefore, preferable to provide the third TFTs 130u in association with the dark subpixels Bt.

In the liquid crystal display apparatus 100A shown in FIG. 13, the storage capacitor trunks CST (i.e., the storage capacitor trunks CSTa and CSTb) are provided in association with two kinds of different voltages. However, the present invention is not limited to this. Storage capacitor trunks CST may be provided in association with three or more kinds of different voltages. Also, the rectangular waves contained in the voltages respectively applied to the storage capacitor trunks CST may be equal in period but differ in phase from each other.

It is preferable that the voltage VCST on each storage capacitor trunk CST contains a rectangular wave having a period of 2×N×H (horizontal scanning period), where N is an integer equal to or larger than 1. In such a rectangular wave, a low voltage in a period of N×H and a high voltage in a period of N×H recur alternately. Theory holds that different timings can be set for changes of the voltages VCS on the storage capacitor lines CS on a gate line-by-gate line basis. However, if a large number of different timings are set, the CS voltage generation circuit 350 shown in FIG. 12 becomes disadvantageously complicated. In general, the potential on each source line S is inverted not only on a frame-by-frame basis but also at intervals of 1H (H: horizontal scanning period). Therefore, imparting a periodicity of an integer multiple of the horizontal scanning period to the voltage VCST on each storage capacitor trunk CST enables the voltage VCST on the storage capacitor trunk CST to be changed according to timing of change of the potential on the source line S. The increase in the number of kinds of storage capacitor trunks CST can be limited in this way.

If the number of kinds of storage capacitor trunks CST is somewhat large, the amplitude period of the voltage VCST applied to each storage capacitor trunk CST can be increased and, therefore, a sufficient timing margin can be secured. Also, the number of subpixels corresponding to the storage capacitor lines electrically connected to the storage capacitor trunk to which one kind of voltage is applied is reduced and the amount of electric charge to be changed by the storage capacitor trunk to which one kind of voltage is applied is reduced. Therefore, even in a situation where the voltage waveform applied to each storage capacitor trunk or the voltage waveform applied to each gate line can be easily blunted, e.g., in a case where the storage capacitor trunks are comparatively thin or in a case where the liquid crystal display panel is large, assumed timing can be maintained and high-precision drive can be performed with stability.

Figure 16:
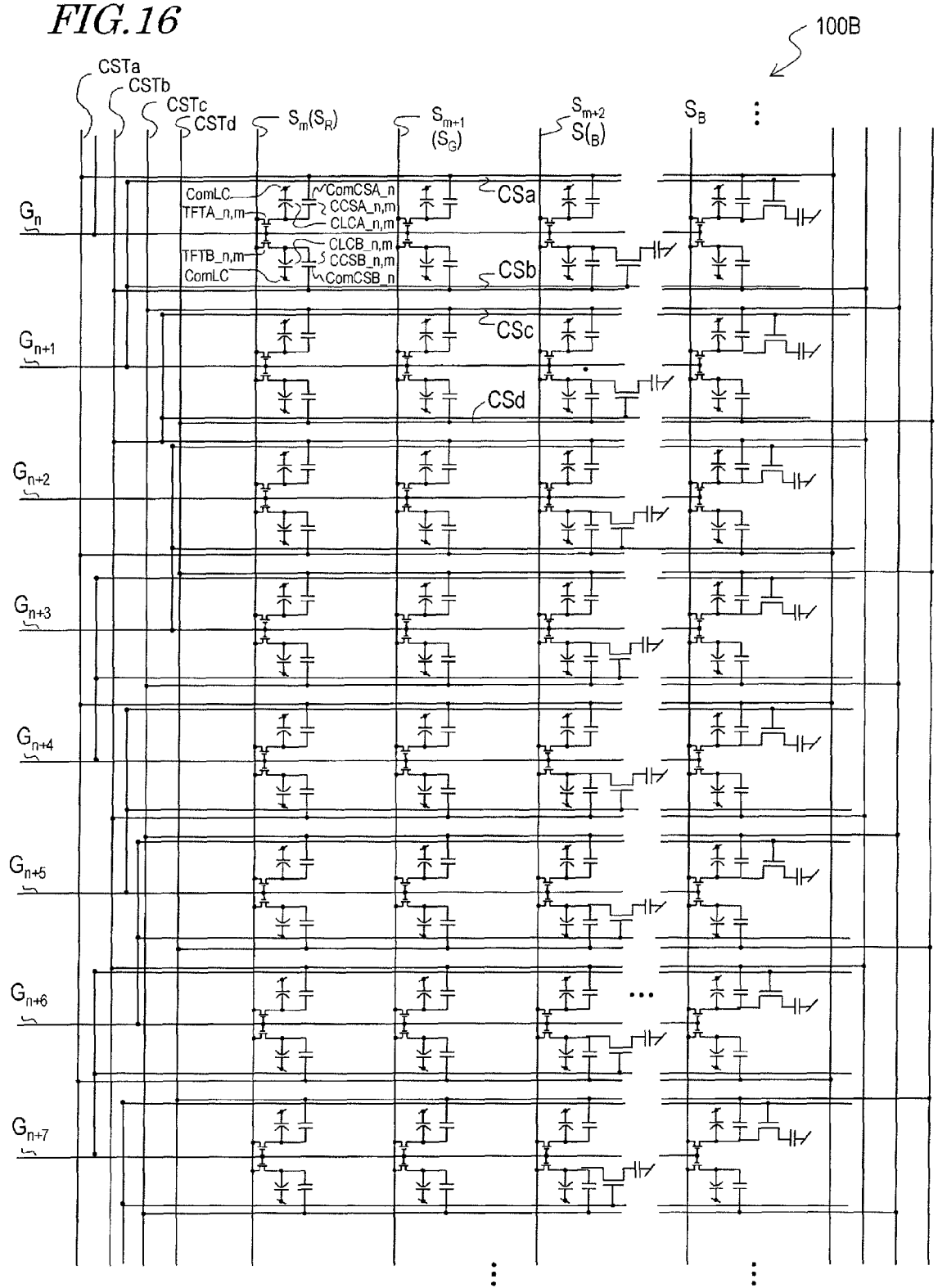
[FIG. 16]
Figure 17:
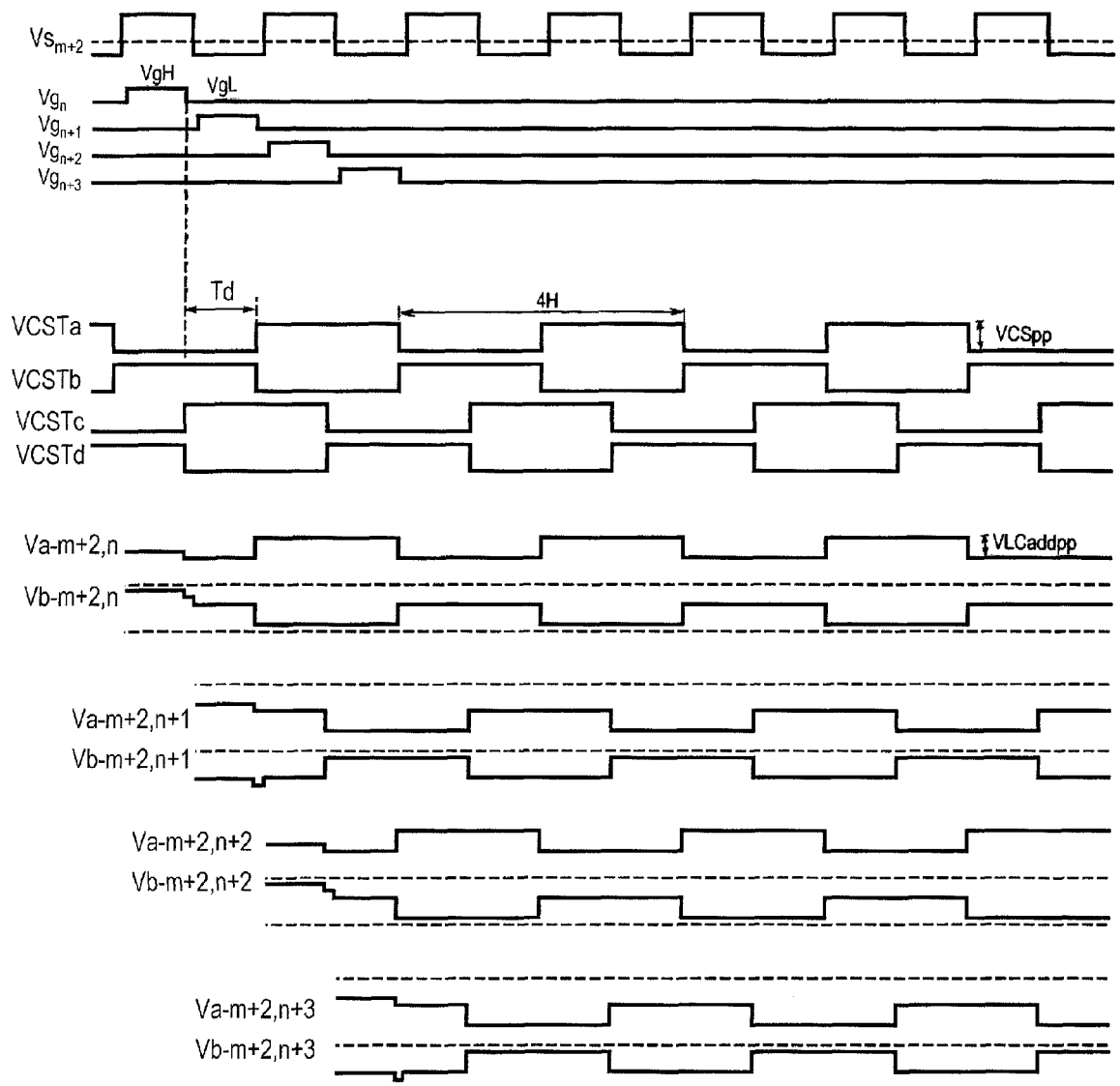
[FIG. 17]

In a liquid crystal display apparatus 100B shown in FIG. 16, storage capacitor trunks CST (i.e., storage capacitor trunks CSTa, CSTb, CSTc, and CSTd) corresponding to four kinds of different voltages are provided. In the liquid crystal display apparatus 100B, as shown in FIG. 17, each of voltages VCSTa to VCSTd respectively applied to the storage capacitor trunks CSTa to CSTd oscillates with a period of 4H. In the voltages VCSTa to VCSTd, the period of each of a low voltage and a high voltage is 2H (N=2). If the voltage VCST on each storage capacitor trunk oscillates with a period of an integer multiple of the horizontal scanning period, a comparatively small number of storage capacitor trunks CST can cover the storage capacitor lines laid through the entire liquid crystal display panel.

In the liquid crystal display apparatus 100B, regarding the pixel at the nth row and the m+2-th column, the phase of the voltage VCSTa on the storage capacitor trunk CSTa corresponding to the subpixel Spa is the inversion of the phase of the voltage VCSTb on the storage capacitor trunk CSTb corresponding to the subpixel Spb, and the phase of the voltage VCSTa is half-period (i.e., 2H) shifted relative to the phase of the voltage VCSTb. Regarding the pixel at the n+1-th row and the m+2-th column, the phase of the voltage VCSTc on the storage capacitor trunk CSTc corresponding to the subpixel Spa is the inversion of the phase of the voltage VCSTd on the storage capacitor trunk CSTd corresponding to the subpixel Spb, and the phase of the voltage VCSTc is 2H shifted relative to the phase of the voltage VCSTd.

In the liquid crystal display apparatus 100B, after the voltage on one gate line $G_n$ is changed from high to low, the voltages Vlca and Vlcb on the subpixel electrodes 124a and 124b corresponding to the TFT 130a and the TFT 130b are reduced by approximately equal drawing voltages Vd by the drawing effect, for example, due to the influence of parasitic capacitances that the TFT 130a and the TFT 130b have. Thereafter, the third TFT 130u is turned on and the potential on the subpixel electrode 124t for the dark subpixel Bt in the blue pixel B is reduced. Thereafter, the first changes in the voltages on the storage capacitor lines CSa and CSb occur. Thus, in the liquid crystal display apparatus 100B, the first changes in the voltages on the storage capacitor lines CS after turning-off of the TFT 130a and the TFT 130b occur after the third TFT 130u is selected and after the potential on the subpixel electrode 124t is reduced.

Also in this apparatus, the time at which the voltage on the gate line $G_n$ corresponding to the storage capacitor trunks CSTa and CSTb changes from VgH to VgL coincides with the time at the center of a flat portion of each of the voltages VCST on the storage capacitor trunks CST, and the value of Td is 1H. The value of Td may be within such a range as to be longer than 0H and shorter than 2H.

As in the liquid crystal display apparatus 100B, in a case where two storage capacitor lines CS are provided for the pixels in each row, L (=2×N) kinds of storage capacitor trunks CST are provided and the periods of oscillation of the voltages VCST on the storage capacitor trunks CST are set to 2×N×H, thus simplifying allocation of storage capacitor trunks and storage capacitor lines to which voltages regularly inverted are supplied, and supplying L kinds of voltage patterns to the entire storage capacitor line through L storage capacitor trunks.

In the liquid crystal display apparatus 100B, two storage capacitor lines CS are provided for the pixels in each row. However, the present invention is not limited to this. One storage capacitor line CS may be provided in common for two subpixels adjacent to each other in each pair of pixels adjacent to each other in the column direction. In such a case, the number of storage capacitor lines CS in the liquid crystal display panel can be reduced.

Figure 18:
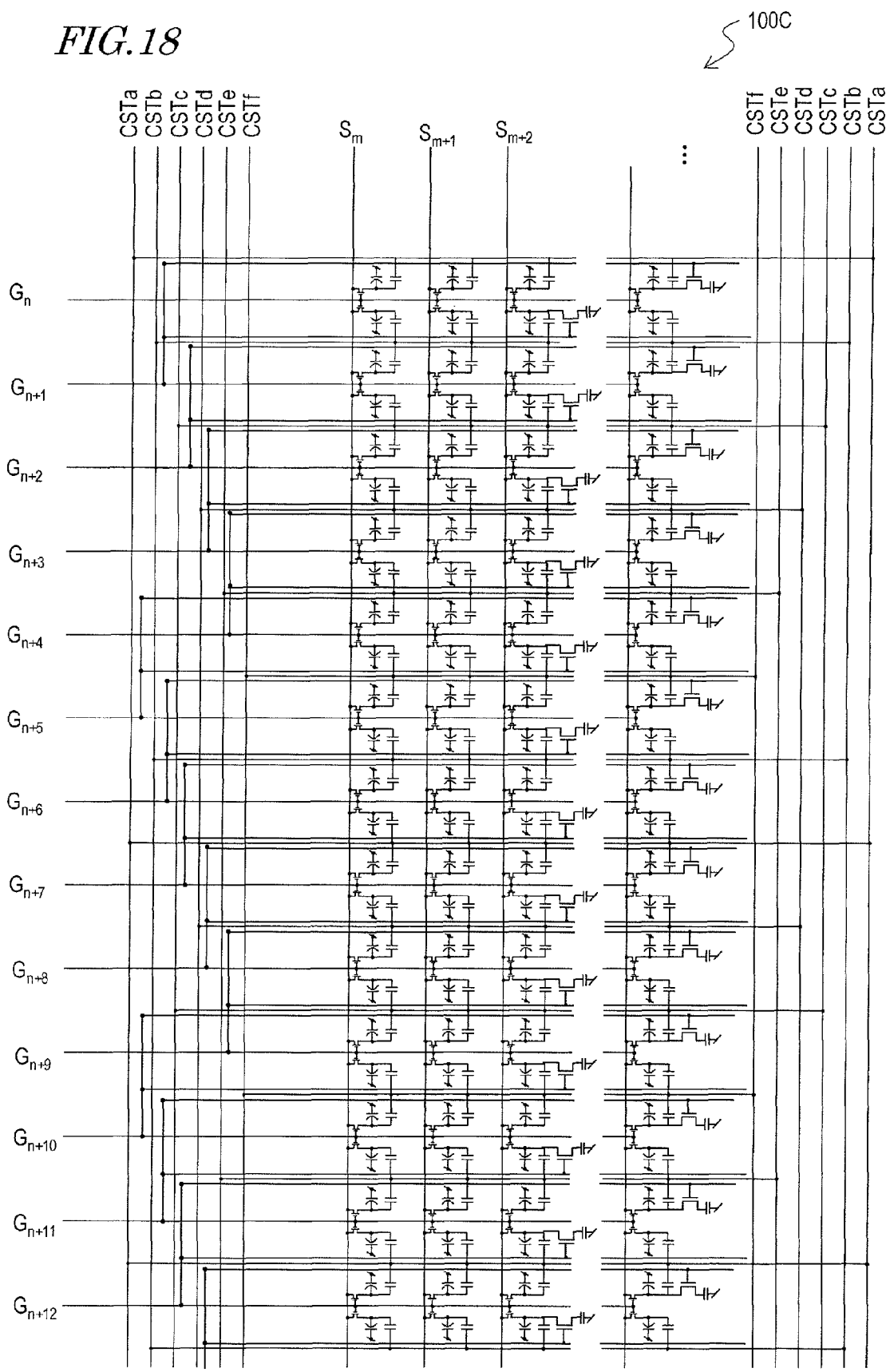
[FIG. 18]

In a liquid crystal display apparatus 100C shown in FIG. 18, each storage capacitor line CS is provided in common for two subpixels adjacent to each other in each pair of pixels adjacent to each other in the column direction. In the liquid crystal display apparatus 100C, six kinds of storage capacitor trunks (i.e., storage capacitor trunks CSTa to CSTf) are provided.

Figure 19:
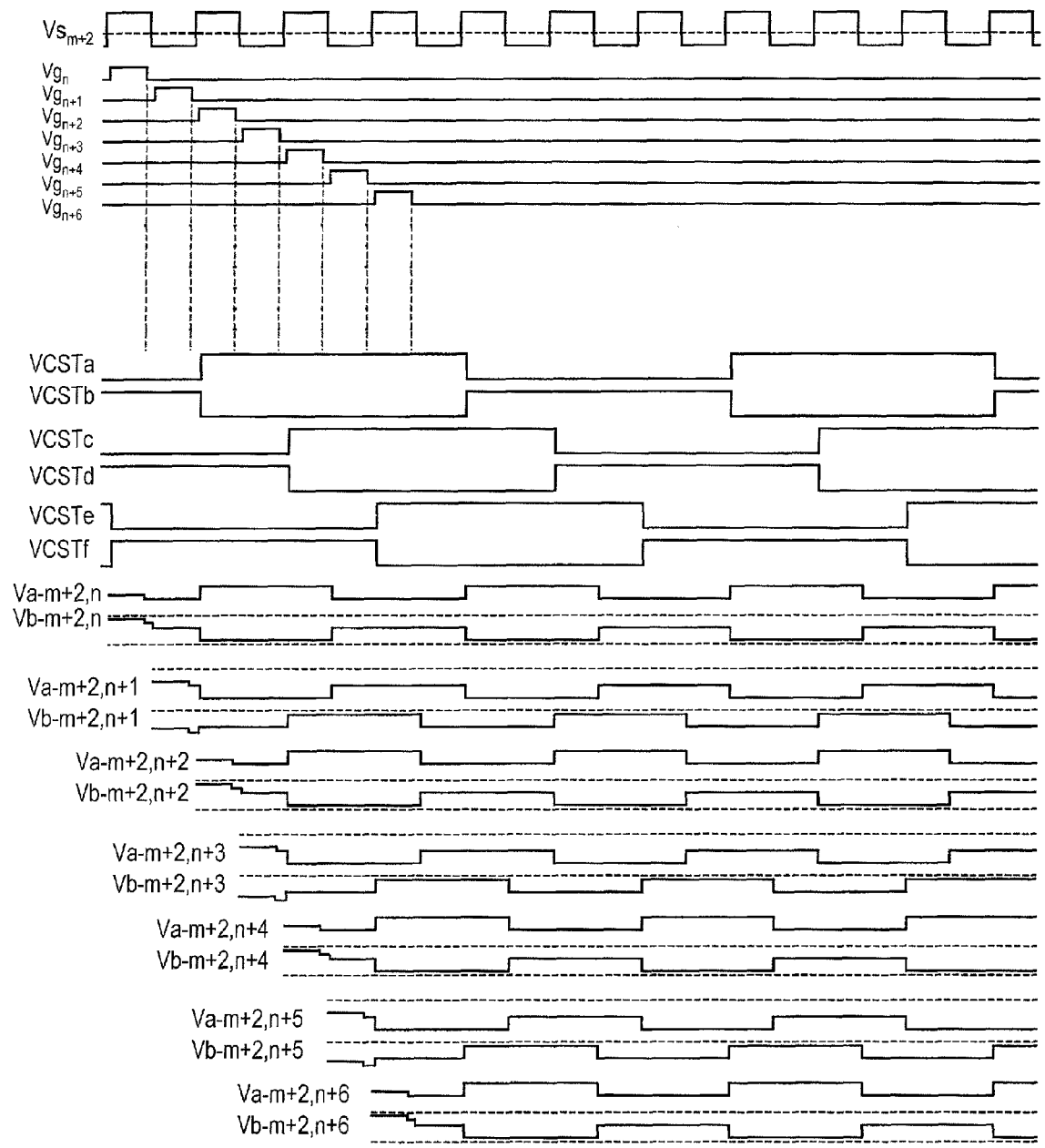
[FIG. 19]

In the liquid crystal display apparatus 100C, as shown in FIG. 19, each of voltages respectively applied to the storage capacitor trunks CSTa to CSTf oscillates with a period of 12H. In voltages VCSTa to VCSTf, the period of each of a low voltage and a high voltage is 6H (N=6).

In the liquid crystal display apparatus 100C, regarding the pixel at the nth row and the m+2-th column, the phase of the voltage VCSTa on the storage capacitor trunk CSTa corresponding to the subpixel Spa is the inversion of the phase of the voltage VCSTb on the storage capacitor trunk CSTb corresponding to the subpixel Spb, and the phase of the voltage VCSTa is 6(=N)H shifted relative to the phase of the voltage VCSTb. Regarding the pixel at the n+1-th row and the m+2-th column, the phase of the voltage VCSTb on the storage capacitor trunk CSTb corresponding to the subpixel Spa is 8(=N+2)H shifted relative to the phase of the voltage VCSTd on the storage capacitor trunk CSTc corresponding to the subpixel Spb.

In the liquid crystal display apparatus 100C, after the voltage on one gate line $G_n$ is changed from high to low, the voltages Vlca and Vlcb on the subpixel electrodes 124a and 124b corresponding to the TFT 130a and the TFT 130b are reduced by approximately equal drawing voltages Vd by the drawing effect, for example, due to the influence of parasitic capacitances that the TFT 130a and the TFT 130b have. Thereafter, the third TFT 130u is turned on and the potential on the subpixel electrode 124t for the dark subpixel Bt in the blue pixel B is reduced. Thereafter, the first change in the voltage on the storage capacitor line CS occurs. Thus, in the liquid crystal display apparatus 100C, the first change in the voltage on the storage capacitor line CS after turning-off of the TFT 130a and the TFT 130b occurs after the third TFT 130u is selected and after the potential on the subpixel electrode 124t is reduced.

In a case where, as in the liquid crystal display apparatus 100C, each storage capacitor line CS is provided in common for two subpixels adjacent to each other in each pair of pixels adjacent to each other in the column direction, L (=N) kinds of storage capacitor trunks CST may be provided and the periods of oscillation of the voltages VCST on the storage capacitor trunks CST may be set to 2×N×H.

If N is greater, the number L of storage capacitor trunks CST is correspondingly increased. If the number of storage capacitor trunks CST is increased, the area occupied by the storage capacitor trunks is increased. There is also a need to individually generate voltages VCST to be applied to the storage capacitor trunks CST. Also, if N is excessively great, a change in luminance due to a change in the orientation of liquid crystal molecules 162 can be recognized. From these points of view, setting N smaller is preferable.

On the other hand, if N is smaller, the number L of storage capacitor trunks CST is correspondingly reduced. If the number L of storage capacitor trunks CST is reduced, a need arises to change the potentials on the storage capacitor lines CS in the entire liquid crystal display panel at a time. This means that a large current is produced each time the potentials on the storage capacitor lines CS are changed, and that the potentials on the storage capacitor lines CS cannot be reliably changed. This is considered not preferable from the viewpoint of reliability of the liquid crystal display panel. From consideration of the realizability and ease of drive of the liquid crystal display panel, it is preferable that N be one of integers from 4 to 12, for example. From consideration of ease of control in particular, it is preferable that N be 4, 6, 8, or 12, for example.

In the waveform shown in FIG. 19, the phases of the voltages on the storage capacitor lines disposed in association with the gate lines selected later in time are shifted by a time period corresponding to N times or (N+2) times the horizontal scanning period relative to the phases of the other voltages. However, the present invention is not limited to this. The phases of the voltages on the storage capacitor lines disposed in association with the gate lines selected later with respect to time may be shifted by a time period corresponding to (N+1) times the horizontal scanning period relative to the phases of the other voltages.

In the liquid crystal display apparatus 100C, for example, after the voltage on one gate line $G_n$ is turned off, the TFTs 130u are selected to reduce the potentials on the subpixel electrodes 124t for the blue pixels. If the time period from the completion of turning-off of the voltage on one gate line $G_n$ to the time at which the voltages VCSTa and VCSTb are changed first differs larger, a difference in luminance occurs between the dark subpixels (e.g., the first subpixels) disposed on one side of the gate line $G_n$ and the dark subpixels (e.g., the second subpixels) disposed on the other side of the gate line.

To make uniform the average luminance of the pixels corresponding to one gate line, and to ensure a monotonous periodicity, the phases of the voltages on the storage capacitor lines disposed in association with the gate lines selected later with respect to time are shifted by a time period of (N+1)H relative to the phases of the other voltages.

In a case where the half period N of the voltages on the storage capacitor trunks is 5, no problem arises with drive even if the phases of the voltages on the storage capacitor lines disposed in association with the gate lines selected later with respect to time are shifted by a time period corresponding to (N+2) times the horizontal scanning period relative to the phases of the other voltages by the CS voltage generation circuit 350 (see FIG. 12). On the other hand, in a case where the number N of the storage capacitor trunks is 6, if the phases of the voltages on the storage capacitor lines disposed in association with the gate lines selected later with respect to time are shifted by a time period corresponding to (N+2) times the horizontal scanning period relative to the phases of the other voltages by the CS voltage generation circuit 350, the time period from the completion of turning-off of the TFTs to the time at which the voltages on the storage capacitor lines change first is the same as that in the case where N is 3 or 5, and it is sometimes difficult to perform capacitive drive.

As described above, in the liquid crystal display apparatuses 100B and 100C, after the voltage on one gate line $G_n$ is changed from high to low, the voltages Vlca and Vlcb on the subpixel electrodes 124a and 124b corresponding to the TFT 130a and the TFT 130b are reduced by approximately equal drawing voltages Vd by the drawing effect, for example, due to the influence of parasitic capacitances that the TFT 130a and the TFT 130b have. Thereafter, the third TFT 130u is turned on and the potential on the subpixel electrode 124t for the dark subpixels Bt in the blue pixel B is reduced. Thereafter, the first changes in the voltages on the storage capacitor lines CS occur. Thus, it is preferable that the voltages on the storage capacitor lines CS change first after the potential on the subpixel electrode 124t is reduced by the third TFT 130u.

The relationship between the root-mean-square voltage on the liquid crystal layer 160 and changes in the voltage on the storage capacitor line CS will be considered. First, as described above, when the TFT 130u is turned on, and when the capacitance connected to the subpixel electrode 124t increases abruptly, the root-mean-square voltage across the liquid crystal layer 160 drops. To be exact, the influence of a change in the potential on the electroconductive member forming the source of the TFT 130u and the correction storage capacitor 132u is received. However, this influence is ignored here. It is thought that the influence of a change in the potential on the electroconductive member ignored here is constant irrespective of timing.

When the TFT 130u is turned on, the capacitance connected to the subpixel electrode 124t is assumed to increase from C1 to C2. Since Q1=C1×V1; Q2=C2×V2; and Q1=Q2, V2=Q1/C2=C1/C2×V1 and ΔV=V1−V2=(1−C1/C2)×V1. If the capacitances C1 and C2 are assumed to be constant, it can be understood that the voltage reduction effect with the third TFT 130u is higher if the initial voltage V1 is higher. The root-mean-square voltage on the subpixel corresponding to the third TFT 130u is reduced by a change on the voltage on the storage capacitor line CS. Therefore, if the third TFT 130u is turned on after receiving the influence of a change in the voltage on the storage capacitor line CS, the voltage reduction effect with the third TFT 130u is reduced. It is, therefore, preferable that the third TFT 130u be turned on before the change in the voltage on the storage capacitor line CS.

As described above, in the liquid crystal display apparatuses 100 to 100C, the potential on each subpixel electrode changes by being influenced by the voltage on the storage capacitor line CS, and the potential on the subpixel electrode is influenced by the voltage on the storage capacitor line CS not only in the display period but also in the non-display period. Generally, in the display period, the period during which the voltage on the storage capacitor line CS is high and the period during which the voltage on the storage capacitor line CS is low are equal to each other. It is preferable that also in the non-display period, the period during which the voltage on the storage capacitor line CS is high and the period during which the voltage on the storage capacitor line CS is low be equal to each other. Therefore, the voltage on the storage capacitor line CS may oscillate with the same oscillation period in each of the non-display period and the display period. The period of recurrence of the non-display period may alternatively be set so that in the non-display period the period during which the voltage on the storage capacitor line CS is high and the period during which the voltage on the storage capacitor line CS is low be equal to each other. For example, the period of the voltage on the storage capacitor line CS may be set longer in the non-display period than in the display period.

In general, the polarity of pixels is inverted each time a unit display of several frames is produced. If the phase of the voltage on each storage capacitor line CS is not changed while the polarity of pixels is inverted, the bright/dark state of each subpixel is inverted in association with frame inversion. This may lead to perception of a flicker or a reduction in the viewing angle improvement effect with respect to blue pixels. It is, therefore, preferable to invert the phase of the voltage VCS applied to each storage capacitor line CS with a period corresponding to the period of inversion of the polarity of pixels. For example, if the period of inversion of the polarity of pixels is 1 frame, it is preferable that the phase of the voltage applied to each storage capacitor line CS be inverted with a period of 1 frame. If the period of inversion of the polarity of pixels is 2 or 3 frames, it is preferable that the phase of the voltage of each storage capacitor line CS be inverted with a period of 2 or 3 frames. If the phase of the voltage applied to each storage capacitor line CS should be inverted with the period of inversion of the polarity of pixels without providing any special adjustment circuit, it is preferable to set the period of inversion of the polarity of pixels to 1 vertical scanning period (1 frame).

It is preferable that the vertical scanning period in the liquid crystal display apparatuses 100 to 100C be set to about (M+0.5) times the period of the voltage VCS on each storage capacitor line CS. M is an integer equal to or larger than 1. If the vertical scanning period itself is set to (M+0.5) times the period of the voltage VCS on the storage capacitor line CS, and if swings are caused by the same timing in the non-display period as well, the phase of the voltage VCS on the storage capacitor line CS can be inverted on a frame-by-frame basis without providing an additional adjustment circuit. If the vertical scanning period is V and the period of the voltage VCS on each storage capacitor line CS is P, it is preferable that MOD(V−0.5×P, P)=0. The function MOD (dividend, divisor) expresses the remainder when a dividend is divided by a divisor.

In a case where the total number of scanning lines of effective image data is 1125 and the period of the voltage VCS on each storage capacitor line CS is 12H, MOD((1125−6), 12)=3 and the phase of the voltage VCS on the storage capacitor line CS is shifted by 3H through each frame. In this case, the phase of the voltage VCS is shifted by 6H through each pair of frames and there is, therefore, a possibility of the viewing angle improvement effect being reduced and possibility of a flicker being observed, when the polarity of the pixel is inverted frame-by-frame basis. On the other hand, if the total number of horizontal scanning lines of effective image data is set to 1122 by using the above-described image timing modulation circuit 320, MOD((1122−6), 12)=0; the phase is therefore inverted on a frame-by frame basis; and the phase of the voltage VCS on the storage capacitor line CS can be inverted together with inversion of the polarity of pixels. However, making the frame frequency coincident with the original input signal requires correspondingly changing the pixel clock and the number of vertical scanning lines.

Also, as described above, it is preferable that at the time corresponding to the center of a flat portion of the voltage VCS on each storage capacitor line CS, the gate line be turned off. It is not preferable that the number of scanning lines of effective image data vary relative to the number of scanning lines of the liquid crystal display panel. In some case in actuality, however, the number of scanning lines of effective image data varies relative to the number of scanning lines of the liquid crystal display panel. In cases where such variation occurs, an increase of 1H in the number of scanning lines of effective image data at the time of input appears most frequency. In a case where the number of scanning lines is increased in one frame, the number of scanning lines is ordinarily reduced in the next frame because the frame frequency is already determined. Thus, the number of scanning lines of effective image data is changed in association with an input signal in some case. It is not preferable in terms of cost to add a component for correcting unexpected signals for control of the potential on each storage capacitor line CS. It is preferable to make a setting of a margin of 2H in plus and minus directions so as to enable adaptation even when a variation of about 1H occurs.

It is, therefore, preferable that the time period from the completion of turning-off of the TFTs 130a and 130b to changes in the voltages on the corresponding storage capacitor lines CSa and CSb be set between twice the horizontal scanning period (2H) and (half period of voltage on storage capacitor line (i.e., N)−2×horizontal scanning period). For example, in a case where the period of the voltage VCS on each storage capacitor line CS is 12H (=6H+6H), it is preferable that the time period from the completion of turning-off of the gates of the TFTs 130a and 130b to changes in the voltages on the storage capacitor lines CS be, for example, 2H, 3H or 4H. In some case, as in the case of the pixel at the n+1-th row and the m+2-th column in the liquid crystal display apparatus 100C shown in FIG. 19, the voltages on the corresponding two storage capacitor lines CSb and CSc change at different times. In a case where the time at which the voltage VCSTb on the storage capacitor trunk CSTb changes differs by 1H from the time at which the voltage VCSTc on the storage capacitor trunk CSTc changes, when the time period from the completion of turning-off of the gate of the TFT 130a to a change in the voltage VCSTb on the storage capacitor trunk CSTb is 2H, the time period from turning-off of the gate of the TFT 130b to a change in the voltage VCSTc on the storage capacitor trunk CSTc is 3H. Also, when the time period from the completion of turning-off of the gate of the TFT 130a to a change in the voltage VCSTb on the storage capacitor trunk CSTb is 3H, the time period from turning-off of the gate of the TFT 130b to a change in the voltage VCSTc on the storage capacitor line CSTc is 4H. Since the TFT 130u is selected after a lapse of 1H from the completion of turning-off of the TFTs 130a and 130b, it is preferable that the time period from the completion of turning-off of the gate of the TFT 130a to a change in the voltage VCSTb on the storage capacitor trunk CSTb be 3H, and that the time period from the completion of turning-off of the gate of the TFT 130b to a change in the voltage VCSTc on the storage capacitor trunk CSTc be 4H.

According to the above description, the source of the TFT 130u overlaps the subpixel electrode 124t, with an insulating layer interposed therebetween, and the source of the TFT 130u forms a capacitive coupling with the subpixel electrode 124t. However, the present invention is not limited to this. The voltage on the subpixel electrode 124t is reduced during the time period during which the TFT 130u is selected after it has been supplied from the source line S through the TFT 130t. Any piece of wring suffices as the line forming a capacitive coupling with the source of the TFT 130u if it has a potential fluctuating only to a small extent on a frame-by-frame basis. Therefore, the line forming a capacitive coupling with the source of the TFT 130u may be selected by considering ease of wiring designing and the reliability of the circuit.

For example, the source of the TFT 130u may be provided so as not to overlap the subpixel electrode 124t, and may form a capacitive coupling with the counter electrode 144, with an insulating layer and the liquid crystal layer interposed therebetween. A design may be made according to an opening rate and ease of wiring, as described above.

The source of the third TFT 130u may alternatively form a capacitive coupling with the counter electrode 144 or a line electrically connected to the counter electrode 144. A line electrically connected to the counter electrode 144 also exists on the back substrate 120. It is comparatively easy to form a capacitive coupling with this line. Also, this line is designed so as to ensure a potential with comparatively high stability for gradation stability. From the viewpoint of ease of manufacture and operation with stability, therefore, it is preferable that the source of the third TFT 130u form a capacitive coupling with the line electrically connected to the counter electrode 144. The counter electrode 144 is a transparent electrode formed on the entire major surface of the front substrate 140. It is not necessarily required to form on the back substrate 120 any line equipotential to the counter electrode 144. However, with the increase in size of the liquid crystal display panel, voltage drops occur due to the resistances of the very electrodes, resulting in instability of an in-plane potential in some case. It is preferable that, in order to avoid this, low-resistance line equipotential to the counter electrode 144 be provided in the back substrate 120, and that the counter electrode 144 and the line be electrically connected to each other at certain positions in the liquid crystal display panel to improve the uniformity of an in-plane potential. Naturally, a potential on the line electrically connected to the counter electrode 144 is stable. If such line is densely provided on the back substrate 120, a capacitive coupling between the line electrically connected to the counter electrode 144 and the third TFT 130u can be easily realized.

Also, the source of the third TFT 130u may form a capacitive coupling with the drain of the TFT 130t or a line electrically connected to the drain. Since the drain of the TFT 130t is positioned comparatively near to the source of the TFT 130u, the capacitive coupling can be easily formed. However, the voltage reduction effect is comparatively low because the potential on the source of the TFT 130u coincides with the potential on the subpixel electrode 124t when the TFT 130u is turned on.

The source of the third TFT 130u may alternatively form a capacitive coupling with the source of the TFT 130t (i.e., source line S). In general, the potential on the source line S oscillates at a high frequency and, therefore, substantially no problem arises with the formation of a capacitive coupling between the source of the third TFT 130u and the source line S. To be exact, however, a low level of crosstalk occurs to cause slight degradation in color reproducibility in some case, because the potential on the source line S is set according to the adjacent pixels.

The source of the third TFT 130u may alternatively form a capacitive coupling with the gate line G corresponding to the TFTs 130s and 130t. In such a case, since the potential on the gate line G is low during the almost entire period, the voltage on the subpixel electrode 124t can be reduced. A gap or an extraneous material or the like may exist between the gate and the source of the TFT, which is ordinarily considered not substantially probable to cause malfunction and breakage of the TFT by a voltage acting through a capacitance. However, if such a gap or extraneous material exists, there is a risk of an instantaneously-increasing voltage on the gate line causing a loss of charge to be held, and a risk of occurrence of a current flowing into the gate and the drain to break the TFT. In such a case, drive not only of the corresponding pixel but also of all the pixels relating to the gate line becomes unstable. Limiting the occurrence of such instable drive requires, for example, thickening the insulating layer. However, if the insulating layer is thickened for such a purpose, the capacitance is reduced and the effect of reducing the voltage by means of the third TFT 130u is reduced. Therefore, it is not preferable to take this measure.

Thus, the source of the TFT 130u or the electrode electrically connected to the source of the TFT 130u is not directly connected to any line, but the source of the TFT 130u or the electrode electrically connected to the source of the TFT 130u may form a capacitive coupling with at least one of electroconductive members including, for example, the pixel electrode, the gate line G, the storage capacitor line CS and the counter electrode, or with a line electrically connected to such an electroconductive member. For example, the source of the TFT 130u or the electrode electrically connected to the source of the TFT 130u overlaps at least one of electroconductive members including the pixel electrode, the gate line G, the storage capacitor line CS and the counter electrode, or a line electrically connected to such an electroconductive member, with an insulating layer interposed therebetween, thus forming a capacitive coupling. This insulating layer may be the insulating film formed on the back substrate 120 or may be the liquid crystal layer.

It is preferable that the gate of the third TFT 130u be connected to the gate line selected in a comparatively short time after the gate line $G_n$ corresponding to the first and second TFTs 130a and 130b is selected. For example, the gate of the third TFT 130u is preferably connected to the gate line G selected in a time period of 1H to 3H after the gate line Gn is selected.

It is preferable that the third TFT 130u enable the voltage to be supplied from the source line S to the subpixel electrode 124t so that the root-mean-square voltage of the voltage applied to the liquid crystal layer is reduced after the voltage is supplied from the source line S to the subpixel electrode 124t, and that after the potential on the subpixel electrode 124t is stabilized, the TFT 130u turn on in as shorter a time as possible to reduce the potential on the subpixel electrode 124t. For example, preferably, the gate of the third TFT 130u is selected within three times the horizontal scanning period from the gate line $G_n$ corresponding to the third TFT 130u.

If the distance between the gate line electrically connected to the gate of the third TFT 130u and the gate line corresponding to the third TFT 130u is long, the wiring is complicated and the opening rate is reduced. Therefore, the gate line connected to the gate of the third TFT 130*u* is preferably a gate line positioned one, two or three lines array from the gate line $G_n$ corresponding to the third TFT 130*u*. More preferably, the gate line connected to the gate of the third TFT 130*u* is the gate line $G_{n+1}$ adjacent to the gate line $G_n$ corresponding to the third TFT 130*u*. However, if the time period required for stabilization of the potential on the subpixel electrode 124*t* after the completion of write to the subpixel electrode 124*t* is 1H or longer according to the capacitance design of the liquid crystal display panel, the gate line connected to the gate of the third TFT 130*u* is preferably the gate line two lines away from the gate line $G_n$ corresponding to the third TFT 130*u*.

According to the above description, each subpixel electrode has a generally rectangular shape. However, the present invention is not limited to this. Each subpixel electrode may have a rectangular shape with a notch section. In liquid crystal display apparatus 100A, as described above with reference to FIG. 15, the third TFTs 130*u* and lines including the first and second extended line GE1 and GE2 are provided. There is, therefore, the risk of the liquid crystal molecules being influenced by these kinds of lines. However, a tilted electric field is generated by means of the notch section provided in each subpixel electrode to limit the influences of the TFTs 130*u*, the first and second extended lines GE1 and GE2 on the liquid crystal layer. After each TFT 130*u* is completely covered with the subpixel electrode 124*t*, the notch section is formed in the subpixel electrode 124*t* to efficiently shut off the electric field applied from the TFT 130*u* to the liquid crystal layer 160. Preferably, this notch section is provided in each of the first and second subpixel electrodes 124*s* and 124*t* in association with the TFTs 130*s* and 130*t*.

As the phase difference plates 129 and 149 shown in FIG. 1, phase difference plates having a negative optical anisotropy may be used. The phase difference plates may be biaxial phase difference plates having two optical axes. While two phase difference plates 129 and 149 provided so as to sandwich the liquid crystal layer 160 are shown in FIG. 1, only one phase difference plate may be provided.

When equal input signals are input to the liquid crystal display apparatuses 100 to 100C according to the present embodiment and to the liquid crystal display apparatus 700 as a comparative example, the luminances of the bright subpixels and dark subpixels in the red and green pixels in the liquid crystal display apparatuses 100 to 100C are equal to those in the liquid crystal display apparatus 700. On the other hand, while the luminance of the bright subpixels in the blue pixels in the liquid crystal display apparatuses 100 to 100C is equal to that in the liquid crystal display apparatus 700, the luminance of the dark subpixels in the blue pixels in the liquid crystal display apparatuses 100 to 100C differs from that in the liquid crystal display apparatus 700. More specifically, the luminance of the dark subpixels in the blue pixels in the liquid crystal display apparatuses 100 to 100C is lower than that in the liquid crystal display apparatus 700. In this case, the blue color filter and the backlight in the liquid crystal display apparatuses 100 to 100C may be adjusted to equalize the luminance of the blue pixels in the liquid crystal display apparatuses 100 to 100C to that in the liquid crystal display apparatus 700.

According to the description made above, the area of each dark subpixel is equal to that of each bright subpixel. However, the present invention is not limited to this. The area of each dark subpixel may be larger than that of each bright subpixel. It is preferable that the area of each dark subpixel be set to 1 to 4 times larger than the area of each bright subpixel, and that the ratio of the area of each bright subpixel to the area of each dark subpixel be 1:1 to 1:4. When the ratio of the area of each bright subpixel to the area of each dark subpixel is 1:1, the subpixel electrode 124*s* may be designed so that the subpixel electrode 124*s* and subpixel electrode 124*t* form symmetry. In this case, the wiring designing can be simplified; the amount of useless space is small; and a comparatively high opening rate can be achieved.

If the area ratio between the bright subpixels and the dark subpixels is increased, a more complicated design is required; the amount of useless space is increased; and the opening rate is reduced. In general, if the gradation level is lower, the differences between the display characteristics as seen from a position just in front and the display characteristics as seen along an oblique direction are increased. If the area of the bright subpixels is reduced relative to that of the dart subpixels, the effect of reducing these differences is improved. More specifically, in a case where the gamma characteristic of the liquid crystal display panel is about 2, if the area ratio between the bright subpixels and the dark subpixels is 1:1, the viewing angle characteristics can be improved comparatively smoothly through about 0 to 192 levels in the 255-level gradation expression. If the area ratio between the bright subpixels and the dark subpixels is 1:3, the viewing angle characteristics are improved comparatively strongly in a range of gradation levels of 0 to 128 in the 255-level gradation expression. Considering comparatively high recognizability of differences in display characteristics at low gradation levels in ordinary cases and considering the mass-producibility, it is preferred that the area ratio between the bright subpixels and the dark subpixels be about 1:2 to 1:3.

According to the description made above, the liquid crystal display apparatuses 100 to 100C are of a normally black type. However, the present invention is not limited to this. The liquid crystal display apparatuses may be of a normally white type. In a case where the liquid crystal display apparatus is of a normally white type, when the potential on the subpixel electrode 124*b* corresponding to the second subpixel Bb in blue pixel B is reduced closer to the potential on the counter electrode 144, the second subpixel Bb becomes a bright subpixel, as described above with reference to FIG. 9B. In this case, a color shifting can be suppressed but degradation in contrast sometimes occurs. It is, therefore, preferable that the liquid crystal display apparatus be of a normally black type.

According to the description made above, the arrangement is such that when certain gradation levels of red, green and blue in an input signal are equal to each other, the ratio of the difference in luminance between the two subpixels in one blue pixel to the maximum luminance of the blue pixel is set higher than each of the ratio of the difference in luminance between the two subpixels in one red pixel to the maximum luminance of the red pixel and the ratio of the difference in luminance between the two subpixels in one green pixel to the maximum luminance of the green pixel. However, the present invention is not limited to this.

In a case where the panel gap is set larger than an ordinary value in order to reduce the voltage applied to the liquid crystal layer for the purpose of reducing power consumption, or in order to reduce the liquid crystal capacitance, Δnd>half wave with respect to blue and green pixels and Δnd<half wave with respect to red pixels, such that in some case the viewing angle characteristics of red pixels include a color shifting in a red-cyan direction as obliquely seen unlike the viewing angle characteristics of blue and green pixels. In such a case, the arrangement may alternatively be such that the ratio of the difference in luminance between the subpixels in one red pixel to the maximum luminance of the red pixel is higher than each of the ratio of the difference in luminance between the subpixels in one green pixel to the maximum luminance of the green pixel and the ratio of the difference in luminance between the subpixels in one blue pixel to the maximum luminance of the blue pixel.

The arrangement may alternative be such that the ratio of the difference in luminance between the subpixels in one green pixel to the maximum luminance of the green pixel is higher than each of the ratio of the difference in luminance between the subpixels in one red pixel to the maximum luminance of the red pixel and the ratio of the difference in luminance between the subpixels in one blue pixel to the maximum luminance of the blue pixel. In a case where the viewing angle characteristics with respect to blue pixels differ from the viewing angle characteristics of red and green pixels as in the liquid crystal display apparatus 700 in the comparative example described above with reference to FIG. 8, the ratio of the difference in luminance between the subpixels in one blue pixel to the maximum luminance of the blue pixel is higher than each of the ratio of the difference in luminance between the subpixels in one red pixel to the maximum luminance of the red pixel and the ratio of the difference in luminance between the subpixels in one green pixel to the maximum luminance of the green pixel.

(Embodiment 2)

Although bright subpixels and dark subpixels are arranged in a checkered pattern in the above description, the present invention is not limited to this.

A second embodiment of the liquid crystal display apparatus of the present invention will be described below with reference to FIG. 20. A liquid crystal display apparatus 100D of the present embodiment has the same configuration as that of the above described liquid crystal display except that two regions of a dark subpixel are provided so as to sandwich a bright subpixel, and repeated description will be omitted to avoid redundancy.

Figure 20:
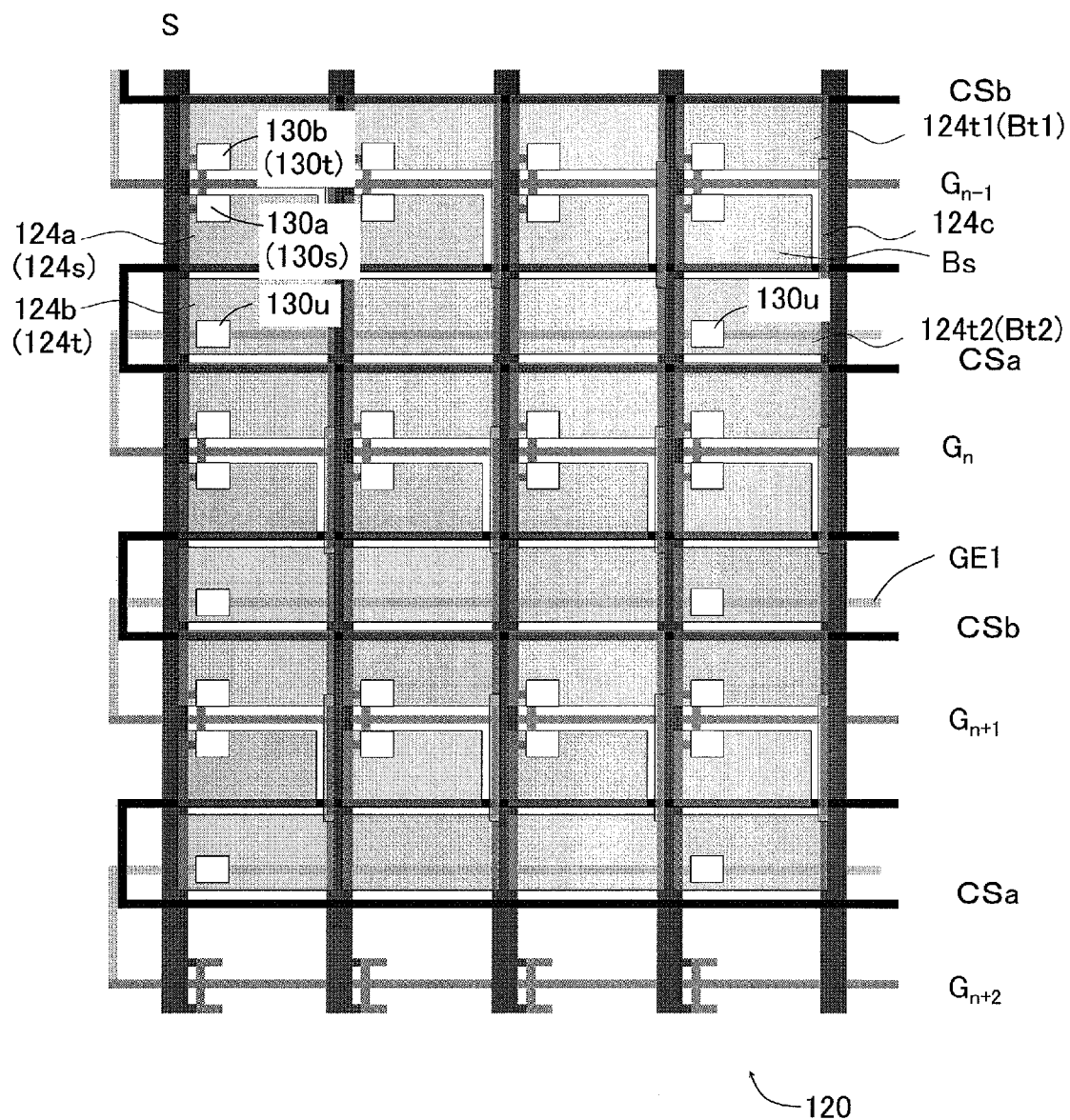
[FIG. 20]

FIG. 20 shows a schematic plan view of the back substrate 120 of the liquid crystal display apparatus 100D. Also in the liquid crystal display apparatus 100D, gate lines G and source lines S are arranged in a matrix, and storage capacitor lines CS are arranged in parallel with gate lines G. A storage capacitor line CS is provided in association with a bright subpixel of one pixel in adjacent two rows in the column direction and a dark subpixel of the other pixel in the two rows. An extended line GE is extended from each gate line G.

Red pixels and Green pixels have the same configuration as that of blue pixels except that the red and green pixels have no TFT 130u. Therefore, a description of them is omitted here.

Also in the liquid crystal display apparatus 100D, the TFT 130u is provided corresponding to the dark subpixel Bt of a blue pixel, and the source of the TFT 130u overlaps with the subpixel electrode 124t via an insulating layer, and forms a capacitive coupling with the subpixel electrode 124t. In the liquid crystal display apparatus 100D, dark subpixels corresponding to third TFTs 130u are aligned in a straight line, and the third TFTs 130u are connected with gate line $G_n$ by just one extended line.

The dark subpixel Bt of a blue pixel has a first region Bt1 and a second region Bt2, which are arranged so as to sandwich the bright subpixel Bs. The subpixel electrode 124t of a blue pixel has an electrode 124t1 corresponding to the first region Bt1 and an electrode 124t2 corresponding to the second region Bt2. The drain of the TFT 130t is electrically connected to the electrode 124t1, and the electrode 124t1 is electrically connected to the electrode 124t2 via a connecting member 124c. The connecting member 124c may have a low resistivity, and the electrode 124t1 may be approximately equal in potential to the electrode 124t2.

Alternatively, the connecting member 124c is preferably higher in resistance than the subpixel electrode. For example, the material of the connecting member 124c may have a higher resistance than that of the material of the subpixel electrode (for example, ITO). Alternatively, the width or the thickness of the connecting member 124c may be different from that of the electrode 124t1 and the electrode 124t2 so that the connecting member 124c has a higher resistivity. Thereby, a voltage drop occurs at the connecting member 124c, so that the voltage of the electrode 124t2 is lower than the voltage of the electrode 124t1, and the luminance of the region Bt2 is lower than the luminance of the region Bt2. In this way, lowering of the luminance of dark subpixels can be facilitated, and a further effect of improving viewing angle characteristics can be obtained.

With reference to FIG. 21, luminance of the liquid crystal display apparatus will be described in a case where color pixels in two rows display white according to an input signal.

FIG. 21(*a*) shows a schematic diagram of a conventional liquid crystal display apparatus. In the conventional liquid crystal display apparatus, red, green, and blue pixels included in two-row color pixels are each lit.

FIG. 21(*b*) shows a schematic diagram of the previously described liquid crystal display apparatus 100A. In the liquid crystal display apparatus 100A, the area ratio between a bright pixel and a dark pixel in each pixel is 1:2. In this case, the area of a dark pixel is larger than the area of a bright pixel in order to efficiently improve viewing angle characteristics in a low-grayscale portion. In the case of the liquid crystal display apparatus 100A, bright subpixels and dark subpixels are arranged in a checkered pattern. Therefore, even if one straight line extending in x direction is displayed according to an input signal, since bright subpixels are arranged in a dispersed manner, it may look as if there is mist around the line or the line may look like two dotted lines, and accordingly display quality may be degraded.

FIG. 21(*c*) shows a schematic diagram of the liquid crystal display apparatus 100D of the present embodiment. Also in the liquid crystal display apparatus 100D, the area ratio between a bright pixel and a dark pixel in each pixel is 1:2. In the liquid crystal display apparatus 100D, bright subpixels are each arranged on a straight line in the liquid crystal display apparatus 100D, so that a regular straight line can be viewed. In this way, the liquid crystal display apparatus 100D of the present embodiment can suppress degradation of the display quality.

However, since the liquid crystal display apparatus 100D has more complex wiring than that of the liquid crystal display apparatus 100A, and its mass producibility may be lowered. Thus, whether to arrange bright subpixels and dark subpixels in a checkered pattern or divide dark subpixels can be selected as appropriate in consideration of use, resolution, luminance and the like of a liquid crystal display apparatus. For example, in a case where a liquid crystal display apparatus is used as a high-definition television set, designing by dividing subpixels is preferable when the area ratio of a bright subpixel to a dark subpixel is 1/3 or less, and arranging bright subpixels and dark subpixels in a checkered pattern is preferable when such an area ratio is more than 1/3. In a case where a liquid crystal display apparatus is used as a PC monitor, which is viewed from a nearer position, a divided subpixel structure is preferably employed when the area ratio of a bright subpixel to a dark subpixel is about 1/1.5, and arranging bright subpixels and dark subpixels in a checkered pattern is preferable when such an area ratio is more than about 1/1.5.

(Embodiment 3)

Although two subpixel electrodes belonging to one pixel are supplied with voltage from a common source line S, the present invention is not limited to this. Two subpixel electrodes may be supplied with voltage from different source lines S.

Figure 22:
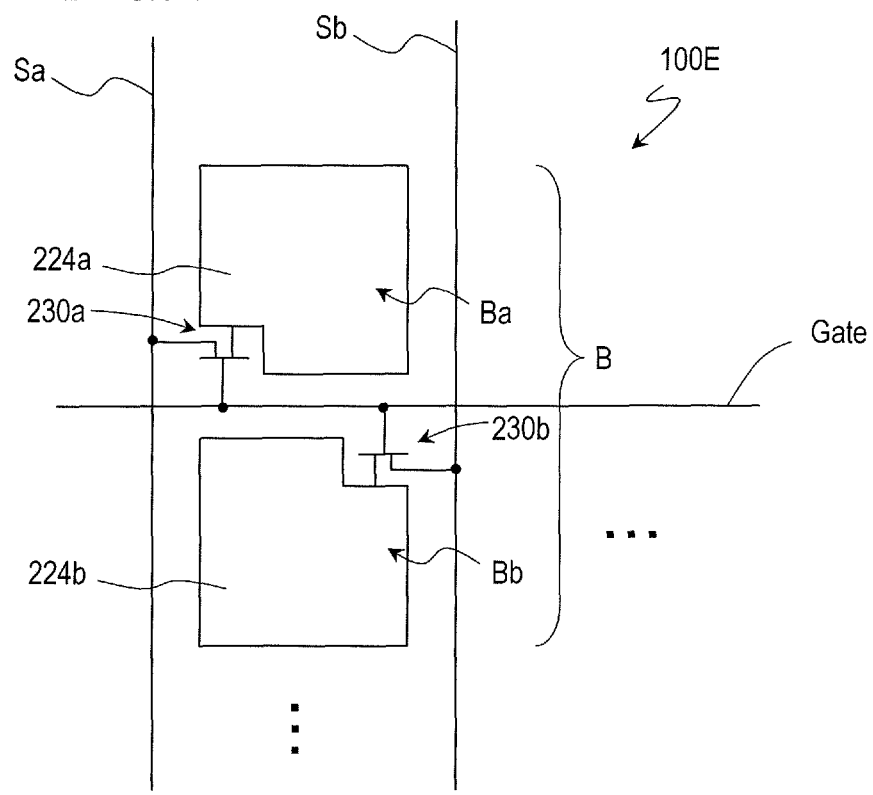
[FIG. 22]
Figure 23:
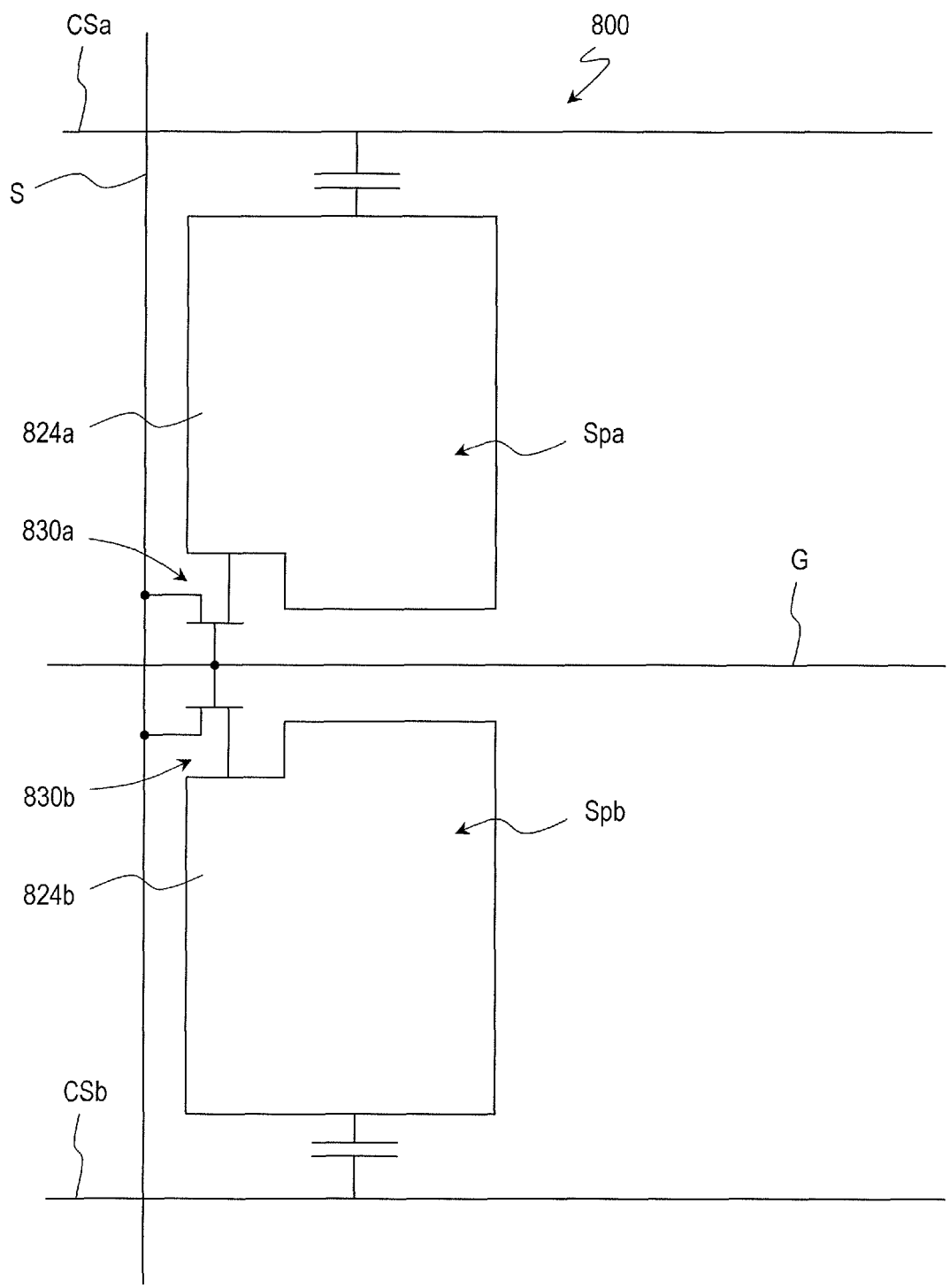
[FIG. 23]
Figure 24:
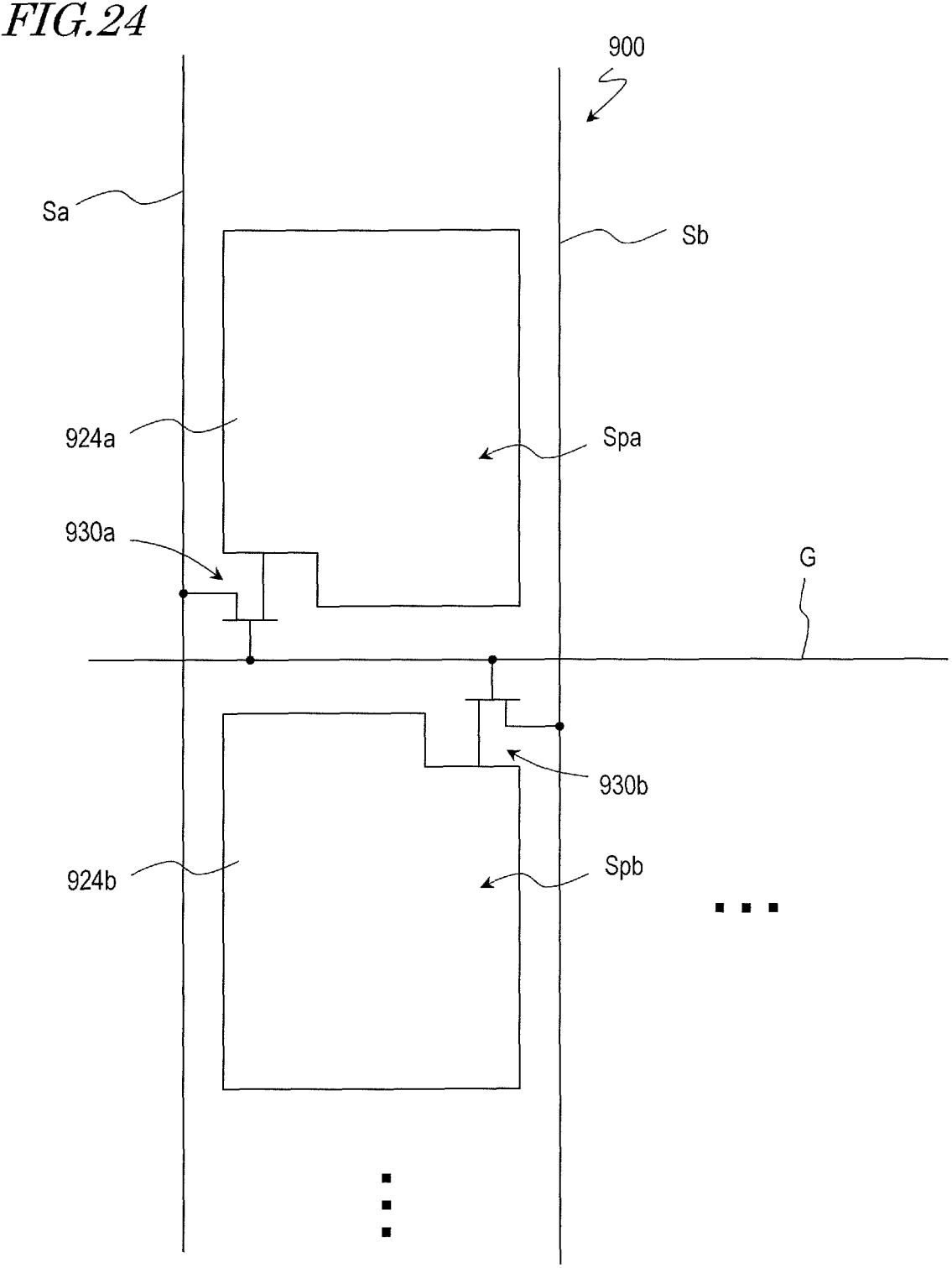
[FIG. 24]

A third embodiment of the liquid crystal display apparatus of the present invention will be described below with reference to FIG. 22. A liquid crystal display apparatus 100E of the present embodiment has the same configuration as that of the above described liquid crystal display apparatus 100A except that two subpixel electrodes belonging to each pixel are supplied with voltage from different source lines S, and that the third TFT is not provided, and repeated description will be omitted to avoid redundancy.

In the liquid crystal display apparatus 100E, a blue pixel B has two subpixels Ba and Bb, subpixel electrodes 224a and 224b corresponding to the subpixels Ba, Bb are connected to TFTs 230a, 230b, respectively. Gates of the TFTs 230a, 230b are connected to a gate line Gate, and sources of the TFTs 230a, 230b are connected to different source lines S1, S2. Therefore, when the TFTs 230a, 230b are on, voltage is supplied to the subpixel electrodes 224a and 224b through the source lines Sa, Sb, so that the luminance of the first subpixel Ba can be different from the luminance of the second subpixel Bb even if the third TFT is not provided. In addition, a red pixel R and a green pixel G also have a similar configuration.

Since the liquid crystal display apparatus 100E has greater flexibility in setting voltages of the subpixel electrodes 224a and 224b unlike the above described liquid crystal display apparatuses 100 to 100D, luminance can be comparatively freely adjusted in units of subpixels. In the liquid crystal display apparatus 100E, even in a case where grayscale levels of input signals corresponding to red, green, and blue pixels are equal to one another at a given level, if the ratio of luminance of the dark subpixel Bt to the maximum luminance of the blue pixel B is made lower than the ratio of luminances of the dark subpixels Rt, Gt to the maximum luminance of the red and green pixels R, G, the luminance of the dark subpixel Bt of the blue pixel B can be lowered without changing luminances of the bright subpixels Rs, Gs, Bs, and the dark subpixels Rt, Gt, of the red pixel R, the green pixel G, and the blue pixel B. Thus, the setting of luminance of the subpixel of the blue pixel is made different from the setting of luminance of the subpixels of the read and green pixels such that the viewing angle characteristics of the blue pixel is approximately equal to the viewing angle characteristics of the read and green pixels, thereby further improving viewing angle characteristics. However, in the liquid crystal display apparatus 100E, two source lines are provided for each column of subpixels, and therefore a source driving circuit (not shown) has to perform two different signal processings with respect to one pixel.

Although the liquid crystal display apparatuses 100 to 100E are VA mode liquid crystal display apparatuses in the above description, the present invention is not limited to this. IPS mode or OCB (Optically Compensated Bend) mode liquid crystal display apparatus may be employed. In the case of OCB mode, driving may be performed in a time division scheme using fast response.

Since viewing angle characteristics of VA mode liquid crystal display apparatus are often not sufficient, the effect of improving color shifting is great when the liquid crystal display apparatuses 100 to 100E are in VA mode. In the VA mode liquid crystal display apparatuses 100 to 100E, liquid crystal molecules having negative dielectric anisotropy are nearly vertically aligned with respect to the major surface of an alignment film while no voltage is applied to them, and when voltage is applied to the liquid crystal layer 160, the liquid crystal molecules 162 are divided and tilt-aligned in four or eight directions. Such a VA mode is further categorized into MVA mode and PVA mode depending on alignment control means.

While the CS voltage generation circuit 350 described with reference to FIG. 12 can be implemented by hardware, a part or all thereof can be implemented by software. If the above described functional blocks are implemented by software, the CS voltage generation circuit 350 may be constructed using a computer. This computer include a CPU (Central Processing Unit) for executing various programs, a RAM (Random Access Memory) which functions as a work area used for executing the programs, and so on. Then, a CS voltage program for implementing the above described functional blocks is executed by the computer, causing the computer to act as the functional blocks.

The CS voltage program may be supplied from a recording medium having the program recorded thereon to the computer, or may be supplied through a communication network to the computer. The recording medium for recording the CS voltage program may be configured to be removable from the computer or integrated into the computer. The recording medium may be attached to the computer such that program code recorded on the recording medium can be read directly by the computer, or may be attached such that the program code can be read through a program reading device connected to the computer as an external device.

The recording medium includes, for example, tapes such as a magnetic tape and a cassette tape, disks including magnetic disks such as a flexible disk and a hard disk, and optical disks such as a CD-ROM, an MO, an MD, a DVD, and a CD-R, cards such as an IC card (including a memory card) and an optical card, and semiconductor memories such as a mask. ROM, an EPROM (Erasable Programmable Read Only Memory), an EEPROM (Electrically Erasable Programmable Read Only Memory), and a flash ROM.

When the CS voltage program is supplied through a communication network, the program code of the CS voltage program takes the form of a carrier wave or a data signal sequence embodied by electronic transmission.

For reference, the disclosure of Japanese Patent Application No. 2009-140599, which is a basic application of the present application, is incorporated herein by reference.

INDUSTRIAL APPLICABILITY

A liquid crystal display apparatus according to the present invention can suppress color shifting that would otherwise occur when being viewed obliquely.

REFERENCE SIGNS LIST

100 Liquid crystal display apparatus
120 Back substrate
140 Front substrate
160 Liquid crystal layer

The invention claimed is:
1. A liquid crystal display apparatus comprising:
a plurality of pixels including a red pixel, a green pixel, and a blue pixel;
a back substrate comprising,
a first insulating substrate,
a plurality of pixel electrodes respectively corresponding to the plurality of pixels, each of the plurality of pixel electrodes having electrodes that are separated each other corresponding to the plurality of subpixels,
a plurality of thin film transistors,
a plurality of gate lines,
a plurality of source lines, and
a plurality of storage capacitor lines;
a front substrate comprising a second insulating substrate and a counter electrode opposing the plurality of pixel electrodes; and
a liquid crystal layer provided between the back substrate and the front substrate,
wherein each of the plurality of pixels comprises a plurality of subpixels including a first subpixel and a second subpixel,
wherein when grayscale levels of input signals corresponding to the red pixels, the green pixels, and the blue pixels are equal to one another at a given level, a ratio of a difference in luminance between the first subpixel and the second subpixel of one pixel among the red pixel, the green pixel, and the blue pixel to a maximum luminance of the one pixel is greater than a ratio of a difference in luminance between the first subpixel and the second subpixel of each one of other two pixels among the red pixel, the green pixel, and the blue pixel to a maximum luminance of the respective one of the other two pixels,
wherein the one pixel is the blue pixel,
wherein the plurality of thin film transistors comprise a first thin film transistor and a second thin film transistor respectively corresponding to the first subpixel and the second subpixel of each of the read pixel, the green pixel, and the blue pixel,
the first thin film transistor comprising,
  a gate electrically connected to one gate line of the plurality of gate lines,
  a source electrically connected to a source line of the plurality of source lines, the source line corresponding to the red pixel, the green pixel, or the blue pixel, and
  a drain electrically connected to an electrode corresponding to the first subpixel of each of the red pixel, the green pixel, and the blue pixel, the second thin film transistor comprising,
  a gate electrically connected to the one gate line,
  a source electrically connected to the corresponding source line, and
  a drain electrically connected to an electrode corresponding to the second subpixel of each of the red pixel, the green pixel, and the blue pixel,
wherein the plurality of thin film transistors further comprise a third thin film transistor corresponding to one subpixel of the first subpixel and the second subpixel of the blue pixel,
the third thin film transistor comprising,
  a gate electrically connected to another gate line of the plurality of gate lines,
  a source, and
  a drain electrically connected to an electrode corresponding to the one subpixel of the blue pixel.

2. The liquid crystal display apparatus according to claim 1, wherein when a grayscale level of input signals corresponding to the other two pixels is a first grayscale level, luminances of the first subpixel of the other two pixels differ from luminances of the second subpixel of the other two pixels respectively, and when the grayscale level of the input signals corresponding to the other two pixels is a second grayscale level that is different from the first grayscale level, the luminances of the first subpixel of the other two pixels are approximately equal to the luminances of the second subpixel of the other two pixels respectively, and
wherein when a grayscale level of an input signal corresponding to the one pixel is any grayscale level, a luminance of the first subpixel of the one pixel differs from a luminance of the second subpixel of the one pixel.

3. The liquid crystal display apparatus according to claim 1,
wherein the plurality of pixels are arranged in a matrix with a plurality of rows and a plurality of columns,
wherein in each of the plurality of pixels, the first subpixel and the second subpixel are arranged in a column direction,
wherein in a row, the first subpixels of the pixels and the second subpixels of the pixels are arranged in a row direction respectively, and
wherein, assuming that, of the first subpixel and the second subpixel in each of the plurality of pixels, a subpixel whose luminance can be higher is a bright subpixel and a subpixel whose luminance can be lower is a dark subpixel, the bright subpixel and the dark subpixel are alternately arranged along at least one of the row direction and the column direction.

4. The liquid crystal display apparatus according to claim 3, wherein an area ratio between the bright subpixel and the dark subpixel is approximately from 1:1 to 1:4.

5. The liquid crystal display apparatus according to claim 1, wherein a luminance of the one subpixel of the first subpixel and the second subpixel of the blue pixel is lower than a luminance of another subpixel of the first subpixel and the second subpixel of the blue pixel.

6. The liquid crystal display apparatus according to claim 1,
wherein the source of the third thin film transistor or an electrode electrically connected to the source forms a correction storage capacitor together with at least one conductive member among the pixel electrode corresponding to the blue pixel, the gate line, a source line corresponding to the blue pixel, the storage capacitor line, and the counter electrode, or together with a line electrically connected to the at least one conductive member.

7. The liquid crystal display apparatus according to claim 6, wherein the source of the third thin film transistor or the electrode electrically connected to the source overlaps with the at least one conductive member or the line electrically connected to the at least one conductive member.

8. The liquid crystal display apparatus according to claim 6, wherein the at least one conductive member or the line electrically connected to the at least one conductive member includes the counter electrode or a line electrically connected to the counter electrode.

9. The liquid crystal display apparatus according to claim 6, wherein the at least one conductive member or the line electrically connected to the at least one conductive member includes the drain of the second thin film transistor of the blue pixel or a line electrically connected to the drain.

10. The liquid crystal display apparatus according to claim 6, wherein the at least one conductive member or the line electrically connected to the at least one conductive member includes the corresponding source line.

11. The liquid crystal display apparatus according to claim 6, wherein the at least one conductive member or the line electrically connected to the at least one conductive member includes the one gate line or a line electrically connected to the one gate line.

12. The liquid crystal display apparatus according to claim 6, wherein the gate of the third thin film transistor is electrically connected to a gate line which is different from a gate line corresponding to the blue pixel, of the plurality of gate lines.

13. The liquid crystal display apparatus according to claim 6, wherein the gate of the third thin film transistor is electrically connected to a gate line which is one row, two rows, or three rows away from a gate line corresponding to the blue pixel, of the plurality of gate lines.

14. The liquid crystal display apparatus according to claim 6, wherein the gate of the third thin film transistor is electrically connected to a gate line of the plurality of gate lines which is selected within three horizontal scanning periods after a gate line corresponding to the blue pixel is selected.

15. The liquid crystal display apparatus according to claim 6,
wherein adjacent storage capacitor lines among the plurality of storage capacitor lines correspond to the first subpixel and the second subpixel of each of the red pixel, the green pixel, and the blue pixel,
wherein different voltages are applied to the adjacent storage capacitor lines among the plurality of storage capacitor lines, and
wherein the voltages of the adjacent storage capacitor lines include rectangular waves having a period that is 2×N×a horizontal scanning period (N is an integer greater than or equal to 1).

16. The liquid crystal display apparatus according to claim 15, wherein the back substrate further comprises a plurality of storage capacitor trunks each of which is electrically connected to a number of the plurality of storage capacitor lines, and
wherein 2×N types of voltages are applied to the plurality of storage capacitor lines, and a same type of the storage capacitor lines are connected to a same one of the storage capacitor trunks.

17. The liquid crystal display apparatus according to claim 6, wherein a voltage of the storage capacitor line oscillates with a same period across both of a non-display time period and a display time period.

18. The liquid crystal display apparatus according to claim 6, wherein a period of a voltage of the storage capacitor line in a non-display time period is longer than a period of a voltage of the storage capacitor line in a display time period, and the non-display time period of the storage capacitor line is approximately equally divided such that a time period in which each potential occurs is equalized.

19. The liquid crystal display apparatus according to claim 6, wherein a voltage of the storage capacitor line is reversed every vertical period.

20. The liquid crystal display apparatus according to claim 6, wherein a vertical scanning period of the liquid crystal display apparatus is set to approximately (M+0.5) times a period of a voltage of the storage capacitor line (M is an integer greater than or equal to 0).

21. The liquid crystal display apparatus according to claim 1, wherein the plurality of source lines include source lines corresponding to the first subpixel and the second subpixel of each of the red pixel, the green pixel, and the blue pixel.

22. The liquid crystal display apparatus according to claim 21,
wherein the first thin film transistors each comprise: a gate electrically connected to one gate line of the plurality of gate lines; a source electrically connected to a source line of the plurality of source lines, the source line corresponding to the red pixel, the green pixel, or the blue pixel; and a drain electrically connected to an electrode corresponding to the first subpixel of each of the red pixel, the green pixel, and the blue pixel,
wherein the second thin film transistors each comprise: a gate electrically connected to the one gate line; a source electrically connected to the source line of the plurality of source lines, the source line corresponding to the red pixel, the green pixel, or the blue pixel; and a drain electrically connected to an electrode corresponding to the second subpixel of each of the red pixel, the green pixel, and the blue pixel.

23. The liquid crystal display apparatus according to claim 1,
wherein the liquid crystal layer is vertically aligned,
wherein the liquid crystal layer contains a liquid crystal molecule with negative dielectric anisotropy, and
wherein four or eight liquid crystal domains are formed in each of the plurality of subpixels.

24. The liquid crystal display apparatus according to claim 1, wherein an electrode corresponding to the first subpixel and an electrode corresponding to the second subpixel are each rectangularly shaped, and at least one notch section is provided on an edge of each of the electrode corresponding to the first subpixel and the electrode corresponding to the second subpixel.

25. The liquid crystal display apparatus according to claim 1, wherein an electrode corresponding to the first subpixel and an electrode corresponding to the second subpixel are provided with notch sections corresponding to the first thin film transistor and the second thin film transistor, respectively.

26. The liquid crystal display apparatus according to claim 1, wherein at least one of the first insulating substrate and the second insulting substrate is provided with a negative phase plate.

27. The liquid crystal display apparatus according to claim 1, wherein at least one of the first insulating substrate and the second insulting substrate is provided with a two-axis negative phase plate.

28. The liquid crystal display apparatus according to claim 1, wherein the liquid crystal display apparatus is normally black.

* * * * *